United States Patent
Jakobsson

(10) Patent No.: US 11,418,402 B1
(45) Date of Patent: Aug. 16, 2022

(54) ROBUST AND SECURE PROOF OF SPACE BASED MINING

(71) Applicant: Artema Labs, Inc, Los Angeles, CA (US)

(72) Inventor: Bjorn Markus Jakobsson, Portola Valley, CA (US)

(73) Assignee: Artema Labs, Inc, Los Angeles, CA (US)

( * ) Notice: Subject to any disclaimer, the term of this patent is extended or adjusted under 35 U.S.C. 154(b) by 200 days.

(21) Appl. No.: 16/743,503

(22) Filed: Jan. 15, 2020

Related U.S. Application Data

(60) Provisional application No. 62/793,746, filed on Jan. 17, 2019, provisional application No. 62/812,901, filed on Mar. 1, 2019.

(51) Int. Cl.
*H04L 41/12* (2022.01)
*G06Q 20/36* (2012.01)
*H04L 41/044* (2022.01)

(52) U.S. Cl.
CPC ......... *H04L 41/12* (2013.01); *G06Q 20/3672* (2013.01); *G06Q 20/3678* (2013.01); *H04L 41/044* (2013.01)

(58) Field of Classification Search
CPC ... H04L 41/044; H04L 41/12; G06Q 20/3672; G06Q 20/3678
See application file for complete search history.

(56) References Cited

U.S. PATENT DOCUMENTS

| | | | | |
|---|---|---|---|---|
| 2018/0205552 | A1* | 7/2018 | Struttmann | H04L 9/3242 |
| 2019/0349426 | A1* | 11/2019 | Smith | H04W 4/70 |
| 2019/0354962 | A1* | 11/2019 | Spector | G06F 16/9024 |
| 2019/0370793 | A1* | 12/2019 | Zhu | H04L 9/3239 |
| 2020/0092082 | A1* | 3/2020 | Raman | H04L 9/3236 |
| 2020/0143366 | A1* | 5/2020 | Liu | H04L 9/3242 |
| 2020/0204349 | A1* | 6/2020 | Sardesai | H04L 9/0637 |

OTHER PUBLICATIONS

Buckles et al., "ALGORITHM 515 Generation of a Vector from the Lexicographical Index [G6]," ACM Transactions an Mathematical Software, vol. 3, No. 2, Jun. 1997, pp. 180-182.
David F. Crouse, "Remark on ALGORITHM 515: Generation of a Vector from the Lexicographical Index Combinations," ACM Transactions on Mathematical Software, vol. 33, No. 2, Article 15, Publication Jun. 2007.
Dziembowski et al. "Proofs of Space". Published in CRYPTO 2013. https://pdfs.semanticscholar.org/fe7c/1437c4da50f9fd9cfadc8a1ac6c59ea3ffe5.pdf.

(Continued)

*Primary Examiner* — Frantz B Jean
(74) *Attorney, Agent, or Firm* — KPPB LLP

(57) ABSTRACT

Initializing a graph for providing proof of space includes generating an initial graph at a device. The initial graph is acyclic. Content of a first node in the initial graph is generated based at least in part on (1) a predecessor node that is a predecessor of the first node and (2) on a godparent node. A position of the godparent node is based at least in part on content of the predecessor node. It further includes storing at least a portion of the initial graph on the device.

20 Claims, 42 Drawing Sheets

(56) References Cited

OTHER PUBLICATIONS

James D. McCaffrey, "Quick Generation of a Combination Element Using the Combinadic with Python" Wordpress, posted Jun. 26, 2018. URL: https://jamesmccaffrey.wordpress.com/2018/06/26/quick-generation-of-a-combination-element-using-the-combinadic-with-python/ Accessed May 14, 2020.

Park et al. "SpaceMint: A Cryptocurrency Based on Proofs of Space" Published in the 22nd International Conference on Financial Cryptography and Data Security (Financial Crypto 2018), https://dci.mit.edu/research/2019/3/20/spacemint-a-cryptocurrency-based-on-proofs-of-space.

Ren et al. Bandwidth Hard Functions for ASIC Resistance. 2017, https://eprint.iacr.org/2017/225.pdf.

Satoshi Nakamoto. Bitcoin: A Peer-to-Peer Electronic Cash System.

Sergio Demian Lerner. Strict Memory Hard Hashing Functions (Preliminary V0.3, Jan. 19, 2014). 2014, https://bitslog.files.wordpress.com/2013/12/memohash-v0-3.pdf.

Thaddeus Dryja. Hashimoto: I/O bound proof of work. 2014, https://the-eye.eu/public/Books/campdivision.com/PDF/Computers%20General/Privacy/bitcoin/meh/hashimoto.pdf.

U.S. Appl. No. 62/812,901, filed Mar. 1, 2019.

\* cited by examiner

ROBUST AND SECURE PROOF OF SPACE BASED MINING

CROSS REFERENCE TO OTHER APPLICATIONS

This application claims priority to U.S. Provisional Patent Application No. 62/793,746 entitled ROBUST AND SECURE PROOF OF SPACE BASED MINING filed Jan. 17, 2019 which is incorporated herein by reference for all purposes.

This application claims priority to U.S. Provisional Patent Application No. 62/812,901 entitled FAIR AND AFFORDABLE MINING filed Mar. 1, 2019 which is incorporated herein by reference for all purposes.

BACKGROUND OF THE INVENTION

Proof of Work (PoW) has been used in applications such as cryptocurrency mining. In a PoW, a prover demonstrates to a verifier that they have performed a certain amount of computational work in a specified interval of time. These PoWs may be later reused so that they are not wasted. However, there are issues with proof of work, because it is becoming increasingly costly. For example, currently, it is infeasible to perform mining in places that have hotter climates, have more environmental regulations (e.g., which impacts electricity costs), etc. Instead, mining has increasingly moved to geographic locations that have colder climates, or that have weaker energy regulations (e.g., allowing for cheaper electricity).

This is problematic, as it results in fewer people that are willing to participate in mining. If there are fewer people participating in a consensus-based protocol such as Proof of Work, then the consensus is not as strong.

Another problem with existing PoW schemes is that they place an unnecessary burden in terms of resources. For example, when the crypto-currency Bitcoin started, such resource burden was not an issue, as the proof was not as difficult. However, due to the proof becoming increasingly difficult, miners have also been putting in more effort, which will continue to increase over time.

Due to competition in mining, generating the proof of work has become expensive, where the competition and effort involved is increasingly keeping out many users. This may lead to security problems. For example, if the majority of miners are in a single country, and the country's government controls those miners, then the government can potentially mount a 51% attack, where they can rewrite what it means to double spend. If this occurs, then other miners will lose faith in the process, which will in turn lead, for example, to the of a digital coin/currency being eradicated.

As another example of a problem with existing schemes such as PoW, currently, specialized devices such as ASICs (Application-Specific Integrated Circuits) are needed in order to have any chance of winning in PoW. Such ASICs are special-purpose computers dedicated to mining, that operate more efficiently than typical commodity devices such as a laptop or mobile phone (since the ASIC is specifically programmed to only perform mining, and nothing else). Building computing devices whose purpose is to only perform mining is profligate. It would be beneficial if users were able to mine on any kind of computing equipment (e.g., commodity devices), rather than needing specialized equipment simply to be competitive. If more types of computing equipment could be used, then the number of participants would increase. However, while devices such as mobile phones are among the most prolific computing devices, because of their limited computational power and battery resources, schemes such as current PoW approaches that are power dependent are impractical for phones.

Alternatives to PoW have been proposed, such as proof of stake. Another example alternative proposal is Proof of Space (also referred to as PoSpace, or PoS). In one example of Proof of Space, a first user has space on their memory (e.g., hard drive), and another user has a desire to store data. The first user's storage of the other user's data is used to facilitate applications such as mining. This, however, is not necessarily desirable, because the value to one of user of not losing their data is very different from what it is worth for a user to gain the benefits that are obtained from storing someone else's data. That is, the benefit is lopsided between the parties—for example, one user may only be willing to pay another user several cents to store their data. However, as the other user will only earn a few cents for storing the data, that user storing the data is likely to be less forgiving about retaining the stored data (e.g., when the user doing the storing needs storage space, they are likely to simply erase the other user's data, since they were only earning a few cents to store it anyway). However, the other person faces a large risk of losing their data.

Other existing protocols that try to overcome the Proof of Work paradigm also face issues, such as the possibility of cheating by hybridization of those protocols (e.g., to become proof of work in part). For example, with respect to storage-based approaches, a user could cheat in those protocols by taking the storage and performing extra work on that storage to increase odds of success. As one example, suppose that there is some data that is stored that provides a certain odds of winning. Now a user performs work by compressing the data to a large degree, allowing them to store much more of that type of data, thereby increasing their odds of winning.

If compression is performed, then decompression is also needed. Decompression requires computational power. Thus, if one user wanted greater odds than another user by performing compression, then there is an increase in cost for processing (to perform the counterpart decompression). Thus, due to users' willingness to cheat and gain a benefit over others, a protocol such as Proof of Space has turned into a PoW scheme (due to the work of performing compression/decompression) in an unnecessary manner.

Thus, improvements or alternatives to existing proof schemes are needed.

BRIEF DESCRIPTION OF THE DRAWINGS

Various embodiments of the invention are disclosed in the following detailed description and the accompanying drawings.

DETAILED DESCRIPTION

Figure 1A:
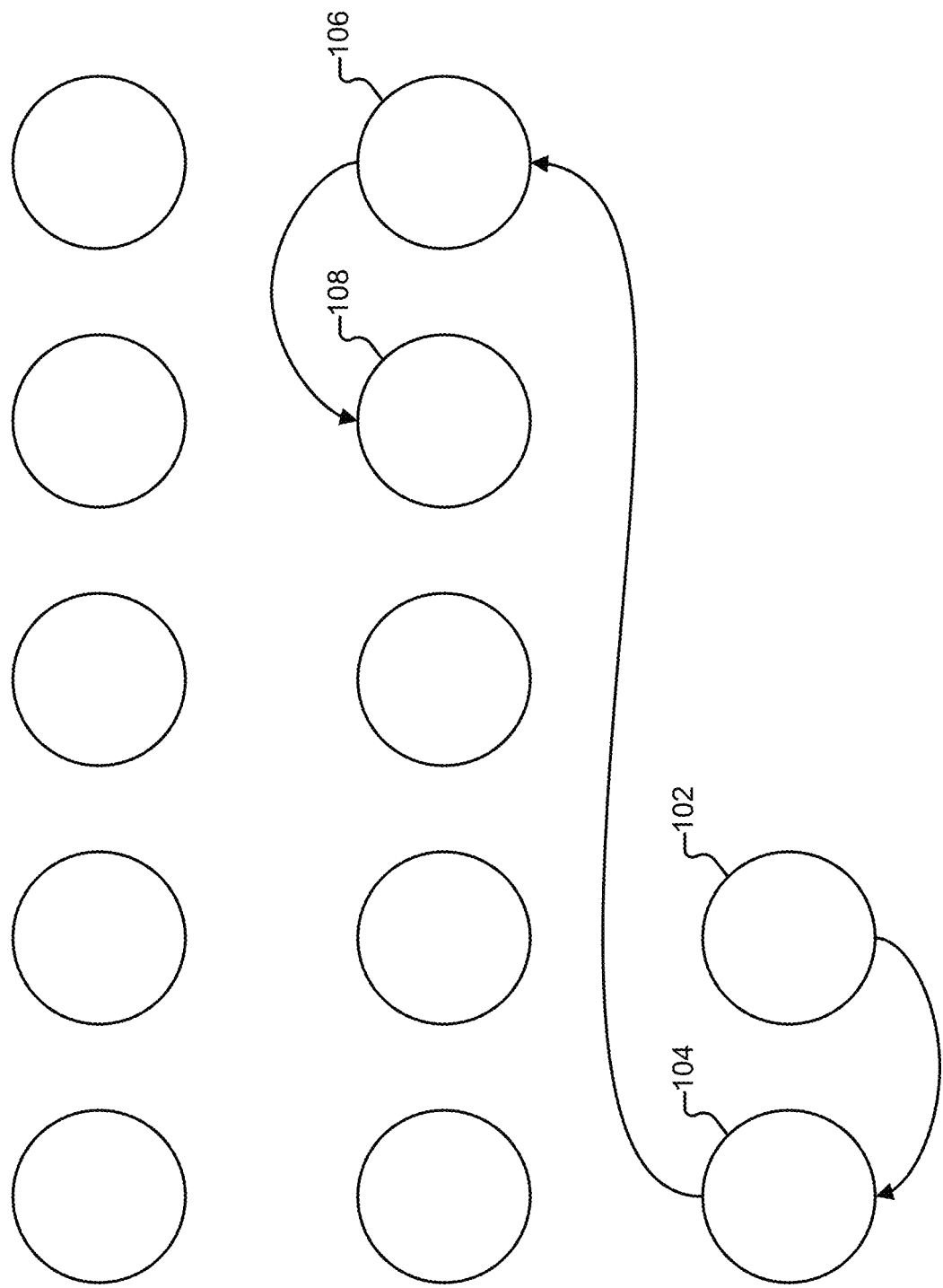
FIG. 1A illustrates an embodiment of a Proof of Space protocol.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Described herein is an improved Proof of Space (also referred to herein as PoSpace or PoS) technique that is not primarily energy based. In some embodiments, the Proof of Space technique described herein increases the penalty for cheating (where one example of cheating is compression) beyond a certain point, thereby lessening the motivation to cheat. This provides various benefits and improvements over existing proof schemes. For example, if no user is motivated to compress, then nobody will compress. Thus, everybody will toe the same line, preventing the PoSpace technique from becoming a PoW protocol (e.g., preventing hybridizing).

Using the techniques described herein, the effort or impact of a typical computer is not much different from that of a specialized computing device (e.g., ASIC used in mining), thereby rendering the need for such specialized devices irrelevant. To the extent that users of the Proof of Space scheme described herein have spare computation resources (e.g., on their mobile phones, tablets, electrical outlets, etc.), they can be utilized using the techniques described herein. This would provide various improvements over existing PoW schemes by allowing a larger number of participants, making the consensus-based protocol more stable. Further, by allowing more participants, the Proof of Space technique described herein provides the benefit, for example, of an improved digital currency that is not as speculation driven to be achieved.

As will be described in further detail below, the PoSpace technique described herein provides improvements to existing PoW and PoSpace protocols by providing a non-compressible PoSpace, where in some embodiments, "non-compressibility," as used herein, refers to "hockey-stick" behavior in terms of the penalty for performing compression, where compressing up to a certain point does not cause much penalty, but compression beyond that point causes exponential or dramatic penalties. This creates a "nightmare" scenario for compression, where everyone will agree to compress up to a certain point, which would require only a small amount of work to unpack and therefore, not require large consumption of computational resources, but discourage massive compression and massive use of computational resources. In this way, users will not be incentivized to compete with each other by performing more work (e.g., compression, and therefore have an arms race based on processing power), because that work would be costly.

While embodiments involving mining are described herein for illustrative purposes, the proof-of-space technique described herein can be variously adapted for other applications, such as spam, delayed disclosure applications, applications where rate limiting is desirable and other contexts where a proof-of-work, proof-of-space or similar technique is desired.

FIG. 1A illustrates an embodiment of a Proof of Space protocol. In this example, a number of nodes are shown (where the displayed nodes may be a portion of a larger matrix of nodes). A node as shown in this example is an element of data with a position. In this example, the position is described as the location of the node within the matrix. The content of a node is unpredictable unless computed. The following is an example embodiment of performing the computation, where the computation is solved recursively. In this example, suppose that the value of node (102) is a hash of node 104, which is a hash of node 106, and so on (that is, each node's value is dependent on the value of the immediately previous node). A value (e.g., numerical value, bit string, etc.) is but one example of the content of a node. In this example solution, the nodes may be compacted or compressed relatively easily. For example, if the proof of space is to present the value in node 102 (e.g., to prove that the value in node 102 has been stored), and the compression is such that only the value of every 10th node had been stored, then exactly 10 node values would have to be computed at most. This may not be an optimal solution, as there would be a linear trade-off between compression and computation in this particular case.

Figure 1B:
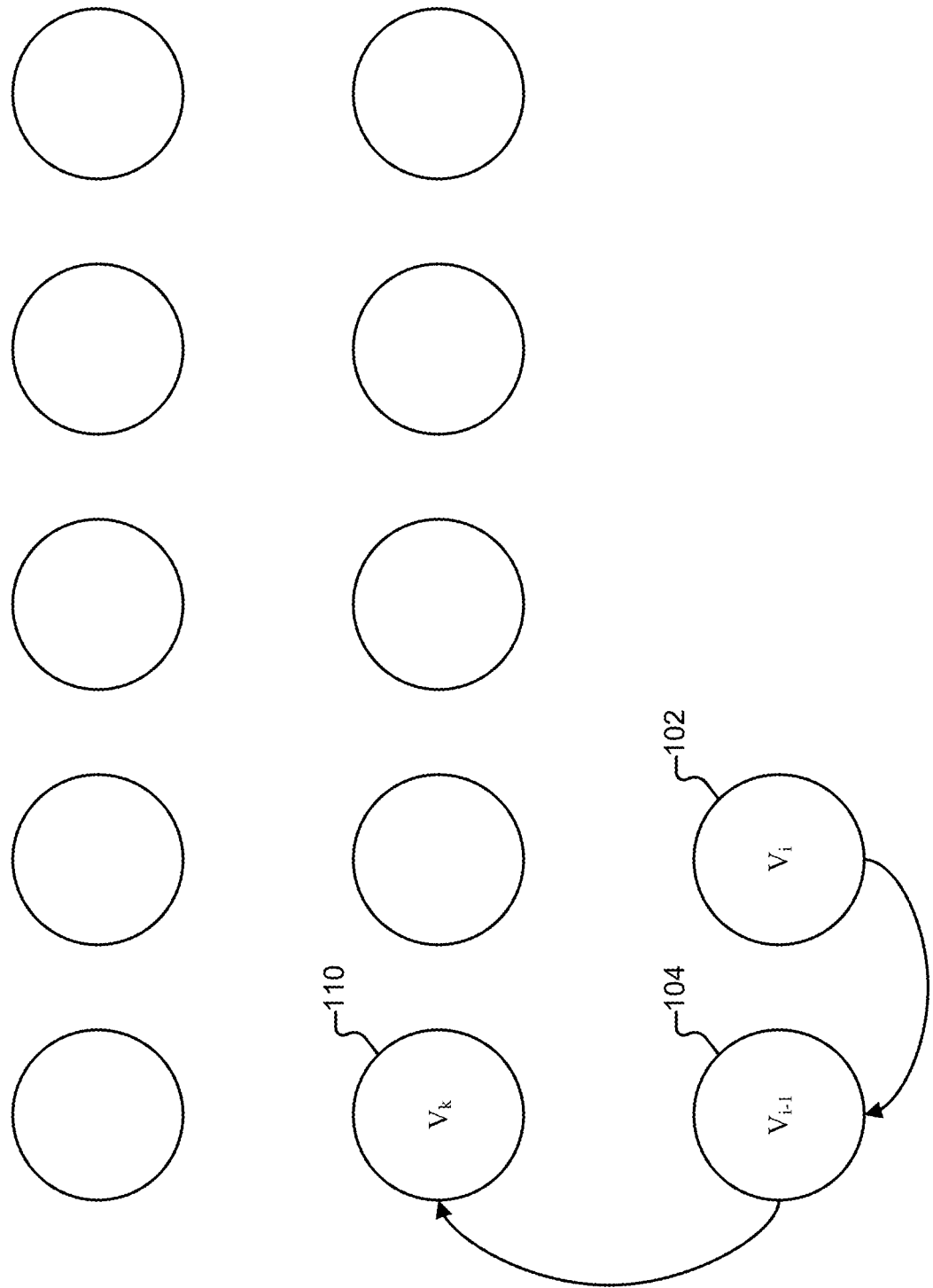
FIG. 1B illustrates an embodiment of a robust and secure Proof of Space protocol.

Now consider the example of FIG. 1B. FIG. 1B illustrates an embodiment of a robust and secure Proof of Space protocol. As will be shown in further detail below, such a scheme prevents hybridization/cheating by heavily penalizing compression.

In this example, suppose that again, the proof of space is to determine the value of node 102, $V_i$. However, this node has been compressed by the user (e.g., where compressed in this example refers to excluding some nodes from storage). In this example, in order to compute the value of node i ($V_i$), then the predecessor (104, node i–1) is examined, where the predecessor has a value ($V_{i-1}$). The predecessor's value will then indicate a position of the next cell/node to look at. In this example, the next node is k (110). The value of node k ($V_k$) is then used to compute the value of $V_i$.

In other words, in this example, in order to determine the value for node i, $V_i$, a hash of $V_{i-1}$ is first computed. This provides a new position, k. The value of node k ($V_k$) is then hashed to obtain $V_i$. Hashing is but one example of a function that can be used to transform the node values. In this example, rather than a normal graph with parents, the graph shown in the example of FIG. 1B has a predecessor (node i–1) and a godparent (node k) (a predecessor may also be considered a godparent, in some embodiments). In contrast to the example of FIG. 1A, in which the number and position of parent values needed to be stored is known (and the worst-case computation is known), the hash functions described in FIG. 1B act as a pseudorandom number generator, where the positions of the godparents are not predictable (since the position of the godparent is dependent on the value of the predecessor node).

In this example there are two godparents (where the predecessor is considered a godparent as well in this example), but the techniques described herein may be variously adapted to have any number of godparents as appropriate.

Figure 1C:
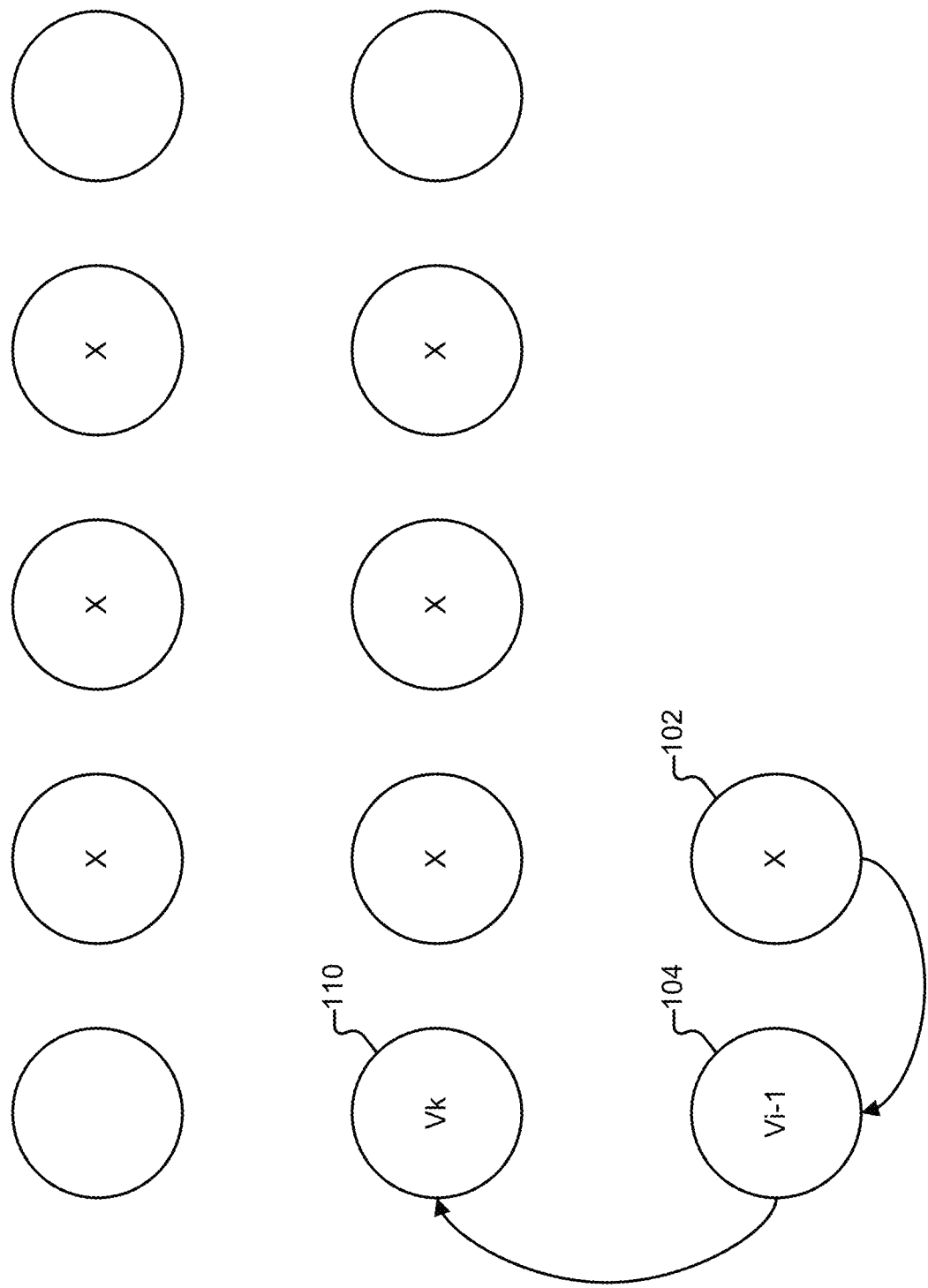
FIG. 1C illustrates an embodiment of a compressed graph.

Now suppose, as shown in the example of FIG. 1C, that the user wishes to perform compression. FIG. 1C illustrates an embodiment of a compressed graph. The nodes with an "X" in the example of FIG. 1C are those nodes that are being compressed—that is, they are not being stored (e.g., they have been erased). In this case, if these nodes are asked for, then this is problematic, as that value must be computed (if the node had not been erased and was stored, then the value could be obtained with a simple lookup, without performing any computation). Suppose that the value of node 102 (node i) is being asked for, but has been erased (and thus, $V_i$ is not available, and must be computed). Based on the above godparent search, the value of the predecessor must first be obtained. In this example, the user is fortunate in that $V_{i-1}$ has been stored. Now the hash of $V_{i-1}$ is computed, which produces node index value k. Here, again, the user is fortunate in that $V_k$ has been stored. Now the value $V_k$ can be used to compute $V_i$. So, in the example of FIG. 1C, the user did not lose anything from the fact that they did not store all of the nodes of the graph. Despite having erased node 102, the user had been fortunate or "lucky" to have stored the needed godparents (and not erased them).

Figure 1D:
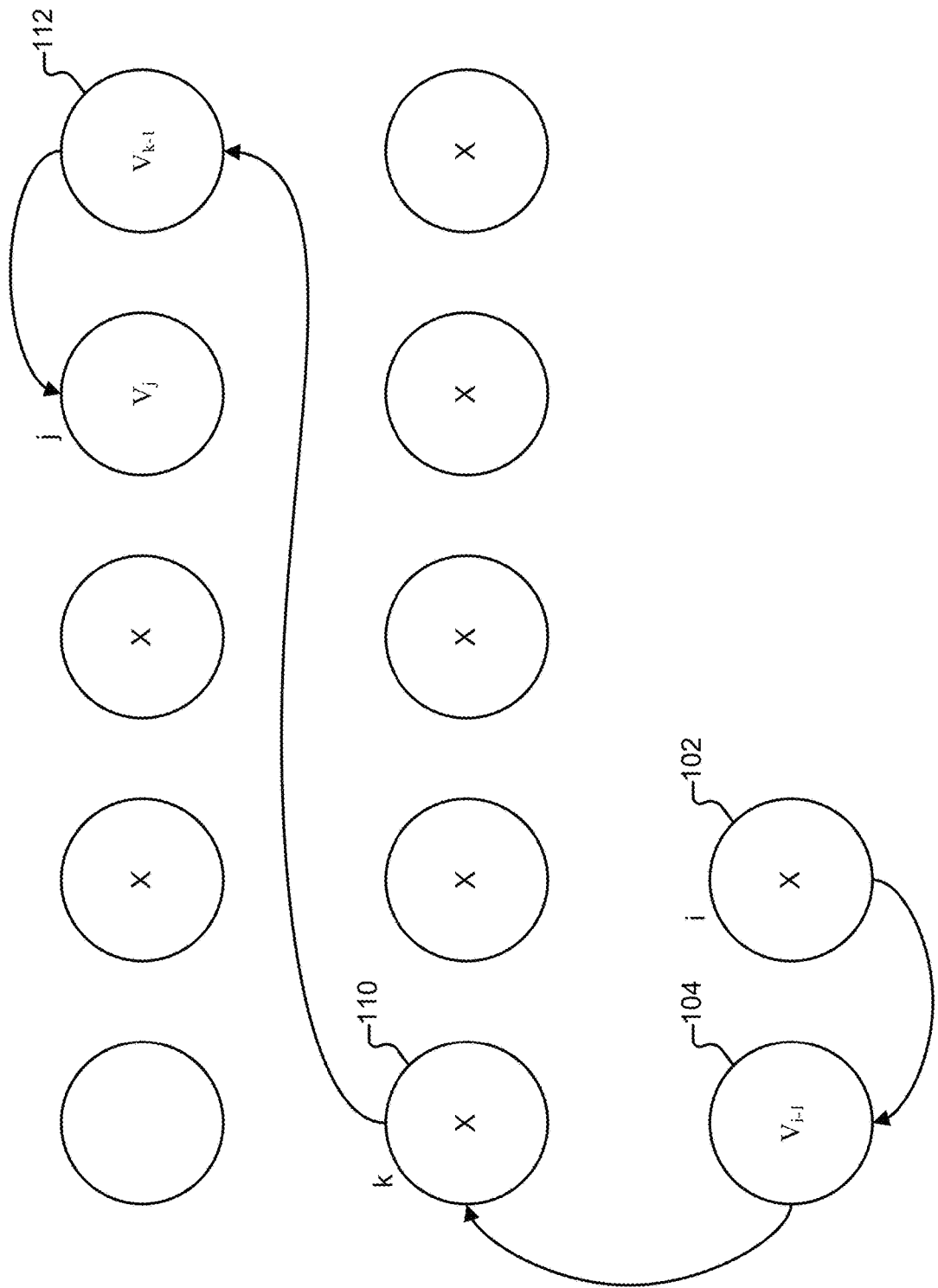
FIG. 1D illustrates an embodiment of a compressed graph.

Now consider the example of FIG. 1D. FIG. 1D illustrates an embodiment of a compressed graph. In this example, suppose that the user has become greedier and decided to compress the graph even more (i.e., erase and not store even more node values). In this example, as compared with the FIG. 1C, the value of node k, $V_k$, has also been removed. Again, in this example, the user is being challenged to provide the value $V_i$, but because it is not stored, must therefore look at $V_{i-1}$, which the user is fortunate to have. The hash of $V_{i-1}$, points to node index k. However, node k has been erased, meaning that $V_k$ must be computed. In this example, a similar process is performed to determine $V_k$, where the value of the predecessor (e.g., first godparent) k–1 (112) is determined. The value $V_{k-1}$ is then hashed to obtain position j (godparent of $V_k$), which is downstream. Fortunately, the user has the value of node j, $V_j$ is read and hashed to obtain $V_k$. Now that $V_k$ is known, $V_i$ can also be computed. In this example, $V_{k-1}$ had been stored. However, if the user had been unfortunate and did not have $V_{k-1}$, then the recursive godparent searching process would have to have been performed as well to obtain the value $V_{k-1}$ (which would again require the values of two godparents in this example), resulting in further computation, This is referred to as an "avalanche." That is, when a user has not stored a needed value, this may cause a computation to be performed to determine another value, which if also not available, causes another computation to be performed, thereby setting off an avalanche of computations.

In this example, to determine a node's value, the values of two downstream (e.g., by index position) nodes (predecessor/godparent(s)) are needed. A first godparent is the immediate neighbor/predecessor, and a second godparent is another downstream node that is prior to the first godparent. In this example, as described above, the immediate neighbor (also referred to herein as a "predecessor node") is considered as a godparent, but need not be (e.g., predecessor nodes and godparent nodes may be considered as separate types of nodes). Further, while the predecessor node in this example is the node immediately prior to the node of interest (at index position "i"), it need not be, and the predecessor node may be specified as any node that precedes the node of interest (e.g., the node that is two positions down from the position of the node of interest, three positions down, . . . , N positions downstream, etc.).

Now suppose that instead, a sequence of three godparents is needed (there are no limits on the number of godparents in this algorithm to generate a result/challenge value). Compared to the above example of FIG. 1B-1D, there is another step to obtain a third godparent position, and then the value of that third godparent node must be obtained (e.g., by lookup if it is stored, computed recursively if not stored).

If there are three godparents instead of two, then there are two things that may happen. The first thing that happens is that the chances of setting off an avalanche are greater. Instead of two values being needed, there are three values that are needed to be stored (to avoid avalanche). If there is a failure on any one of those three values (i.e., any one of those three values is not stored), then there could be additional failures, as more values are needed. Thus, the avalanche effect worsens the more godparents are required.

The number of godparents to require in this PoS algorithm may be determined via simulation (e.g., to simulate the avalanche effects of having different numbers of godparents. Different strategies for how to position the godparents may also be implemented, which will be described in further detail below.

Further details regarding the generation and use of graphs such as those above in applications such as mining are described below as well.

Graph Initialization and Enrollment Phase

Figure 2:
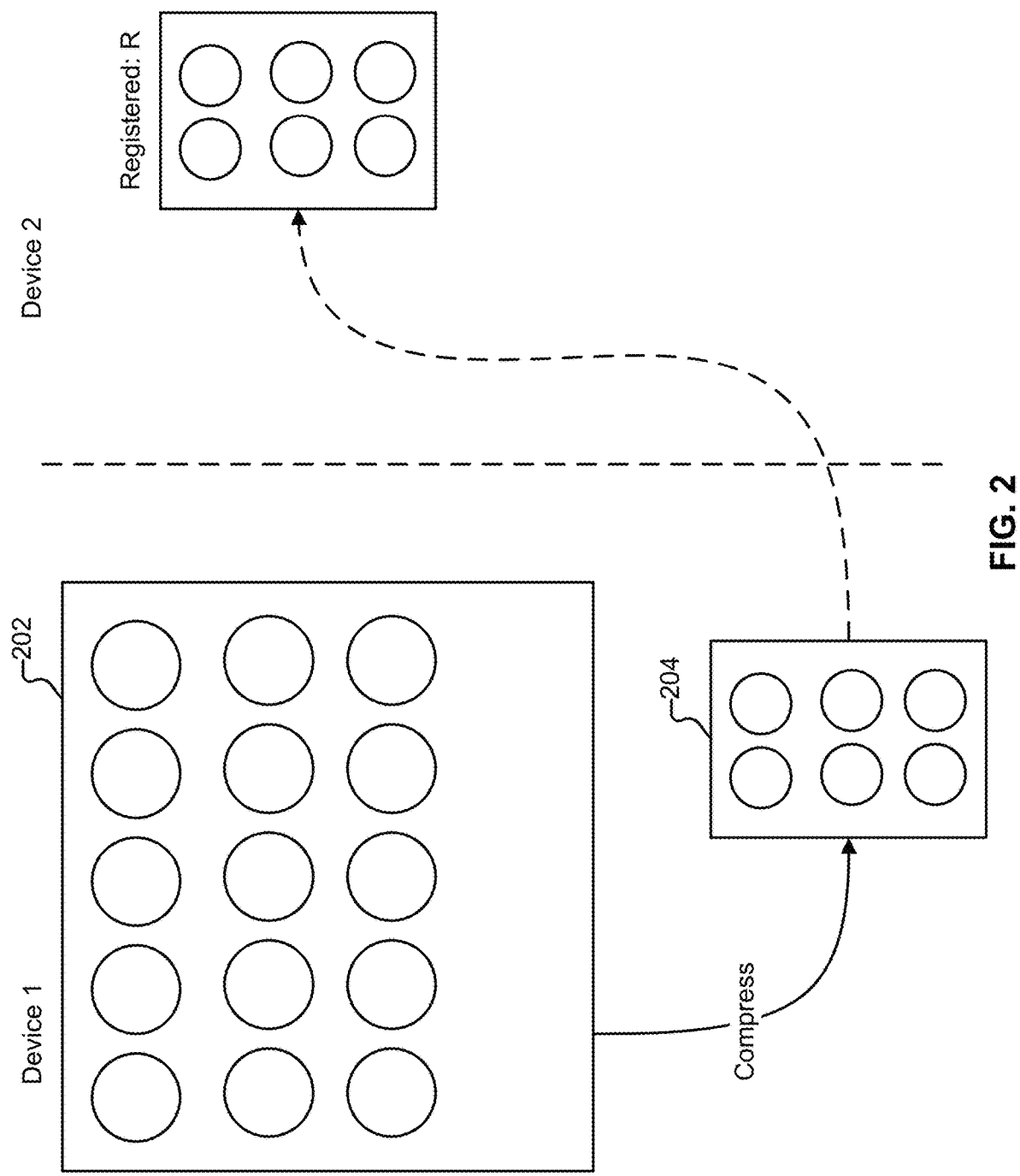
FIG. 2 illustrates an embodiment of an environment for Proof of Space based mining.

FIG. 2 illustrates an embodiment of an environment for Proof of Space-based mining. Suppose that Alice would like to participate in mining. Alice may have one or more devices, with different computational abilities (e.g., such as a laptop and a phone, where the laptop has a more powerful processor than the phone).

Graph Generation

In this example, Alice generates a graph such as those described in conjunction with FIGS. 1B-1D. Generating the graph includes computing nodes, where bootstrapping may be involved. For example, the graph is produced starting with a set of random numbers (e.g., the values for the first few nodes, which may not have godparents). In some embodiments, the graph is generated iteratively, one node at a time, where the value of one node in the graph is dependent on the values of previous/downstream nodes in the graph (any of which could be godparents at challenge time). For example, as described in the recursive godparent computation scheme above with two godparents, the value $V_i$ for node i is determined based on the values of two godparents. The first godparent is the immediate predecessor to node i (node i−1). The second godparent is the node at a position that is determined based on the value at the first godparent. The values for the first and second godparents are used to generate the value $V_i$. Thus, the graph is gradually built. In some embodiments, there is a size requirement for the graph (e.g., that it should be at least one megabyte large). Other guidelines for the graphs may also be enforced. An example of the full generated graph is shown at 202.

Graph Storage/Compression

After generating the graph, Alice then stores the graph. As part of storing the graph, Alice also has a way of deciding how to compress the graph (if she wishes to do so). However, she is only able to compress to a certain extent (otherwise the likelihood of avalanche will be great). As referred to herein, compression refers to the act of selecting nodes to store/not store. Various schemes may be used to decide how to compress the graph. As one example, as will be described in further detail below, nodes that are particularly valuable (e.g., according to some set of criteria) may be selected for storage in order to reconstruct a random element of the graph later (e.g., during the challenge phase), a random element meaning one that Alice, on average, does not know.

After compression, Alice now has a smaller graph (204). Each node has a position and a value. The compressed graph may be placed on another device or the same device used to generate the graph. For example, the process of computing the graph may not be feasible or convenient for all devices, however, it might be desirable to have the compressed graph on a processing-constrained device.

Registration

Continuing with the setup/enrollment process, in some embodiments, Alice also has the graph registered. In some embodiments, registering the graph includes generating a description of the graph. One way of describing the graph is to perform a hash of it. The registration process then includes submitting the value resulting from the hash to a ledger. As one example, when registering, a Merkle tree is generated on all of the nodes of the uncompressed graph. The registration includes submitting a Merkle root for the graph that has been produced. This allows Alice to later on prove that she have some value that is submitted as an answer to a challenge. In some embodiments, Alice pays a certain cost or charge for having entered this value to indicate that the registered graph is now an existing graph. Registration of the graph need not be required.

Challenge/Mining Phase

Now suppose that during a mining phase in which Alice is participating, Alice receives a challenge. As part of answering the challenge, Alice must produce the value at node "n" of her graph and determine whether it matches a target bit pattern (according to some criteria/requirement being satisfied). If Alice is lucky, and has stored the value $V_n$ at node "n" that corresponds to the challenge (where the challenge may indicate a position of a node whose value is requested), despite compression, then the value can be immediately obtained and used to determine whether Alice has a potential winner.

As one example, to win includes taking the value $V_n$ and comparing it with a target value. In this example, suppose that the target value is 01010111101. If there is a match between $V_n$ and the target value for a certain number of bit positions (or any other criteria for determining a candidate winner), then it is determined that Alice is a candidate winner. If there is no match, then Alice is not a winner. In this example, suppose that Alice is a candidate winner. Alice then submits the value $V_n$, along with proof that the value $V_n$ corresponds to the registered graph. As one example, suppose that as part of registration, a Merkle root of the graph Alice produced was submitted.

In this example, Alice submits the value $V_n$ and a claim that it is a winner. Alice also shows the value's path in the Merkle tree. In some embodiments, in a Merkle tree, in order to prove that a user has a node, the entire tree needs to be stored, or the tree needs to be reconstructed. If no compression is performed (zero compression), then the entire Merkle tree was stored and the path can be easily provided. Otherwise, all of the leaves of the Merkle tree would have to be recomputed.

Now suppose that the challenge is not about $V_n$. For example, the challenge could be to look at value number 522 and determine whether it fulfills the matching criteria. As another example, the challenge could be to determine if there are any values in the graph that satisfy the matching requirements. This is not necessarily an optimal challenge, as it would involve more work. In some embodiments, the challenge might ask to look at a particular value and determine if the graph has it. The value that is asked for would then be provided.

Suppose that the requested answer value is $V_i$, (the value at node "i", where the position "i" was indicated by the challenge, for example). Suppose $V_i$ is not stored in the compressed graph. The godparents of $V_i$ must then be evaluated in order to compute $V_i$. For example, if the value of the predecessor, $V_{i-1}$, is not stored, then it too must be computed. That means that i–1's godparents would also need to be evaluated. This would include looking at i–1's predecessor, i–2. Alice's compressed graph may or may not have that value. Ultimately, the value $V_i$ will be computed and compared to the target pattern to determine whether Alice wins or not. In one embodiment, if Alice wins, the value $V_i$ is stored.

Thus, in order to win, it is not necessarily that values need to be stored, rather Alice should be able to answer the challenge, which is to provide a value that satisfies the target requirements, along with the Merkle tree to prove that Alice generated the submitted value.

If the graph is one that cannot be compressed very much, then it is likely to be a relatively simple task to determine whether Alice wins or not (or at least matches to the candidate winner target criteria). For example, if the entire graph is stored, and the challenge is to determine whether the value at node position 212 matches the target pattern or has some target format, the value at node 212 can be looked up and compared. If there is not a match, then Alice is not a winner. The effort in this case was to perform a lookup-up.

A single look-up is very quick and not very power-consuming. Further, with a lookup (or even a small number of look-ups if a particular value was not stored and some computation was performed), the process of generating an answer is primarily bus activity.

Bus activity is typically as powerful for an ASIC as it is for a commodity computing device. Thus, if the effort is primarily bus activity, as in the PoSpace technique described herein, the ASIC does not have any advantage. Further, the speed of bus activity is comparable among commodity devices as well (e.g., between a desktop computer and a mobile phone). While the mobile phone may have less storage than a desktop computer, and less capabilities of storing multiple graphs, a user of the mobile phone may still take advantage of empty storage space it might happen to have. As generating the answer is primarily bus activity, with not much computation, then there will be more participants (who can different types of devices). Further, this protocol improves efficiency of generating answers, as there will not be as much of a drain on the battery of the mobile device (because more bus activity versus computation).

The following are further details regarding generating challenges in a crypto-payment context. The techniques described herein may be variously adapted to accommodate other types of applications, as appropriate.

Suppose that there is a ledger, and the last entry in the ledger has a value, X. Now, in order to determine the challenge, suppose that the hash function H is used to take the hash of X. Suppose that the value Alice registered for her graph is R (where, for example, the value R is the root of the Merkle tree for Alice's graph). Suppose that in addition to Alice, there is another user, Bob, who would also like to participate in mining. As part of enrolling/setup, Bob also generates one or more graphs, which will also be used to provide answers when performing mining. In some embodiments, Alice and Bob have different graphs (e.g., because if they had the same unified one, they would just be racing each other). Bob's R value for his graph would be different from the R value for Alice's graph. A single user may also have multiple graphs, each with their own distinct/unique R value.

A challenge is generated (e.g., by a verifier) for each of Alice and Bob, using, for example, the respective R values of their respective graphs. For example, the R value for Alice is used with the value X to generate a challenge C and a target T.

In this example, the challenge indicates what node to pick (e.g., C indicates a node position/coordinate/location in a graph), and the target indicates the target pattern to match to.

This is but one example, and there may be variants. If Alice has registered multiple graphs, then for each graph, a hash of the value X and the registered value R for a given hash is used to generate a C and T value. That is, in this example, each registered graph has its own C and T value. An answer is generated for each graph, and it is determined whether any of the graphs have supplied answers that are potential/candidate winners. For example, each graph looks at the value at node position C that was provided for the given graph. The value at the node position is then obtained and compared to the T value provided for the given graph. If there is a match to the target T, then a potential winning answer has been identified, and it is submitted. For example, for a specific graph, suppose that the corresponding C is the node position 201. The graph has a potential winner if its bit pattern (value) at node 201 has the target pattern among its least significant bits. If it does, then there is a potential winner; if not, then it is not a winner. If the graph has node 201 stored, then a lookup is performed to obtain the value. If the graph does not have node 201 stored, then it is computed, as described above. As described above, if too much compression is performed (and not enough nodes are stored), then avalanche is likely, resulting in a computational task that will blow up to compute the value (e.g., potentially taking hours or even days to compute, exceeding, for example, a timeout period for responding to the challenge). In the meantime, someone else will answer the challenge, and the user who has not stored the nodes will lose.

If multiple candidate winners are submitted, then additional requirements may be applied as a tiebreaker to ensure that there is only one winner. One example of such a tiebreaker is the use of Hamming weights. As one example, the submitted potential winner with the lowest Hamming weight wins. As another example, the value most similar to X wins.

In the above example, both R and X were used (e.g., hashed) to determine C and T. In other embodiments, C and T are generated without using R, and a hash of only X is used. In this case, where X is the latest entry, once miners see the ledger entry, they then know what X is and can compute the next challenge C. All miners might receive the same challenge now (e.g., node position 201). Thus the $201^{st}$ element or node of each graph is checked to determine whether it has the target pattern T. In this case, there is a benefit that a hash for every registered graph need not be recomputed. This makes the scheme less proof of work, because the value of the challenge node position is computed once, and then a (massive) number of lookups for the $201^{st}$ elements of all graphs is performed.

In this example, suppose that Alice had stored 100 graphs. Alice may store the first element of all those 100 graphs in one block, store the second element of all those 100 graphs in a second block, and so on. In response to the challenge for the value at the $201^{st}$ node element, Alice can perform a very quick and efficient lookup of the $201^{st}$ block to obtain the $201^{st}$ values for all of the 100 graphs that she has registered. Alice can then immediately decide whether or not any of her graphs won, and if so, which one (not every graph will necessarily be a winner, as the value of the challenge node for a given graph may not meet the target criteria).

In some embodiments, the length of the target determines the difficulty of mining. Suppose that the length of the target is 6 bits. This means that there is a 2^6 probability of winning. The difficult could be made adjustable, changing over time. That is, for example, the targets can change in size. For example, the difficulty could be based on the inter-arrival time of various events, thereby having an auto-feedback-loop. In this way, if there are too many participants, then the challenge can be made longer (and more difficult).

In this example approach, in some embodiments, a graph is akin to a lottery ticket, and answering the challenge includes determining whether a graph has a value at the challenge node position that matches to the target bit pattern. If so, then the owner of the graph has a potential winner. Compression may be analogous to folding the lottery ticket, where the more that it is folded, the more unfolding (i.e., decompression, and therefore work), will need to be done to determine if the graph has a potential winning value, during which time somebody else is already likely to provide an answer (and cause the compressed graph to already lose, since there may be a time limit on the amount of time it takes to generate an answer). Thus, it is in the best interest for a user to be able to immediately determine, as quickly as possible, whether any of the user's graphs has a winner.

In some embodiments, the target value is zero length, in which case any answer would match. That is, to answer, the user need only provide the challenge value. This is their effort, in which case they would succeed. This could be done to provide proof that they have stored the graph. It can also be proof that first, the user registered the graph, and second, that they kept it.

In some embodiments, having a target of non-zero length (as described in the examples above) adds another requirement that the user also be "lucky" in answering the challenge (e.g., the user not only provides a challenge value, but the challenge value also happens to meet the target). More "luck" is needed based on the length of the target. For example, in some embodiments, "luck" is relevant to mining, as mining depends on registering, storing, and being fortunate to have a challenge value that happens to meet the target value. Thus, having the requirement of matching a non-zero length target is akin to a storage-certified lottery. Thus, the non-zero target length condition provides a mechanism by which to assign resources to a user (e.g., to allow them to access or use some resource) based on a registration and a potential luck component. Any type of resources could be assigned. For example, it could be that two people wish to communicate at the same time, but they are not allowed to, so they must go through the storage-certified lottery, and whoever is lucky enough to have a challenge value that meets the target is able to do so.

There are some applications in which "luck" is not relevant. For example, applications such as sending messages do not require this "luck" element. In some embodiments, the ability to send messages pertains to registering and storing, and there would not be a need for a target at all.

Positioning Godparents

Described below are further details regarding positioning godparents.

Figure 3A:
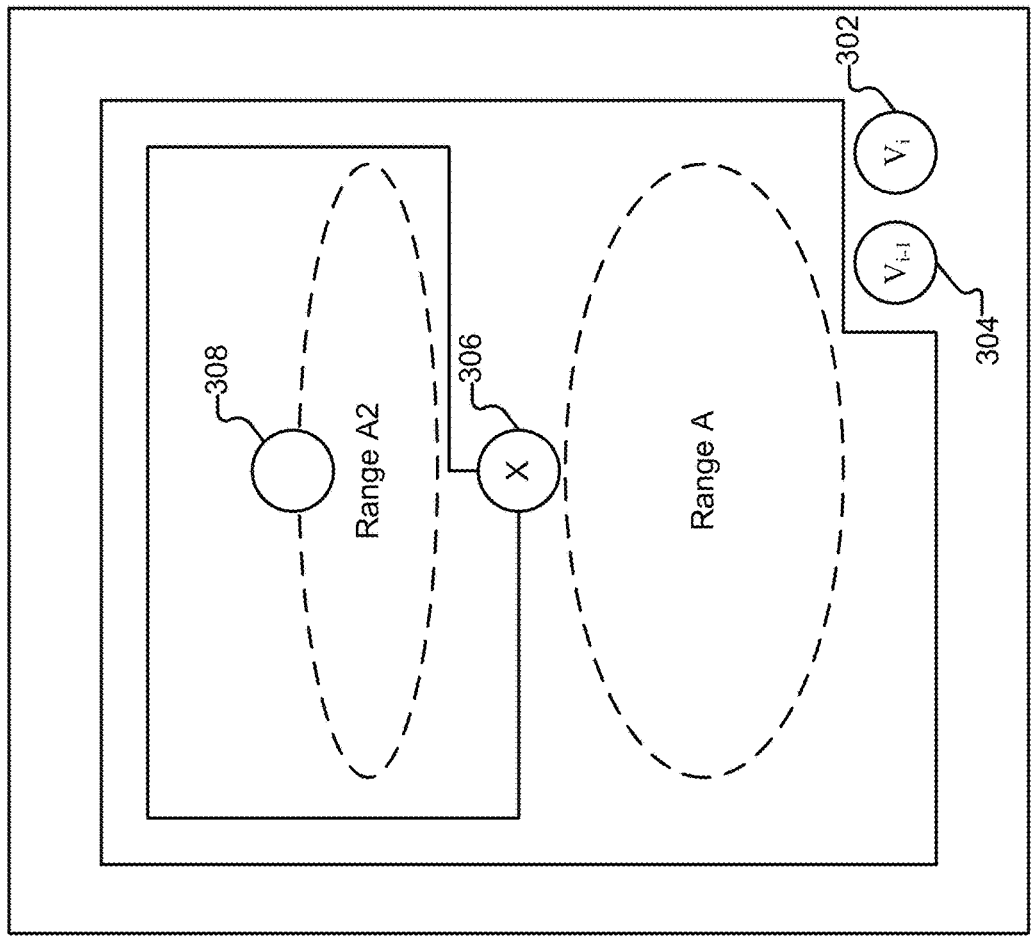
FIG. 3A illustrates an embodiment of a graph.

FIG. 3A illustrates an embodiment of a graph. In this example, suppose that there is a value $V_i$ (302) for which it is desired to be computed. Three different example strategies of choosing the location of the second godparent will now be described in FIGS. 3A-3C. In these examples, all of the strategies begin with taking the predecessor node value, $V_{i-1}$ (e.g., with the "predecessor" being considered as the first godparent). $V_{i-1}$ is then hashed. This hash then provides another location (second godparent location/position). The second godparent may be positioned to be anywhere downstream of the first godparent. There are various strategies for determining how the godparent should be placed in that downstream region.

In the first example strategy shown in the example of FIG. 3A, the location of the godparent is uniformly distributed in the downstream region. That is, the second godparent could be anywhere in the downstream region, with equal likelihood. In this first example choice, on average, the location of the godparent is at the half-point of the entire region downstream from $V_{i-1}$, at 306.

Now suppose that there is one miss, and it is at 306 (the node was not stored as part of the compression). Thus, the value of node 306 is to be computed. In this example, the immediate predecessor is the first godparent, which is then used to determine the location of the second godparent. In this first example scheme in which positioning is uniformly distributed, the average (or expected) second godparent node will again be the halfway point, but for the region that is downstream of node 306's predecessor (where this region is referred to as the branch for the first godparent of node 306).

As shown in this example, if a user has not stored very much of the graph at all, the (expected) number of times that the user will hit this until they are at the very end of the graph is a log function (e.g., binary).

Note that the position of the second godparent is a hash of the value of the first godparent. A hash of a value may be a bit string, but the space between the first predecessor (e.g., $V_{i-1}$) and zero (first element of the graph) might not be a power of two. For example, suppose that it is desired to compute the value of node 12, $V_{12}$. There are 11 values downstream of node 12. This is not a power of two. Obtaining a uniformly distributed value in this range may be difficult and costly to achieve. If it is un-uniformly distributed, however, there may be a heavier distribution at the bottom, which may not be optimal.

Alternatives to the first, uniformly distributed approach of FIG. 3A are described below in conjunction with FIGS. 3B and 3C.

Figure 3B:
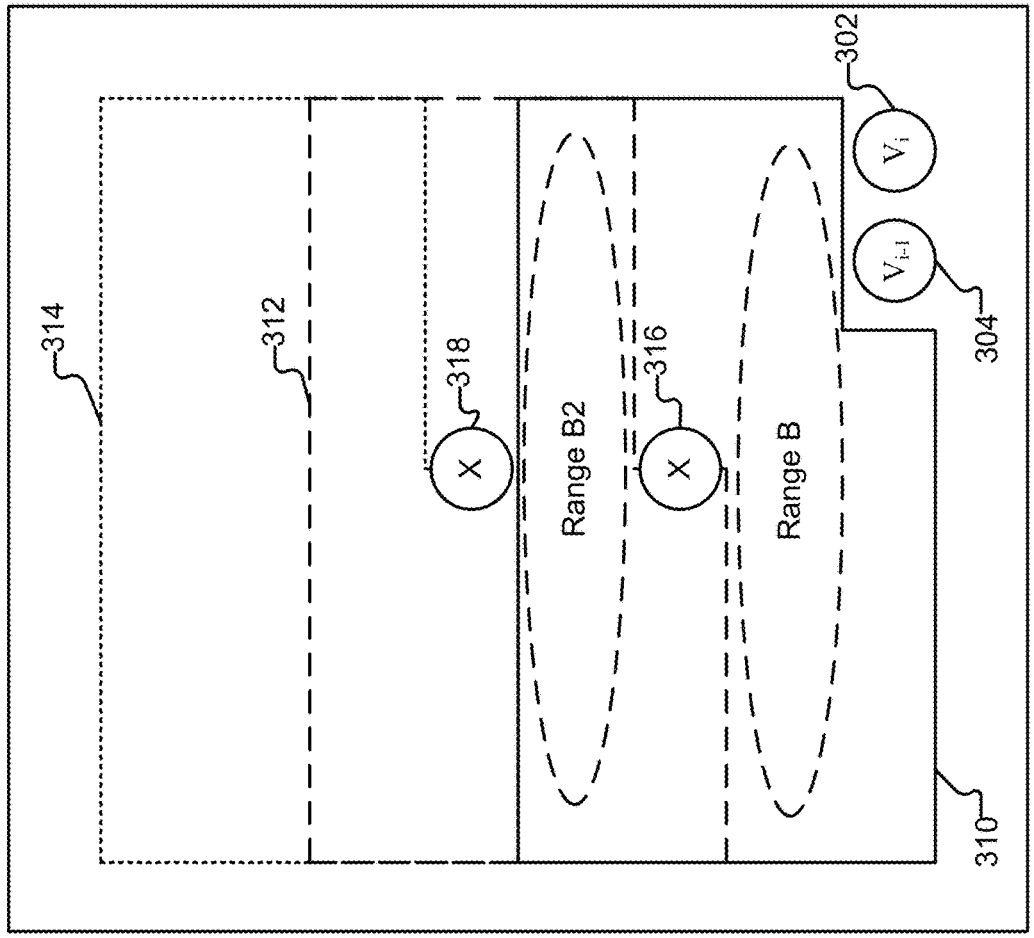
FIG. 3B illustrates an embodiment of positioning godparents.

FIG. 3B illustrates an embodiment of positioning godparents. In this example, the second godparent of $V_i$ (based on the hash of $V_{i-1}$) is not uniformly distributed in the entire region downstream of $V_{i-1}$, as in the example of FIG. 3A, but is localized to a region 310 (solid line) that is approximately half the remaining downstream space. That is, the position of the godparent is biased so that it is more likely for the godparent to be closer to the challenge position (node i). The space is largely half and is a power of two (in terms of number of elements in the region). Thus, uniform distribution is not needed. Also, it is automatic and efficient to perform. Note that as the node element positions get smaller (and closer to, for example, the first element, node 0), the remaining downstream regions will also become smaller. In other embodiments, the downstream region in which a godparent may be is a fixed size of node elements.

For example, suppose that the space is of size 256 elements. This space can be defined by taking eight bits of the hash value (e.g., of $V_{i-1}$). The average or typical/expected node position in region 310 is the middle (the element at 316). Now suppose that value is a miss (was not stored during compression). Then the range of values for the godparents for the node (316) will be in region 2 (312). Region 2 also has a midpoint (the node element at 318). And if that value is one that is not stored, then region 3 (314) would have to be evaluated for godparents to determine the value of the node 318 that is the midpoint of region 2.

As compared with the example of FIG. 3A, the regions in which the godparents may be is smaller (and not the entire region that is downstream of the first godparent), and are shifted upwards, and thus, the number of potential computation steps increases.

This means that if the user has not stored much (e.g., absolutely nothing), in the solution of FIG. 3A, then the computation to obtain needed values to answer a challenge is log in the steps that are performed, where the region to be evaluated is halved each time. Therefore, the penalty would be that log number of steps until reaching an actual endpoint value (e.g., first 5 elements of the entire graph). The answer is then generated from that endpoint value by successively computing node values.

In the solution of FIG. 3B, the penalty is much worse in comparison to that shown in the example of FIG. 3A. For example, in the solution of FIG. 3A, the user, on average, did not need to compute all of the values in range A, which can be disregarded. The range can be disregarded, because on average, the godparent will be somewhere in the middle of the range, meaning that values upstream of that midpoint can be disregarded, and there is no problem if they have not been stored. Since the value of X (306) cannot depend on the values in range A (since the value of X can only depend on nodes that are downstream in this example), the user can victoriously decide that they do not need to compute those values in Range A (which is half the space between the endpoint value and node i−1 (304).

However, looking at the solution of FIG. 3B, if the node at 316 is a miss, then the range that the user does not have to compute, Range B, is a much smaller area. In other words, the solution of FIG. 3B causes more suffering for those users that have not stored much of their graph, which translates to a larger avalanche.

Figure 3C:
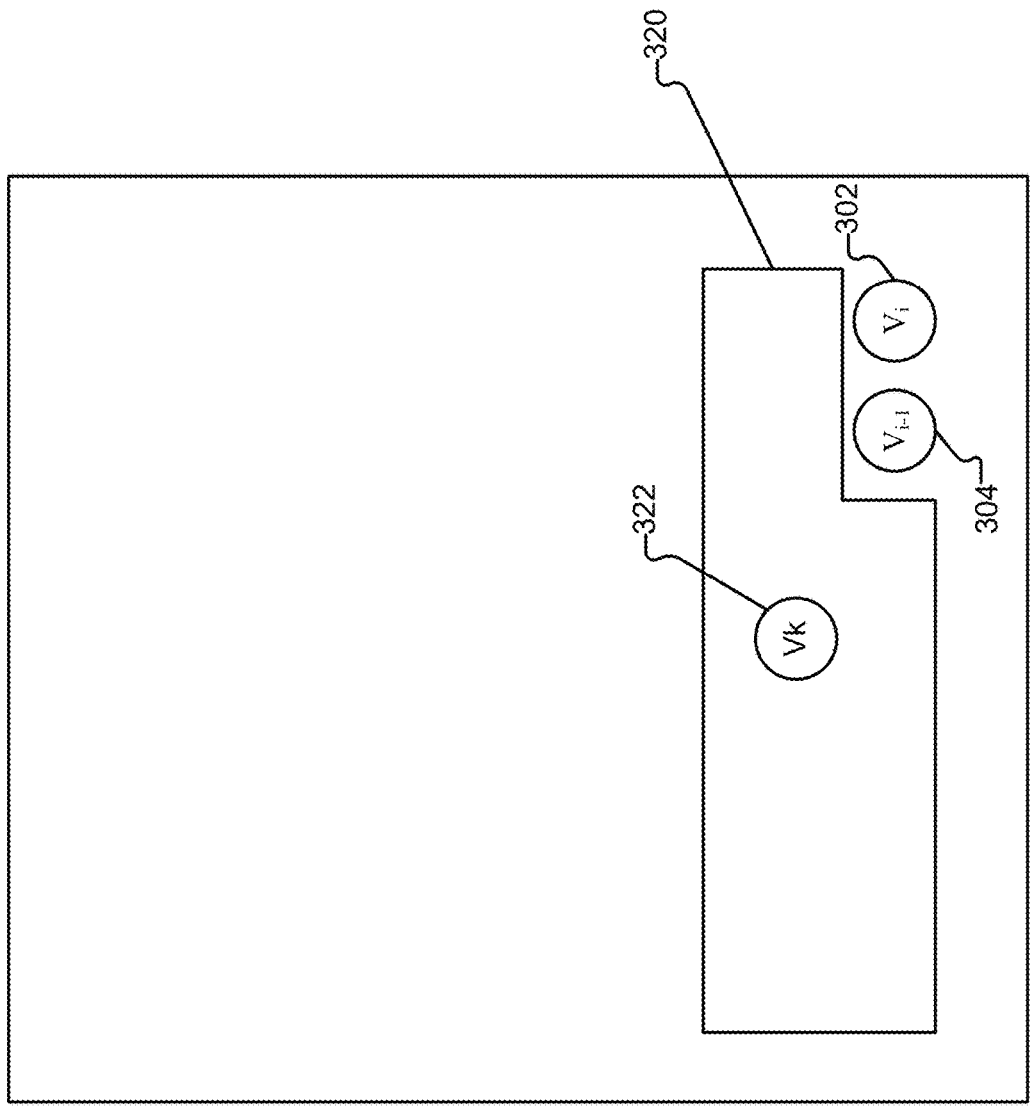
FIG. 3C illustrates an embodiment of positioning of godparents.

FIG. 3C illustrates an embodiment of positioning of godparents. This example is a version of what is shown in the examples of FIGS. 3A and 3B. As in the other examples shown in FIGS. 3A and 3B, suppose that the value to be computed is $V_i$ (302). This requires computation of $V_{i-1}$, (predecessor of $V_i$), the hash of which identifies the position of the second godparent (where the predecessor is being considered as the first godparent in this example). Here, the second godparent is in a region that is approximately one quarter of the entire space downstream of the first godparent/predecessor, node element i−1, and that is a power of two. That is, when performing the hash of $V_{i-1}$, the resulting hash value will be used to determine a second godparent that is in a region that is roughly a quarter of the space downstream from $V_{i-1}$. This is in contrast to the example of FIG. 3B, where this space had been approximately half of the space downstream of $V_{i-1}$.

Thus, the example solution of FIG. 3B is referred to as the "half" solution, the example solution of FIG. 3A is referred to as the "full" solution, and the example solution of FIG. 3C is referred to as the "quarter solution". Thus, as shown in the examples of FIGS. 3A-3C, the regions that are to be evaluated (for identifying second godparents or the godparent whose position is dependent on the value of the predecessor node) are becoming progressively smaller. Also, the portions that may be disregarded (on average) are also smaller, which is indicative of greater avalanche effects (i.e., user is penalized more for storing less/disregarding more elements). Further solutions (e.g., $\frac{1}{8}^{th}$ and $\frac{1}{16}^{th}$) could also be utilized to cause worse avalanches.

Thus, as shown in the example of FIGS. 3A-3C, there are different selection strategies of where godparents are found (which can change the likelihood/penalty of avalanche).

Returning to the "quarter" example of FIG. 3C, to compute $V_i$, a hash of $V_{i-1}$ (predecessor/first godparent) is computed. Additional inputs may be included in the hash function, such as "i" (node position). The hash value of the predecessor/first godparent provides a location that is mapped into the quarter space 320. For example, the node element "i−1" indicates the total number of elements downstream of "i". A quarter of that size is then taken. The hash value that uses $V_{i-1}$ as an input provides a location for the godparent $V_k$ (322). A hash that takes $V_k$ as an input is then used to obtain the value $V_i$.

While a hash that takes just $V_k$ as input could be performed, there are additional benefits to also including as input into the hash function the element identifier "i", as well as which is the previous godparent. That is, whatever context is available is used in determining a next value, whether the next value is the next position for a godparent, or it is the value that the user actually wishes to compute.

One reason for adding such contextual values is that where the answer computation process (to compute a value) goes from $V_k$ will depend on where the computation came from. This increases the complexity of sneakily deciding to not save certain elements (e.g., cheating by compression). If a user decides that an element is not worth saving, it is harder to do so when there are multiple ways of getting to the element. Thus, one example strategy for computing a value is to take a hash of everything that is on the path of the decisions computed so far. So, when starting with $V_i$, there is not only the value of $V_{i-1}$, but also "i" itself. Those two values are hashed together to obtain position "k". Now, in order to compute the next godparent or the value $V_k$, the contextual values on the path to "k", such as $V_{i-1}$ and "i" are also used. In this way, the computation of the next value is path dependent.

Figure 3D:
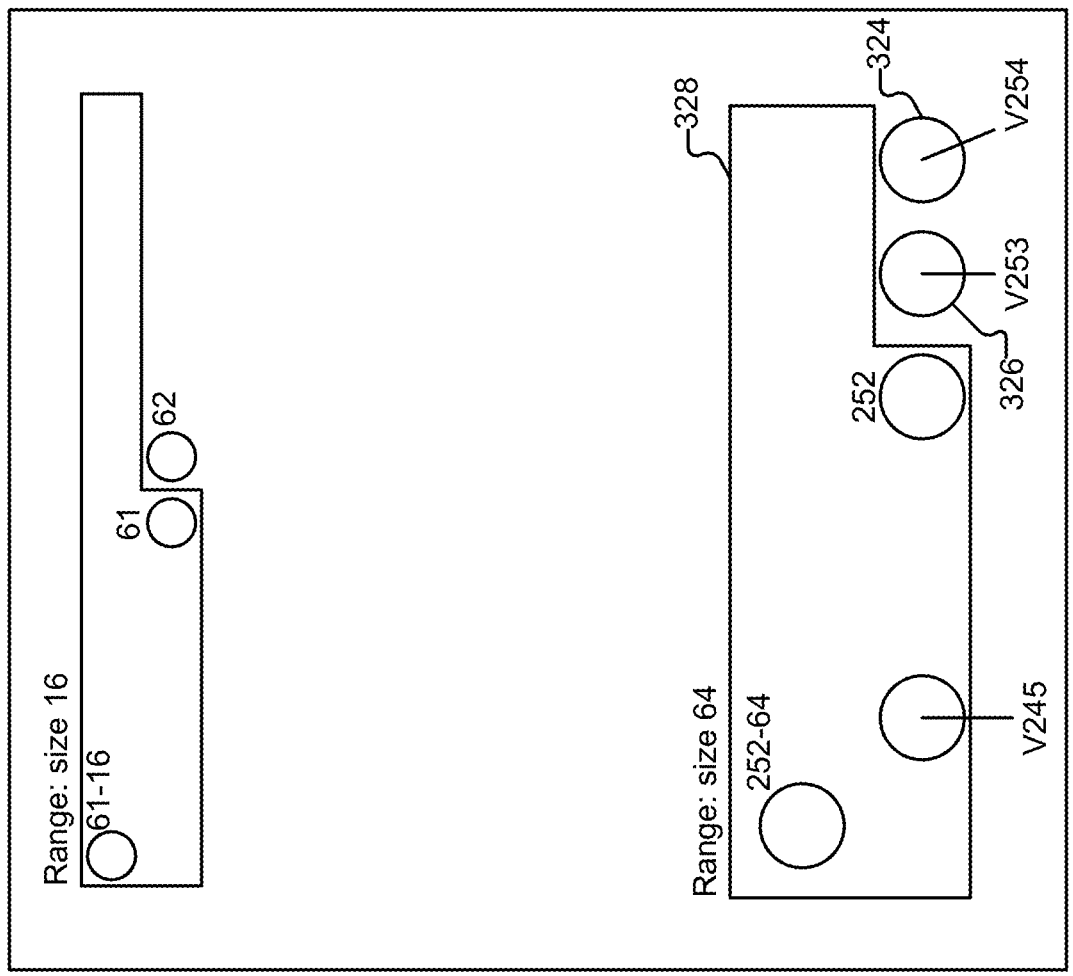
FIG. 3D illustrates an embodiment of godparent selection.

FIG. 3D illustrates an embodiment of godparent selection. In FIG. 3D, a numerical example of the strategy shown in FIG. 3C ("quarter" solution) is shown). In this example, suppose that it is $V_{254}$ (324) (value of node 254) that is to be determined. Suppose that node 254 has not been stored. Thus, node 253 is evaluated (predecessor that is the first godparent). In this example, suppose that $$V_{253}=51$$

Now suppose that the position of the second godparent is determined by performing the following hash that uses the values 51 and the index "254" (for the element whose value the user wishes to compute). In this example, suppose that $$h(254, 51)=111001100111001$$

In this example, using the selection strategy of FIG. 3C, a "quarter" range is to be evaluated for the second godparent, where the range to be evaluated is the quarter of the total region downstream of node 253 that just precedes node 253.

The closest power of two to 253 is 256, or $2^8$. Thus, the range is to be ¼ of $2^8$, which is $2^6$=64. Therefore, since the predecessor is element 253, then the next downstream value is 252, and the lower bound (element number) of the quarter range is 252−64=element 188. Thus, the second godparent (or next godparent after predecessor node) is to be selected from the range of elements 188-252 (range 328 in FIG. 3D). As there are 64 nodes in the range, a value that is 6 bits long should be used to choose the position of the second godparent. In this example, the last 6 bits of the bit string resulting from h(254, 51) are taken. This is the bit string 111001, whose value is 57.

Thus, the second godparent is at the $57^{th}$ of the 64 positions in range 328. In this example, this is the node at position 245 (determined by computing 188+57). Now that position 245 has been chosen, the value of node position 245, $V_{245}$, is to be determined, whether it is to compute the next godparent or to compute the value that the user is looking for.

As shown in this example, the range that the next godparent will be in is dependent on the node value being computed. That is, the range changes based on where in the graph is being searched for a next value.

For example, suppose that the value to be computed is for node element 62. The next closest power of 2 is 64, which is $2^6$. A quarter of 64 elements is 16 elements. Thus, the next godparent is in a range of 16 elements, where the range is from element 45 (computed by determining 61−16=45) to element 61.

As shown in the progression of godparent selection strategies from FIGS. 3A-3C, the portions of the graphs that can be disregarded, on average, by a user (and therefore not stored by the user) shrinks/becomes smaller, increasing the likelihood and penalty of avalanche effects. This prevents or otherwise discourages cheating by compression, as a cheater would want the sum of the sizes of all ranges that are disregarded to be big. A winning strategy for a cheater is to never store something that is going to be in a space that is disregarded by their queries (e.g., for node values when answering a challenge that specifies a challenge node (e.g., by position))—that means that they are never going to need it. Conversely, the losing strategy is not to have stored a node that will be needed. By using the techniques described herein, the likelihood of being successful as a cheater decreases as the size of the disregarded spaces decreases. If a cheater's strategy is to compress as much as possible (i.e., store as little as possible), at some point this will incur a large penalty due to the large amount of re-computation required to obtain an answer value for the challenge node. The penalty is that the cheater will lose the challenge because of the long amount of time (e.g., hours) needed to re-compute various node values, at which point the system will have already moved on. The cheater will then have lost.

Additional Details Regarding Compression

Described below are embodiments of approaches for compression in the improved PoSpace technique described herein.

A first approach of compression is to not perform any compression. That is, a user stores everything. Another approach is to store a portion of the graph (some of the nodes). Described below are PoSpace compression techniques/criteria for deciding what nodes to store/not store (if compression is to be performed).

Figure 4:
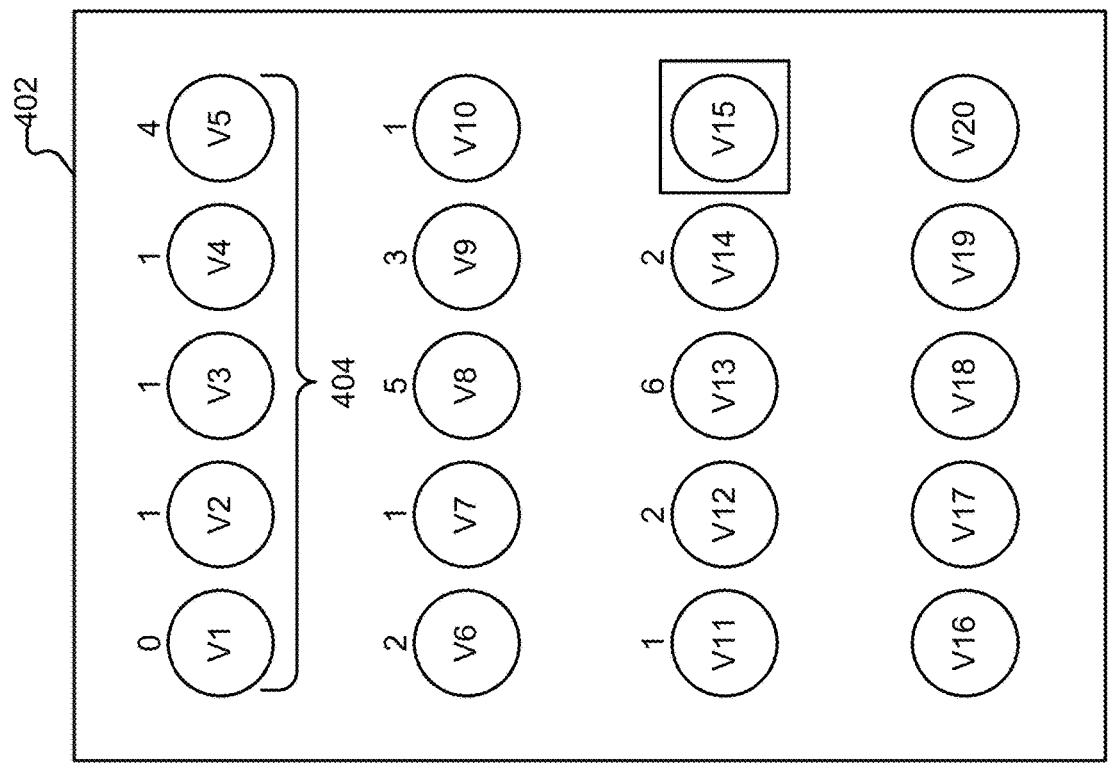
FIG. 4 illustrates an embodiment of generating a graph.

FIG. 4 illustrates an embodiment of generating a graph. In this example, a simplified graph (for illustrative purposes) is shown that has 20 nodes. In this example, when generating a value for a node position in the graph, the value is generated based on previously generated node values. However, the first several nodes (e.g., first five nodes (404)) may be computed in a different, special way, since the recursive process of generating the values cannot be performed indefinitely. For example, the first five values (404) may be pseudo-random values (or any other base case). Now in the next round, suppose that $V_6$ is being computed. $V_5$ is needed (as it is the predecessor and first godparent). In this example, $V_5$ is used to identify position 3, to obtain $V_3$. Now, the value of $V_5$ is computed. In some embodiments, the count of the number of times that a node is touched or accessed or used in the graph generation process is recorded. For example, to compute $V_6$, both nodes 5 and 3 were touched/had been accessed. The count of accesses for nodes 5 and 3 are both incremented by 1. After $V_6$ is computed, the value for node 7, $V_7$, is computed. Again, the value of node 6, $V_6$, is accessed (because node 6 is the predecessor/first godparent), to determine the position for the second godparent, whose value is used to compute $V_7$. Those nodes that were accessed have their access counts incremented by 1. After $V_7$ is computed, then $V_8$ is computed, and the nodes that were accessed in computing Vg have their counts accessed as well, and so on.

As shown in the example of FIG. 4, where the counts of the number of times a node was accessed in computing node values when generating the graph are shown above each node, not all nodes are necessarily needed the same number of times. For example, $V_5$ was needed 4 times, $V_3$ was only needed 1 time, $V_i$ was not used at all (0 times), etc.

If compression is to be performed on the graph, the frequency of use of a node during graph generation can be used as one example criteria to determine which nodes are to not be stored/are to be stored. This is because the frequency of use of a node in graph generation may be indicative of the likelihood of its use (e.g., to be computed/used in a computation) during the challenge phase (e.g., to answer a challenge with the value of the challenge node). That is, the frequency of use of a node during the overall graph generation phase may predict how much that node will be needed on average in the future during the challenge phase, as the same graph may be used in a similar way. For example, based on the graph generation, nodes 13 and 8, which had the highest counts of 6 and 5, respectively, are likely to be needed frequently during the challenge phase. However, those nodes that were only used/needed once during the graph generation process are unlikely or less likely to be needed during the challenge phase.

If a user wished to perform compression and shave off, say, for example, 10% of their storage effort (the amount of storage space devoted to graph storage), one strategy for compression then is to not store values whose graph generation access counts are below a threshold (e.g., do not store all nodes that were only used once or zero times). While it is possible that one of those nodes might have to be used during the challenge phase, it is unlikely, and may be a worthwhile tradeoff. If the user wished to compress even more, than they can remove all nodes at the next count threshold (e.g., not store all nodes that were used 2 times or less during graph generation). This is an example of a step-wise compression function.

When deciding on a strategy for compressing the graph, re-computation costs may also be evaluated. The re-computation costs may be quantified in a variety of ways in various embodiments, such as in terms of number of failures, number of fetches, etc.

Figure 5:
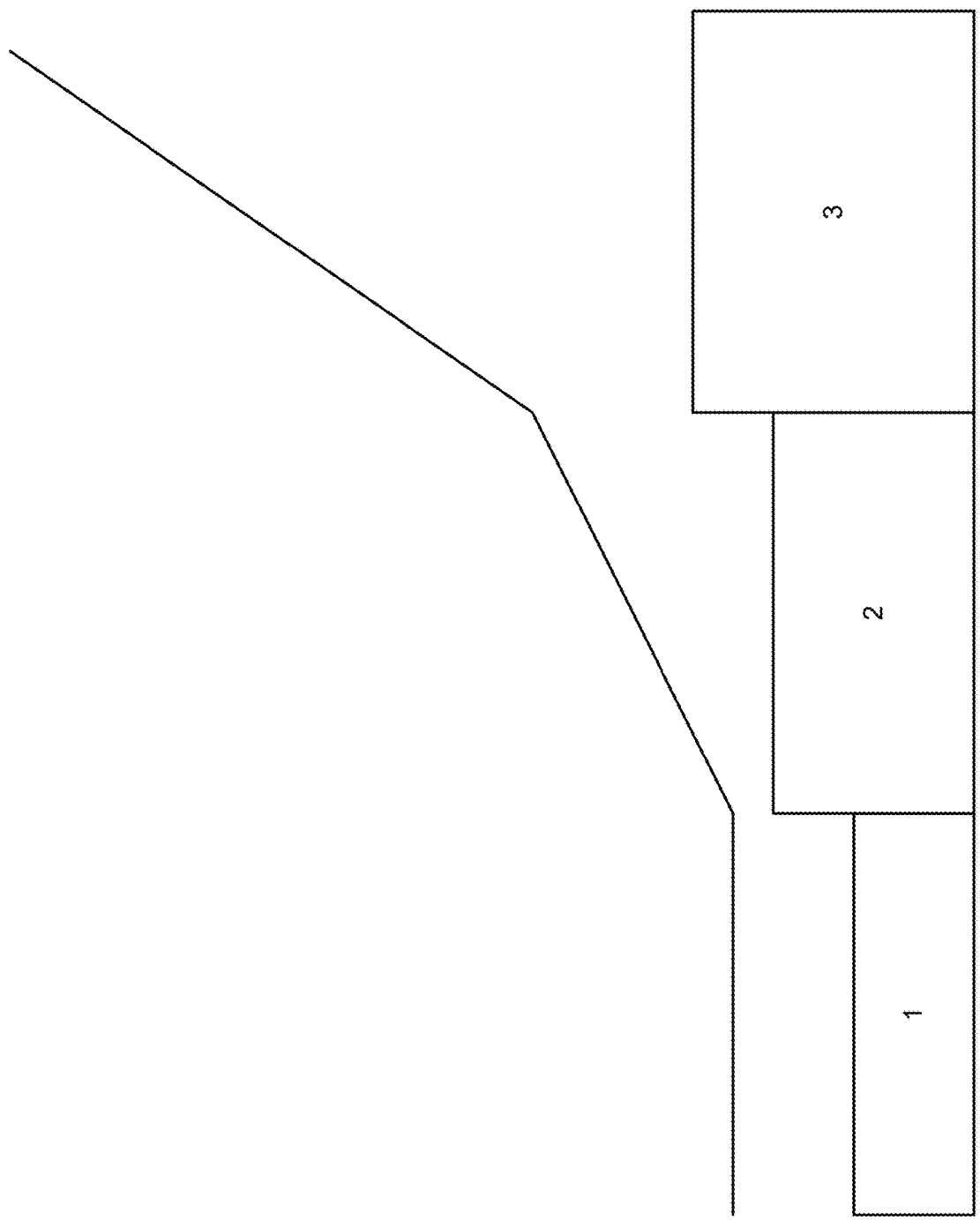
FIG. 5 illustrates an embodiment of a relationship between recomputation cost and compression.

FIG. 5 illustrates an embodiment of a relationship between re-computation cost and compression. In the example, of FIG. 5, a graph illustrating the tradeoff between re-computation cost and compression is shown. In this graph, a number of steps of compression is shown on the X-axis. The Y-axis represents computation cost, which is indicative of avalanche risk. As shown in this graph, the rate of computation cost (and avalanche risk) increases with each step increase in the access count of the nodes that are being removed.

For example, as shown, many of the nodes that were used once in graph generation can be removed, and the user is unlikely to suffer any consequences. As the user removes nodes with access counts of two, and then three, the re-computation costs increase exponentially with each step increase. Based on this measured tradeoff, a user can then determine how to compress (e.g., how many steps to compress), as well as the cost to compress.

If all users use the same size of graph (e.g., of size one million nodes), then the users will have a similar distribution of the number of nodes that were used once in graph generation, twice in graph generation, etc. This is due in part, for example, to the use of hash functions that are pseudo-random functions. One user's distribution of nodes that were used once in graph generation and twice in graph generation will be the same or similar to another user's distribution of nodes that were used once in graph generation and twice in graph generation. Thus, one user's ability to compress without great re-computation cost will be the same or similar to another user's ability to compress without great re-computation cost (and one user does not have an advantage over another user). This will incentivize different users to, for example, store in a consistent way, such as only storing nodes that were accessed three times or more during graph generation/computation.

Additional Details Regarding Cache Size

In one embodiment, the graph size should be larger than the largest typical or commodity caches (e.g., processor caches). This causes the computation to become memory bound, with the speed of the bus being the principal limiting factor. The bus speed of a very fast computer, such as a powerful desktop computer, is typically more similar to the bus speed of a not-so-powerful or relatively less powerful computing device such as a smartphone than the processing speed of the desktop compared to the processing speed of the smartphone (put another way, there is more parity between bus speeds across devices, as compared to processor speed, which may vary dramatically between different classes of devices). Thus, making computation memory bound is an equalizer that de-emphasizes the computational speed of the device (such as the desktop vs. the smartphone) and is more related to the bus. In contrast, if the graph could fit into a cache, then the user with the largest cache will win. By making the graph size exceed the largest commodity caches, then users will not be able to use only cache, but will have to use another memory level to store a graph, such as DRAM (dynamic random access memory), flash memory, hard drive, etc. This will cause bus activity. There are different speeds in bus activity and speed/latency when reading from, for example, DRAM versus a hard disk drive, where a read from DRAM is much faster than a read from a hard disk drive. To address this speed discrepancy, the time period between issuing a challenge and deciding a winner for a challenge may be set to be large enough to account for read speeds from various storage devices. For example, the challenge/winner determination can be performed on the order of several minutes. As one example, the challenge may come out once a minute. A user with faster memory may more quickly realize whether they have a potential winner or have lost as compared with a user with slower memory, but there will still be a period of time remaining before issuance of the next challenge to decide the user that is the sole winner of the current challenge (e.g., by performing a tie break). Thus, so long as the graph does not fit in the processor cache (which is extremely fast), it does not matter whether a user stores the graph on memory that is very fast or somewhat fast.

The size of the graph may be dynamically adjusted as technology evolves. For example, if DRAM becomes extremely fast, then the size of the graph can be modified to exceed the size of typical DRAM configurations.

Suppose that a user is filling out their hard drive with graphs. Now suppose that the user has a file that they would like to store, but there is currently insufficient space to store the file. The user could remove an entire graph. Alternatively, they could perform a level of step-wise compression of the graphs that they have (as described above). For example, if the user had already removed, from all of their stored graphs, those nodes that had been accessed once during graph computation, they could go to the next level of compression and remove, from all of their stored graphs, all nodes that had been accessed twice during graph generation. If this still does not result in enough space for the file, then yet another level of compression could be performed (e.g., removing all nodes that had been accessed three times during graph generation). The user can thus decide how much space they would like to devote to answering challenges. For example, even if they have only half a graph, it may potentially still be usable in some challenges, and the user can decide to keep just that half of the graph, even though it will more likely than not result in avalanche. Thus, users can fill their hard drives with these types of graphs, and the gradually remove and shrink the amount of storage space, and still benefit from them.

Applications of PoSpace.

While the improved PoSpace techniques described herein have been described in the context of mining for illustrative purposes, the improved PoSpace techniques described herein may be variously adapted to accommodate other applications, as appropriate.

For example, the PoSpace techniques described herein may be used to avoid/protect against spam. In the spam scenario, in order for a sender to send an email message to a recipient, the sender is required to provide a proof of space that relates to the message. The recipient will then determine whether the proof of space is valid (e.g., whether the value at the node challenge position, when hashed with some characteristic of the message, is less than the target, which is easily verified). For example, rather than an X value taken from the ledger in mining, the value X could be the message and the email address of the recipient (so that there is not a single proof of space for everybody). Here, the message and the recipient are used, and a challenge is computed. If the sender has the node challenge position, then answering the challenge and providing the proof of space is fast for the sender to compute, and also fast for the recipient to verify (versus a spammer, who might try to cheat by lessening the amount they store—that is, they are not committed to storing the graphs—and therefore have to perform computation rather than lookup). The sender also provides the Merkle path and an indication that the graph was registered (which might mean, for example, that there is a digital signature on the Merkle root). The recipient could then check that the Merkle path is correct and that the graph is registered.

For example, the recipient receives the email. The message and the recipient's email address are hashed together to re-generate the challenge and the target. The sender has provided their answer to the challenge and the target, relative to a particular Merkle tree that has a certain digital signature on the root. The recipient then verifies the answer by performing a set of lookups. For example, the recipient follows the Merkle path to easily verify the PoSpace answer.

As one example, suppose Alice would like to send an email to Bob. In this example, the email account that Alice has allows here the right to having five graphs, allowing them to send some amount of email. Alice associates, with her public key, her email address and one or more registered graphs. Alice needs to show that she has this graph relative to the email and to Bob (i.e., proof that she has stored something, such as the graph). If she did not have the graph, then other users would not accept/receive email from her. Proving she has the graph stored proves that she has a certain right to send emails. Bob would then verify that the sender has a certain amount of storage space, and therefore will receive Alice's email.

Wherever Proof of Work is used, the improved Proof of Space technique described herein may be used in its place. For example, if a service wished to limit the access to a resource and requires that any request is associated with a proof, whether of space or work, then the disclosed technique can be used. For example, an online ticket distributor can use the disclosed techniques to limit how many resource accesses (corresponding to holds on tickets) can be initiated from a given computational device, thereby limiting the extent to which an adversary can perform denial of service attacks on such a service or otherwise abuse the system. In this example context, each user (corresponding to one or more computational devices) can have a unique graph which they use to compute outputs to prove that they store significant portion of the graphs. Another example of a context where this can be used is as a delayed disclosure technique where one or more parties may use the same graph, and where the correctly computed response to a challenge constitutes a key or other access credential needed to access an associated resource.

Figure 6:
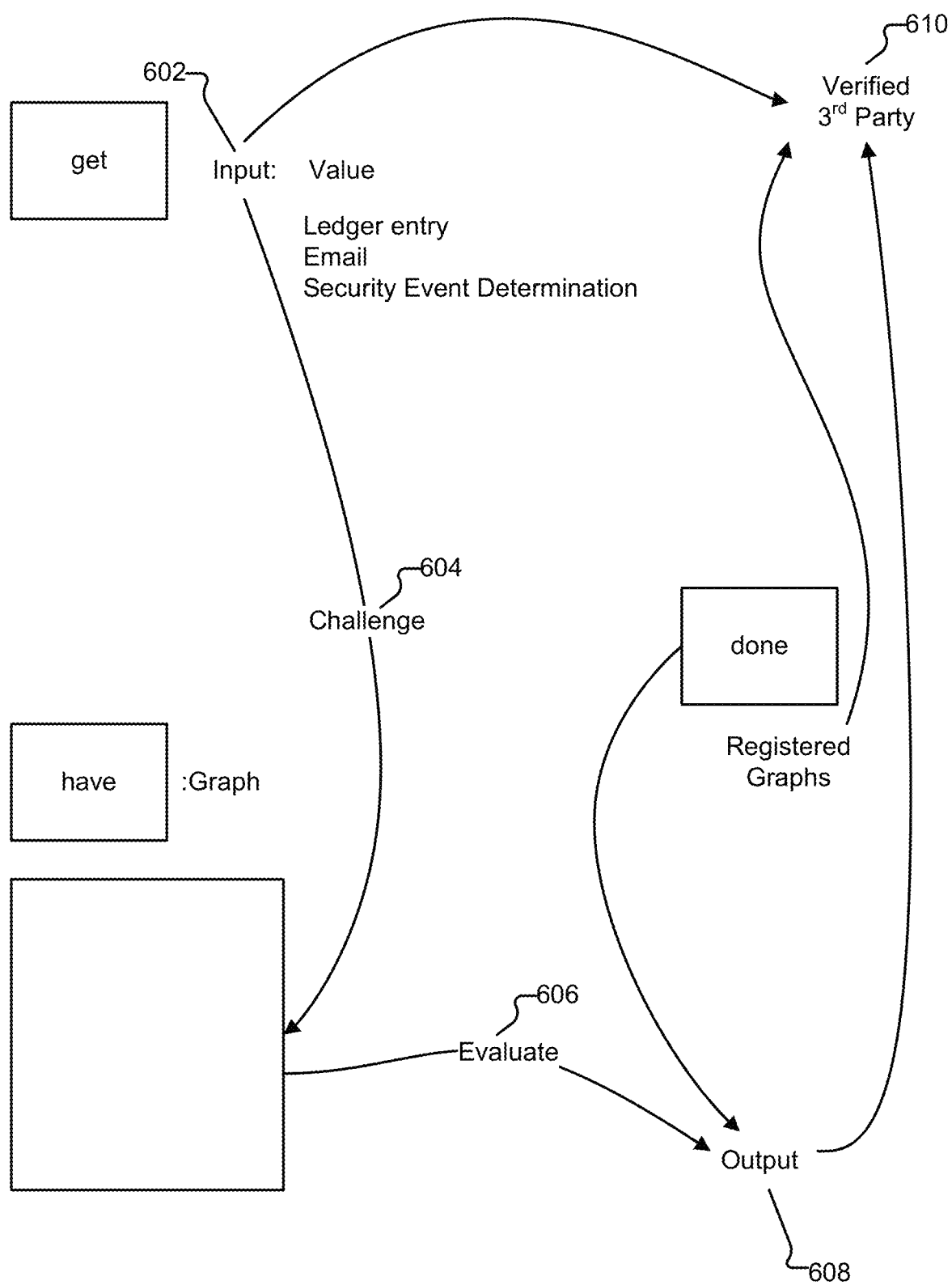
FIG. 6 illustrates an environment in which Proof of Space is provided.

FIG. 6 illustrates an environment in which Proof of Space is provided. In this example, an input value (602) is received. The value may be a ledger entry, email, some type of security event description, etc. A user also has a graph, which was previously generated and registered. The user (or some agent on a computing device that uses the graph owned by the user) takes the input and generates a challenge (604) from the input. The challenge is evaluated (606), and an output (608) is generated. The output is verified by a third party, relative to the input and the registered graph. That is, in this example, the third party receives three pieces of information—the input, some portion or indication of the registered graph (where the verifier does not have the benefit of having the entire graph), and the answer to the challenge. The verifier (610) verifies the answer using the three pieces of information.

As one example, Alice has a graph which she has registered. She receives the input, and generates a challenge based on the input. She uses her graph to evaluate the challenge in order to generate output, which is her answer to the challenge. The output, the input, and at least a portion of Alice's registered graph are sent to Bob for verification to prove that Alice has stored some piece of information (e.g., the node at a challenge position that had the value that was used to provide an answer that satisfied the challenge).

Figure 7:
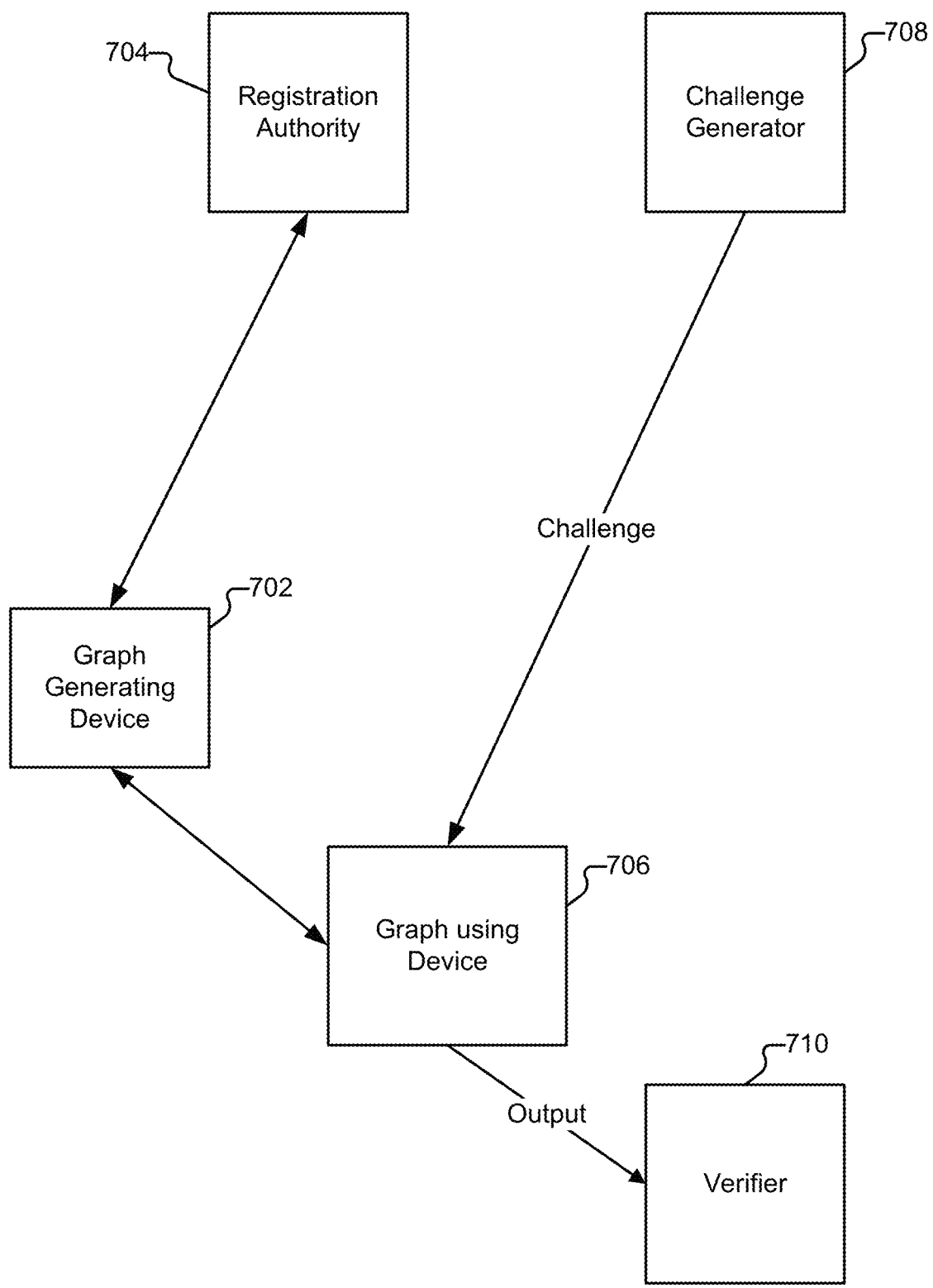
FIG. 7 is an embodiment of a system for providing proof of space.

FIG. 7 is an embodiment of a system for providing proof of space. As shown in this example, a graph generating device 702 is in communication with a registration authority 704. Device 706 is configured to use a graph generated by the graph generating device. The graph using device is in communication with a challenge generator 708. The challenge generator sends a challenge to the graph using device 706. The graph using device 706 is configured to generate an output based on the challenge. The output is sent to verifier 710, which verifies the output provided by the graph using device. The various devices and entities may communicate with each other over a network such as the Internet. In the example shown, the challenge generator and the verifier are shown as separate entities, but need not be (e.g., the challenge generator and the verifier may be the same entity).

In the example of FIG. 7, the device that generated the graph and the device that is using the graph are shown to be separate devices, but need not be (e.g., the same device may both generate and use the graph). Suppose that Alice has two devices, a laptop and a mobile phone. She would like to be able to use her mobile phone to use graphs to provide proof of space in various applications such as mining. Given the disparity in resource capabilities between the mobile phone and laptop, it may not be feasible to have the phone perform the setup/initialization of generating a graph. Instead, Alice can use her laptop to generate the graph and have it registered with the registration authority. The laptop may also be used to compress the graph to take less space. The graph (or a copy of it) may then be sent to the mobile device for answering challenges. That is, the actual answering of the challenges could be performed by a less powerful device (although the laptop could still also answer challenges).

In some embodiments, the caches used either in the graph using device or in the graph generating device should not be so large that they can hold a graph in its entirety. In other words, a graph should exceed the sizes of all caches. By having this size constraint (or minimum), users on different computing platforms, whether a mobile phone or cloud infrastructure, will not have different experiences, as even cloud computing, although having access to large amounts of random access memory (RAM), has similar (processor) cache sizes, as off-the-shelf commodity processor caches are used. As cache sizes increase as technology improves, the required minimum size of a graph can also be changed to exceed the increased cache sizes. In this way, users cannot rely on their cache. The required minimum size may also apply to compressed graphs (e.g., that graphs, after being compressed, should be at least a minimum size). In this way, cache-only solutions are disqualified. By making the graph larger than the cache, then users' cost will be to read graphs from other memory (bus activity), such as RAM, which will make the focus on storing it, so that users prefer to read, not to compute.

Figure 8:
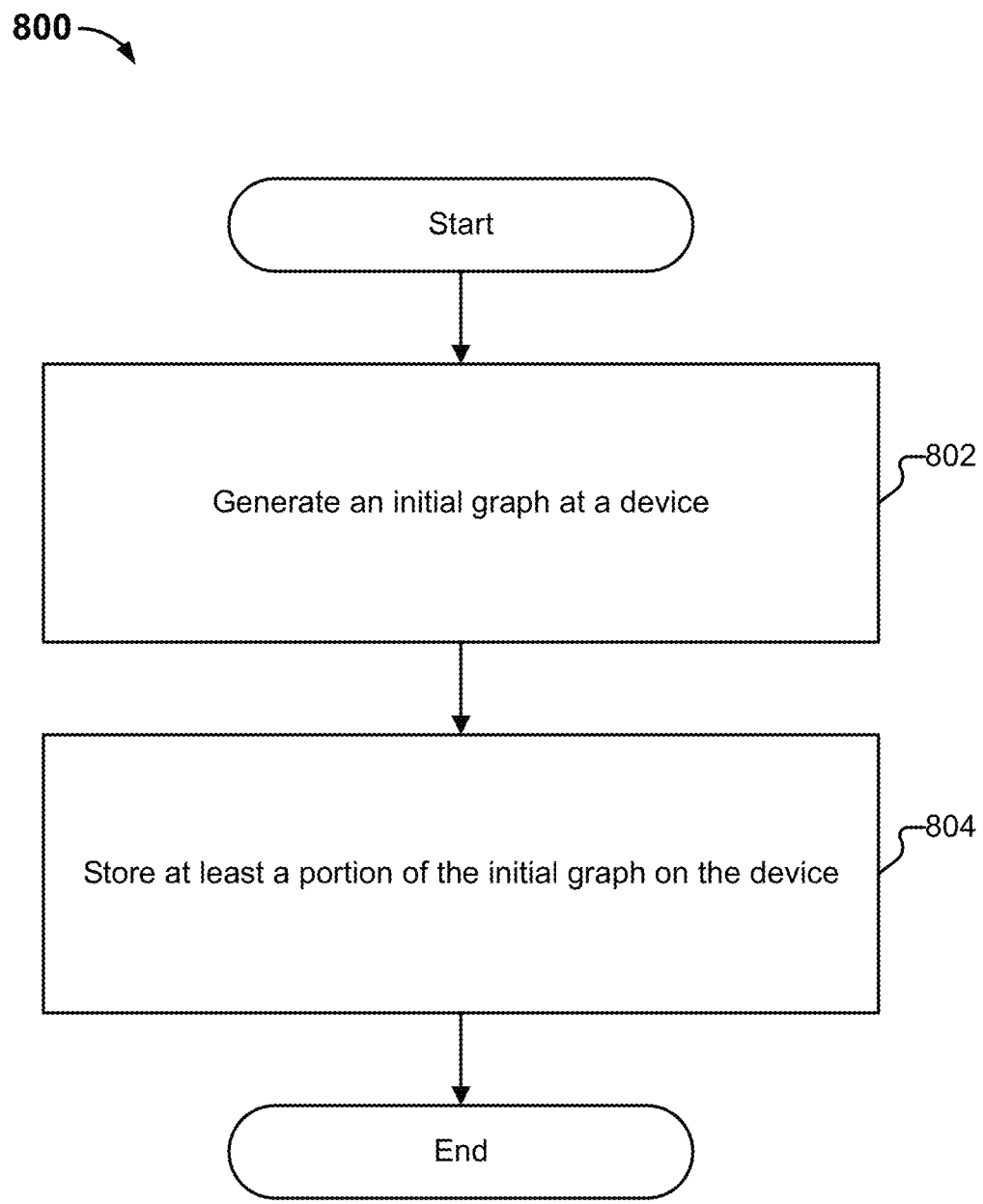
FIG. 8 is a flow diagram illustrating an embodiment of a process for initializing a graph for providing proof of space.

FIG. 8 is a flow diagram illustrating an embodiment of a process for initializing a graph for providing proof of space. In some embodiments, process 800 is executed by graph generating device 702 of FIG. 7. The process begins at 802, when an initial graph is generated at a device. In some embodiments, the graph is acyclic. In some embodiments, content (e.g., a value) of a first node is generated based at least in part on a predecessor node that is a predecessor of the first node, and a godparent node. In some embodiments, the position of the godparent node in the graph is based at least in part on content (e.g., value) of the predecessor node. The predecessor node, godparent node, and first node may all be different. The predecessor node may also be considered a godparent of the first node.

For example, a graph such as that shown in the examples of FIGS. 1B-1D is generated iteratively. For example, suppose that the graph has been generated up to node i−1. Node i is created by evaluating the predecessor (node i−1) and taking the value of node i−1 to compute the value for node i (where the value of node i−1 may be used to determine a second godparent (or more) whose value is used to determine the value of node i). Node i+1 is similarly generated based on the predecessor (node i). Thus, the graph is generated step by step.

As described above, in some embodiments, the graph is subject to size constraints imposed by a third party verifier. For example, the size constraint may be based on cache size heuristic/capabilities. In some embodiments, all graphs are subject to the same size constraints, regardless of what device they are ultimately stored on. The size constraint may change over time.

At 804, at least a portion of the initial graph is stored on the device. In some embodiments, storing the initial graph includes compressing the graph. Compressing the graph includes erasing or otherwise not storing at least some nodes of the initial graph (and thereby storing a reduced set of nodes). For example, the first node is stored, but the predecessor or godparent node is not stored. In some embodiments, compression of the graph by excluding nodes from storage is based on criteria. As described above, one example of a criterion for dropping or excluding a node from storage is based on frequency of node access during generation of the initial graph. Other strategies for determining what nodes to exclude from storage may also be used.

In some embodiments, the compressed graph is sent to a second device. For example, the graph is sent to graph using device 706 to be used. In other embodiments, the initial graph is sent to a second device, where the second device performs compression of the initial graph. In some embodiments, the same device performs both the graph generation and the compression.

In some embodiments, a representation of the initial graph is registered with a third party entity that is external to the device. For example, the generated initial graph is recorded as belonging to a user associated with the device. In some embodiments, the representation that is registered is based on a Merkle tree associated with the initial graph. For example, a Merkle root for the initial graph is submitted. In one embodiment, the nodes of the graph map to the leaves of the Merkle tree. In some embodiments, such as in a mining context, the user of the device also submits a ledger and a hash of the graph (e.g., Merkle root, as described above).

Figure 9:
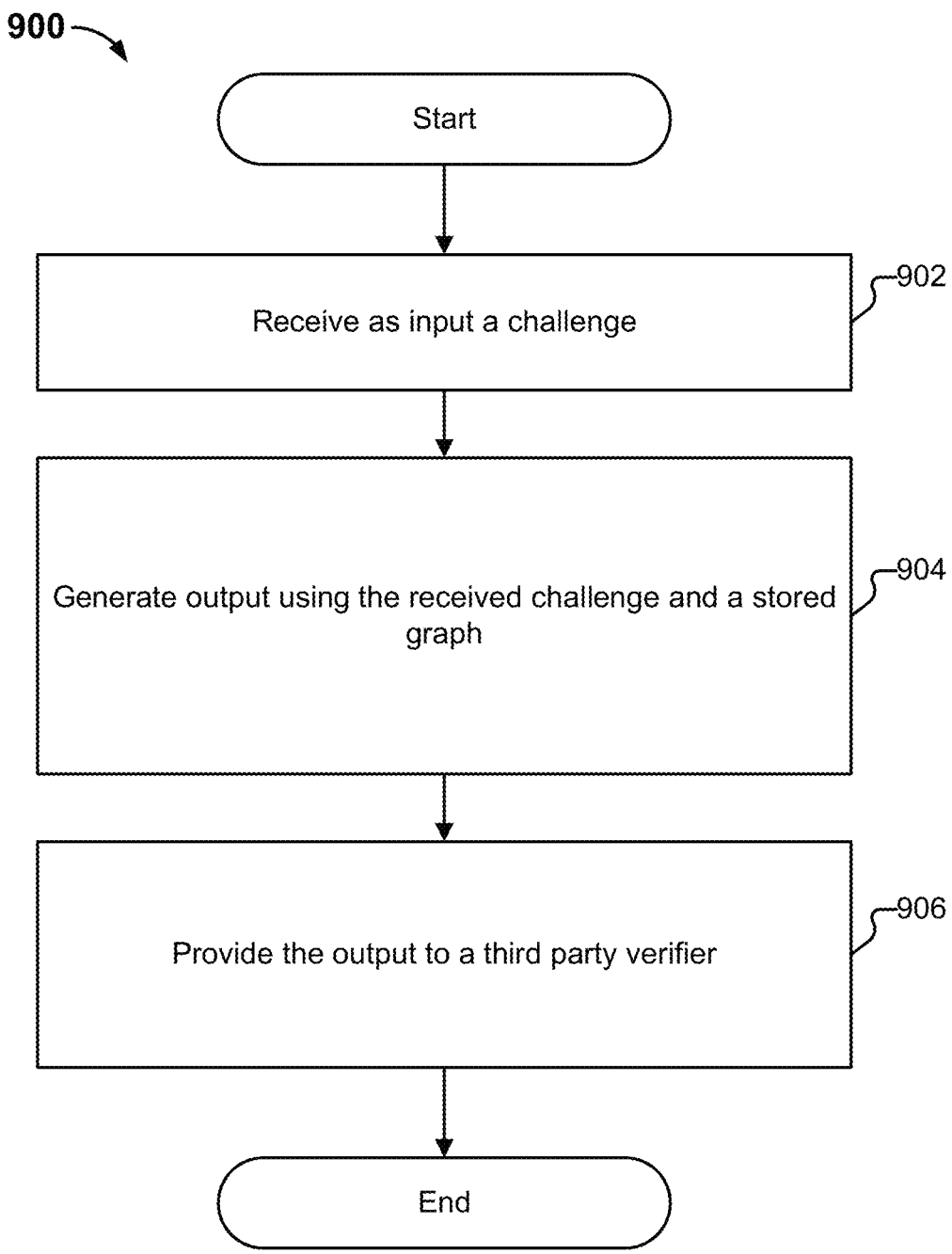
FIG. 9 is a flow diagram illustrating an embodiment of a process for using a graph for providing proof of space.

FIG. 9 is a flow diagram illustrating an embodiment of a process for using a graph for providing proof of space. In some embodiments, process 900 is executed by graph using device 706 of FIG. 7. The process begins at 902, when a challenge is received as input.

At 904, output is generated using the received challenge and a stored graph. In some embodiments, the stored graph was previously generated, using, for example, process 800 of FIG. 8. In some embodiments, generating the output includes answering the received challenge by discovering some property of the stored graph (which may have already been recorded with a consensus system), examples and embodiments of which are described above.

At 906, the output is provided to a third party verifier. The third party verifier is configured to use the output and a previously registered representation of the graph to determine whether the challenge is satisfied.

In some embodiments, providing the output includes submitting a candidate solution and claiming it as a winner. Further, the candidate solution's path in the graph may also be provided. Proof that the candidate winner corresponds to the registration may also be provided.

In some embodiments, the third party verifier has a registered representation of the graph. In some embodiments, the third party verifier does not have the graph itself, and does not need to use the graph. The registered representation may include a portion of a Merkle tree corresponding to the graph.

In some embodiments, the third party verifier receives multiple responses to challenges. The third party verifier determines which of the responses is valid. If there are multiple valid responses, in some embodiments, the third party verifier determines a single winner based on tie-breaking criteria. As one example, the verifier determines the single winner by performing Merkle tree verification relative to a challenge node selected by the challenge and that is included in the output.

In some embodiments, the challenge has an associated timeout period, and a response to a challenge is invalid if it is provided beyond the timeout period.

As one example of the processing of FIG. 9, suppose that the challenge is a question to compute the value of node i, $V_i$, and then compare that value to some target bit pattern (although target values may not be required for all challenges). It is easy to compute $V_i$ if it has already been stored (e.g., it was not erased as part of compression/storage of the graph). For example, the value could then be looked up immediately (without computation and potential risk of avalanche). If the challenge node was not stored (e.g., due to compression), then its value is computed by the device, which, in some embodiments, as described above, is based on the values of one or more predecessors/godparents of the challenge node.

After the value of the challenge node is determined, it is compared to the target bit pattern. The comparison may include criteria for being a candidate/potential winner, where multiple users may submit answers that meet the criteria (that is, a user submitting an answer that meets the criteria does not guarantee that the user will win overall). One example of a criterion is a submitted answer whose bit value is below a target bit pattern (threshold value).

As described above, there may be multiple claims from multiple actors. A winner is then selected from the pool of users who submitted answers that met the challenge criteria.

Figure 10:
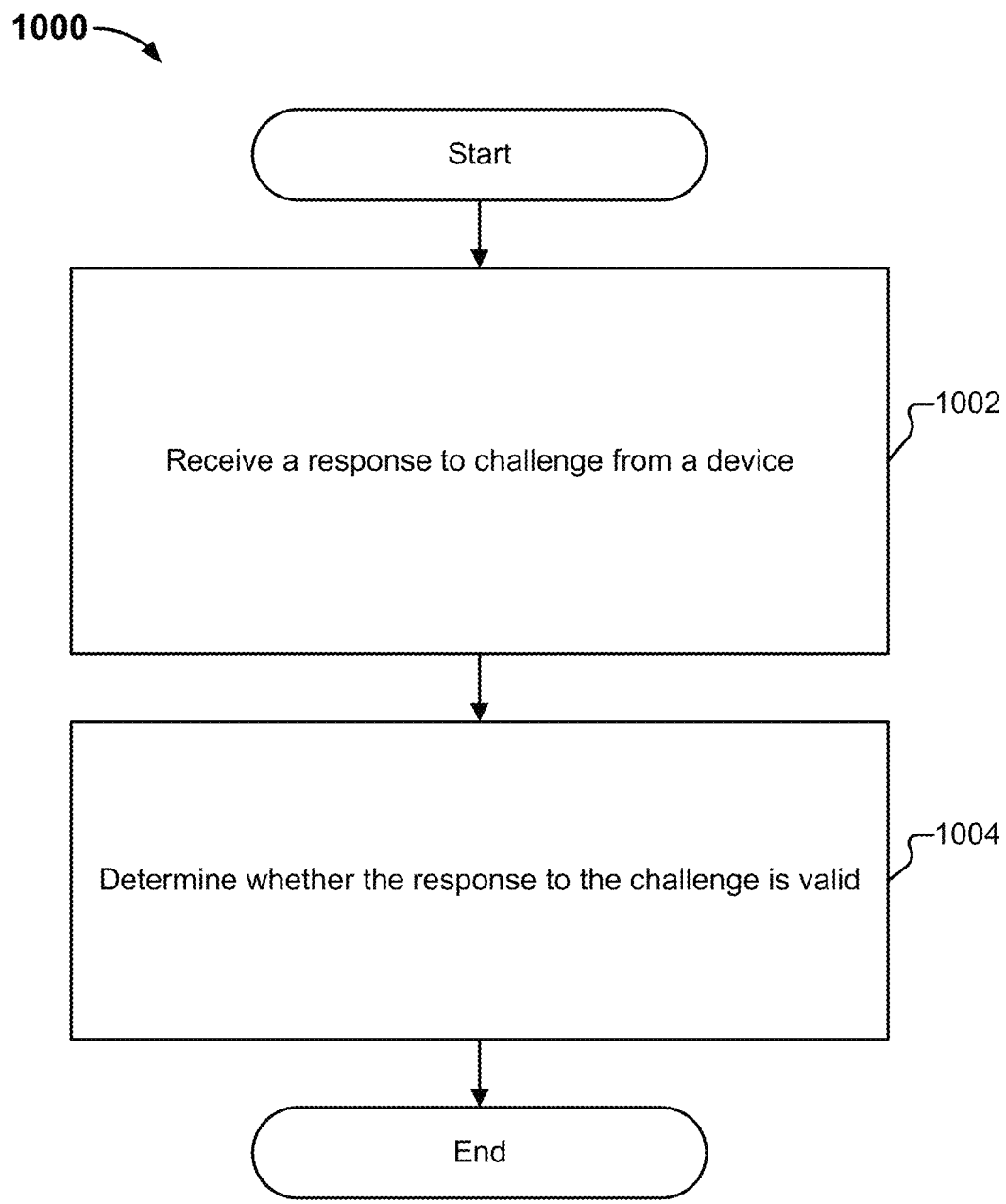
FIG. 10 is a flow diagram illustrating an embodiment of a process for verifying a proof of space.

In one embodiment, the winner is selected by assigning a score to each submitted answer. As one example, the score might indicate or be a measure of how close a submitted answer bit pattern is to the target pattern (e.g., hamming weight). The submitted bit pattern with the lowest hamming weight is then selected as the winner. As another example, the submitted/claimed bit pattern closest to today's date is selected as the winner. Other tie-breaking criteria may be used FIG. 10 is a flow diagram illustrating an embodiment of a process for verifying a proof of space. In some embodiments, process 1000 is executed by verifier 710 of FIG. 7. The process begins at 1002, when a response to a challenge is received. In some embodiments, the response (or answer) to the challenge includes a value for a node specified by the challenge. Further, the candidate solution's path in the graph may also be provided. Proof that the candidate winner corresponds to a registration of the graph may also be provided.

At 1004, it is determined whether the response to the challenge is valid. In some embodiments, the third party verifier has a registered representation of the graph. The third party verifier may use the output and a previously registered representation of the graph to determine whether the challenge is satisfied. In some embodiments, the third party verifier does not have the graph itself, and does not need to use the graph. The registered representation may include a portion of a Merkle tree corresponding to the graph.

In some embodiments, the third party verifier receives multiple responses to challenges. The third party verifier determines which of the responses is valid. If there are multiple valid responses, in some embodiments, the third party verifier determines a single winner based on tie-breaking criteria. As one example, the verifier determines the single winner by performing Merkle tree verification relative to a challenge node selected by the challenge and that is included in the output.

Proof of Space Based Mining

While the above improved PoSpace technique may be used in various applications, its application to mining is described herein for illustrative purposes. In particular, as will be described in further detail below, the PoSpace technique described herein facilitates robust, secure, fair, and affordable proof of space based mining Robust and Secure Proof of Space Based Mining Crypto currencies based on Proofs of Work (PoW) such as BitCoin, Ethereum and others cost a lot of electricity for miners, and encourages bad behavior, such as using malware to mine on other people's computers, use of dorm rooms with utilities included for mining, and more. Proof of Space (PoS) based mining proposals for cryptocurrencies have been proposed to address this problem. The existing proposals are riddled with problems. Some currencies based on PoS require large amounts of storage, which keeps small players out, or forces them to participate using mining pools. Mining pools are another source of contention, as they are rife with fraud and cheating. Avoiding the need for mining pools, accordingly, is desirable. Some crypto currencies aim to avoid the complications due to different memory sizes by supporting different denominations, where low denominations can be mined with small resources and larger denominations require greater resources, where resources in the context of PoS based protocols corresponds to storage space. However, this results in a type of grinding abuse wherein miners determine whether mining small-denomination coins, which would affect the ledger state, would affect their chances of successfully mining larger-denomination coins by way of manipulating the state of the ledger and therefore the challenges used for mining. This leads to abuse that current protocols and proposals are ill-equipped to handle. Yet further, some crypto currencies are based on hybrids between PoS and PoW (examples of hybridization described above), which causes an inheritance of problems from both approaches. It would therefore be beneficial to address this problem by developing technology to lower energy consumption for mining, enable mining for entities with vastly different capabilities, without introducing new vulnerabilities leading to abuse and inequitable situations. By addressing the problems described, and associated problems, a fair and sustainable cryptocurrency can be developed which has benefits beyond the financial transfer aspects. For example, hard drives and other storage can be manufactured and configured for instant mining and sold ready to be used for PoS based mining. This is likely to help defray costs of storage for individuals and organizations, increase sales of storage hardware, and therefore also lower the per-unit costs due an increase of the market size. A shift to PoS based mining may also reduce the incentives for malware authors to attempt to corrupt computers and other computational devices to use them for mining purposes. This is because it is difficult for a user to know whether his or her equipment is used for PoW based mining, as malicious and unwanted mining processes could automatically hide themselves as the user engages with the device, and the only trace might be an increased power bill; in contrast, the constant use of large quantities of storage is easily detected using standard screening methods, and is less easily hidden from end users. A user whose unused storage is used, by a malicious third party and without the user's knowledge, would not suffer losses in the same way a user whose system is taken over by BitCoin mining would, for example. This is because the energy cost associated with the former abuse is marginal in comparison to that of the latter scenario. There are many additional benefits associated with addressing the need of generating secure and equitable cryptocurrencies that inhibit undesirable behavior, encourage desirable behavior, and reduce energy consumption.

Moreover, fluctuations in the size of the number of crypto currency mining operators are common. There are many reasons for these, including variations in the coin value and therefore incentive to mine; competition for the attention of miners between different currencies; and the variations in mining costs. Fluctuation is a source of danger, as it enables a small number of prominent actors to dominate, and makes DoS (Denial of Service) easier. At the heart of this problem is the fact that all prominent solutions rely to some extent on Proofs of Work (PoW). Being inherently associated with computation, PoWs are tied to the cost of electric power. When the cost of mining exceeds the anticipated benefits, whether due to a fall in coin values or a rise in the costs of mining, the number of miners dwindles. Already, most mining takes place in locations with low electricity prices and cold air, or (to some extent) at the hand of malware authors using their victims' computers. Concerns about unfairness or fragility could also reduce the size of the marketplace of miners, which in turn further destabilizes the system and, eventually, increases the time to close ledgers. As mining becomes dominated by only a small number of parties, the risk of fluctuation increases, thereby posing an existential threat to the entire concept.

Proof of Space (PoS) has been touted as a potential alternative to PoW, and offers hope to address several of the aspects contributing to the structural risks described above by avoiding operational costs and pegging the mining ability to access to available disk space. This democratizes mining, and in turn, allows for a larger marketplace of miners. However, existing PoS deployments unintentionally offer a trade-off between PoW and PoS, effectively encouraging PoW-based "cheating" that cannot be externally detected. This brings us back to square one in terms of the risks posed by collusion and fluctuation. In some embodiments, to overcome these structural problems, the notion of PoW is not used in favor of an entirely PoS based scheme designed with a clear understanding of system-wide risks.

One problem affecting all existing proposals for Proof-of-Space (PoS) mining is that a cheating miner may opt not to store the entire collection of graph nodes it is expected to store, and instead store a smaller subset of these and regenerate missing nodes from the stored nodes when needed. This is a form of compression of the stored representation of the graph, and the use of such compression turns a protocol that was intended as a PoS protocol into a hybrid between PoS and Proof-of-Work (PoW). This has negative consequences, such as a larger energy requirement, and accordingly, a limit on when it is profitable to mine.

Mining cryptocurrency using PoW or hybrid PoS protocols is prohibitive on battery powered mobile devices. Further, mobile and IoT (Internet of Things) devices have severely limited compute and storage resources, and cannot compete with dedicated machines or ASICs. However, mobile and IoT devices often include Hardware Security Modules (HSM) used for device identity or device attestation. When paired with a low power and lightweight PoS solution, mining and blockchain management become feasible. By restricting mining to classes of low power devices for select blockchains, one can limit the total power used for a given application. This enables entirely new classes of applications in supply chain management, mobile gaming, IoT, and other spaces. When the blockchain executes entirely within the mobile or IoT hardware, the applications no longer depend on external services which might be turned off by the manufacturer once the devices reach the end of their sales cycle.

Known Types of Crypto Payment Shortcomings.

Grinding is an attack known in the context of PoS protocols, in which a cheating miner attempts to maximize future gains by the way he responds to a current challenge. It is beneficial for protocols to not enable grinding. It is understood that easily computed small-denomination coins simplify grinding, since it results in a low computational and financial cost of abandoning the response to a challenge corresponding to a potentially winning mining instance, or selecting between multiple optional winning instances.

The granularity of a crypto payment scheme corresponds to the typical time from the submission of an event to be time-stamped until the moment the event is successfully and irrevocably time-stamped. The longer the lag is between a new ledger entry being created and being closed, the lesser the granularity. This corresponds to a long closing time for ledgers. Short-time granularity is beneficial, especially in some applications with real-time demands, such as gaming. The greater the mining community is, the easier it is to provide short-time granularity. Also, the greater the inherent resistance to grinding is, the easier it is to provide short-time granularity.

It is highly undesirable for a crypto payment scheme, and the associated mining scheme, to be instable or enable collusion between cheaters. Such problems would not only deter participation and thereby limit the number of miners, but also result in unaccountability in general. For example, if a miner can mine on multiple concurrent branches using one given mining instance, this results in greater instability and no benefit for the society of miners—however, if it is possible to carry out, it results in short-term benefits for the individual cheater.

It is also detrimental for crypto payment schemes and their associated mining schemes to require large quantities of electricity for their operation. This is not environmentally desirable, and also limits the number of willing miners. Moreover, it encourages undesirable behavior, such as criminals using malware to mine on other people's systems. However, requiring that all PoS schemes use large mining instances (which corresponds to higher-denomination coins, once a successful mining effort is performed) would limit the number of miners by excluding devices with small memory sizes. This is also undesirable.

Another goal of the disclosure is to improve protection against undesirable activities, such as mining using ASICs; compression of PoS instances, resulting in hybrid PoS/PoW outcomes; imbalance of capabilities that limit the marketplace of miners; and more.

Described herein are techniques for creating PoS based mining schemes with applications to cryptocurrencies, time stamping, and related functionality. The techniques disincentivize undesirable behaviors such as grinding and avoid undesirable situations such as mining pool fraud while lowering the energy consumption requirements for mining and providing security.

Disclosed herein are techniques to control the success of mining for mining instances of different size, thereby making mining equitable and fair with respect to the storage capacity of the mining instances. This is done without favoring mining instances with large capacity, thereby removing the need for mining pools, and avoiding the need for multiple denominations. Doing this has security benefits that will be enjoyed both by individual mining operators and by the community as such. For example, the design supports avoidance of grinding attacks, and avoids hijacking attacks in which a powerful entity is able to lock other miners out by overwhelming the marketplace.

Grinding is a form of abuse in which a miner makes minor modifications to a context, in order to find one such context that results in a context that results in a challenge for which it has a legitimate response—where a response is the same as a successful mining effort. Grinding is a problem that is unique to proof of space, since the success is defined by what the miner has stored relative to a challenge. If all miners practice grinding, that turns a PoS scheme into a hybrid PoS/PoW scheme, thereby losing the benefits associated with PoS, and without necessarily gaining any benefits. Grinding can lead to one or more miners being able to generate a steady stream of ledger entries, such that they always have the answer to the next challenge. This can lead to the exclusion of others, and hyperinflation of the currency.

Furthermore, automated and event-driven parameter change methods allow for fine-tuning of parameters over time, thereby creating an autonomous community of miners that self-balances to address imbalances created by changes in technology, changes in the marketplace, and changes in Internet communication speeds; such and other auxiliary dependencies can otherwise negatively affect the security and well-being of the marketplace. By enabling fair and equitable mining that supports security requirements and which is not costly to operate will increase the marketplace of cryptocurrencies and enable broader participation, which will have a stabilizing effect on the resulting currencies and their use.

Disclosed herein are techniques for modifying existing PoS proposals to address the aforementioned concerns, and a model is described to bootstrap and maintain a large population of miners. In addition to addressing the robustness issues, this will also offer the benefit of an increased number of parties interested in investing in the resulting currency. This will further help stabilize the resulting currency.

A further goal of the current disclosure is to address this compression-cheating problem by making it undesirable to compress PoS instances, e.g., by penalizing cheaters by dramatically increasing the cost of a cheating strategy, without causing a large negative impact on honest protocol participants (e.g., using the techniques described above).

Yet another goal is to generate a set of feedback mechanisms that automates the distributed adjustment of parameter choices and associated functionality, with associated robustness and security benefits.

Additional goals of the current disclosure are to address the known shortcomings associated with PoW and PoS based schemes, and of hybrids between such methods.

A First Set of Embodiments

Illustrative embodiments will be described herein with reference to exemplary information processing systems and associated computers, servers, storage devices and other processing devices for generation and utilization of proofs of space.

In one embodiment, a root value R is published by a trusted service provider (TSP). The TSP additionally publishes a set of system parameters SP associated with the root value R, such as the length L of an answer A to a challenge C and a description of a matching function MF. The TSP can modify these parameters at will, publishing the new parameters and, if desirable, perform at least one of an authentication of the new parameters, a linking of the new parameters to a ledger, or another technique of publicly asserting the new parameters in a manner that is verifiable. A mining operator (MO), also referred to herein as a "miner", accesses at least some of the values published by the TSP or associated entities, and accesses a challenge C to which the MO wishes to generate a correct answer A. Note that the TSP is not needed after the initial protocol has been established; thus, it is not needed to generate or verify challenges or answers to challenges. Thus, the disclosed technology supports fully distributed proofs of space.

In another embodiment, a tree T is generated from the root R and the length L using all possible paths. One way to do this is to use a binary tree of values computed from the root R using a function f, which in some embodiments is a one-way function such as a hash function. Another way is to use a $2^L$-ary tree rooted in R, where the leaf values are computed from all the $2^L$ "paths" by applying a function f to R and each path value i is one of the $2^L$ unique paths, and in some embodiments is an L-bit binary number. Here, in this example, f is a one-way function such as a hash function, where a hash function such as SHA256 or SHA516 is a good choice for f but where less secure hash functions such as MD5 can also be used. In some embodiments, this is performed in a pre-computation step performed by the MO, or by an entity that delivers trees or portions of trees to the MO. If the MO cannot store the entire tree T, it can store only a portion of it, but will have a lower chance of success to respond to a challenge if not storing essentially the entire tree T, as will be detailed below. The resulting $2^L$ leaves of the tree T rooted in R are used to compute an answer A to a challenge C. In some embodiments, these are stored in a sorted manner, such as in pairs of ($leaf_i$, i), where i is the path leading from R to $leaf_i$, and wherein the pairs are sorted by the values $leaf_i$, or stored in a tree-based search structure, keyed by the leaf values $leaf_i$. In some embodiments, only a portion of these pairs are stored by the MO. L is referred to as the set of leaves stored by the MO, and the associated paths i. In some embodiments, these leaves are assumed to be stored in a manner that simplifies search based on the leaf values or portions thereof.

In an alternative embodiment, the tree is associated with N different paths, such as the paths [0, N−1], where N is not a power of two. Here, N is a parameter associated with the TSP and the tree T. In some embodiments, the value N is modifiable, e.g., may start with a value such as $N=2^{60}$ but then be increased to a number ten times greater than this original number as globally accessible storage capabilities increase or the mining needs to be slowed down to curb inflation. Increasing N or L enables an increase of the amount of storage that can be required for mining to succeed In one embodiment, the challenge C is processed by the MO to obtain a value c, where c may be the 128 bit length portion of C, such as the last 128 bits. The MO then searches its list of stored leaf values for a leaf value $leaf_i$ that matches the challenge C, e.g., by the last 128 bits of $leaf_i$ being equal to the last 128 bits of C, which in this instance corresponds to c. With an overwhelming likelihood, there will be a large number of such pairs. The value i for any such pair is a correct answer A to the challenge C. It can easily be seen that the greater portion of the tree T rooted in R that the MO stores, the higher the probability that MO can generate a valid answer A=i to the challenge C. To verify the validity of an answer A=i, given a pair (C,A), a verifier with access to the publicly available information associated with the TSP computes f(R,A) and determines whether f(R,A) matches C, which in this example corresponds to the last 128 bits of f(R,A) equaling the 128 last bits of C. Another number of bits can be used, and any number of bits can be used. If only 80 bits have to match between f(R,A) and C, then this corresponds to an easier challenge than if 128 bits have to match. The degree of match is therefore a parameter describing the PoS, and is part of the system parameters SP that the TSP should publish. The matching length is referred to as M. The challenge C is set as a function of the current ledger L and one or more transactions, as described by a value TRANS. For example, C=hash(L,TRANS), where TRANS is the value of the root of a hash tree of all transactions that have been reported since the last ledger entry was made. This is described, for example, by Satoshi Nakamoto in his 2008 article "Bitcoin: A Peer-to-Peer Electronic Cash System", available at https://bitcoin.org/bitcoin.pdf.

The matching length M determines the difficulty of finding a match. The more bits that have to match between the challenge and the leaf value, the lower is the likelihood that an MO that stores only part of the tree T will be able to find an answer A to a challenge C. Bitwise comparison is not the only form of match that can be used; for example, another match function may require that the values C and $leaf_i$, are within a set distance d of each other, i.e., $|C-leaf_i| \leq d$; other match functions are possible. We consider bitwise match herein since that is a very fast match function to evaluate.

It can be seen that the approach detailed in the above embodiment only requires an MO to save data roughly corresponding to a fraction of the entire tree, and in particular, to $O(\min(2^M/2^L, 2^L))$ of the entire tree T. Here, M and L both define the difficulty of finding a valid answer A to the challenge C. To force an MO to store a larger part of the tree T without affecting the process for a party who does store the entire tree T, there are several solutions. One approach would be for the TSP to periodically specify new matching criteria. For example, in the above example, the M last bits of C had to match the M last bits of a leaf leafi for i to be a valid answer to the challenge C. In one embodiment, the TSP changes the exact requirement over time. For example, after some time, the TSP may specify that instead of matching the M least significant bits, the challenge C and the leaf $leaf_i$ would have to match in terms of another selection of bits, such as the M most significant bits starting with bit 7. This way, a "cheating" MO would be forced to also store portions of the tree T corresponding to these areas, or it would fail to generate valid answers to challenges.

In one embodiment, the matching function MF of which two examples are described above is not static but it is part of the challenge. This simplifies the processing, and in some embodiments requires MOs to store essentially the entire tree T to be successful, or a portion implied by the exact selection of the family of functions from which MF is drawn. In this example, MF is a function that selects M out of the |leaf$_i$| bits, where the exact selection is determined by a value V. This value can be set at random by the TSP, be a function of the previously generated challenge, answer, or combination of these, or could be a value that depends on an input to the TSP, MO, or another party. One example MF is a function where |V|=|leaf$_i$|/2, and V is selected as the |V| least significant bits of hash(ledger), where hash is a hash function, and may coincide with the hash function used to derive leaves from the root R, but does not have to be. (Whereas V could also be set as a function of the challenge C, that comes with the drawback that if the challenge depends on a value set by the MO, then the MO can select multiple such values until it gets a V for which it has stored an answer; this drawback is absent when V is set as a hash of the ledger.) Then, V is used to select the Vth selection of |V| bits from an input I, according to an arbitrary but fixed ordering of the 2|V| choose |V| bits of the input I, creating an output O that is used for the matching function. This can be done, for example, using the n-choose-k selection function for k=|V|, n=2 k, as described by Buckles and Lybanon in "Generation of a Vector from the Lexicographical Index", ACM Transactions on Mathematical Software (TOMS), Volume 3 Issue 2, June 1977. It can also be done using the n-choose-k selection function disclosed by James D. McCaffrey in https://jamesmccaffrey.wordpress.com/:

```
static void Main(string[ ] args)
{
   Console.Write("\nEnterination n-value: ");
   int n = int.Parse(Console.ReadLine( ));
   Console.Write("\nEnterination k-value: ");
   int k = int.Parse(Console.ReadLine( ));
   Console.WriteLine("\nAll combinations: \n");
   Combination c = new Combination(n, k);
   while (c != null) {
      Console.WriteLine(c.ToString( ));
      c = c.Successor( );
   }
   Console.WriteLine("\nDone");
}
public class Combination
{
   private readonly int n;
   private readonly int k;
   private readonly int[ ] data;
public Combination(int n, int k)
{
   this.n = n;
   this.k = k;
   this.data = new int[k];
   for (int i = 0; i < k; ++i) {
      data[i] = i;
   }
} // ctor( )
public override string ToString( )
{
   string s ="{";
   for (int i =0; i < k; ++i)
      s += data[i] + " ";
   s += "}";
   return s;
}
public Combination Successor( )
{
   if (data[0] == n - k) // last combination element
   return null;
   Combination ans = new Combination(n, k);
   int i;
   for (i = 0; i < k; ++i)
      ans.data[i] = this.data[i];
   for (i = k - 1; i > 0 && ans.data[i] == n - k + i; -i)
   ;
   ++ans.data[i];
   for (int j = i; j < k - 1; ++j)
```

-continued

```
      ans.data[j + 1] = ans.data[j] + 1;
   return ans;
} // Successor( )
} // class Combination
```

Selecting k-out-of-n can also be done in other ways. Moreover, the selection function can perform another selection that is not necessarily uniform over all selections; and which does not necessarily have Hamming weight k=|V| for each selection.

This way, V is used as a selector to select |V| bits from both C and the candidate leaves, and if the selection made from leaf$_i$ matches the selection made from C (e.g., these are equal to each other) then the leaf leaf$_i$ is said to match the challenge C. This way, since there are almost $2^{|V|}$ different such possible selections, this increases the required portion of T that a MO has to store to have a high probability of success to generate a valid answer A=i to a challenge C. When an answer A=i is verified by a party interested in determining that the correct answer A was provided, the same matching function is generated and applied to the challenge C and the computed value f(R,A), and if the two match it is determined that A is a valid response to C, given the selector value V=hash(C). Other publicly verifiable functions of computing V are also possible.

The above techniques describe a potentially probabilistic MO that could store only a portion of the tree T defined by the root R, and be able to succeed only for a portion of the challenges C. If the parameters are set in a way that makes it unlikely for any MO to store the entire tree T, then each competing MO will store only a portion of the tree, and some challenges will only be possible to answer for an MO that has a valid answer in its portion of the tree, where each MO can select a different tree portion. If no MO has generated a valid response within a set amount of time, then the TSP may change the parameters automatically, e.g., to change the challenge from C to C+1, or C XOR V, or another value. This can be done at a fixed time after the challenge C is announced, or in response to a need to close a ledger, or simply because TSP announces that it needs to be done. TSP can either select the new challenge and authenticate this, or better, use a challenge that is computationally associated with a previous challenge C or other public number.

In some embodiments, two collaborating MO entities store different segments of the tree, and collaborate or share revenue. However, two MO entities not collaborating with each other may still find it beneficial to disclose to each other what ranges of the leaf values they store, or according to what pattern they store leaf values. This helps avoid duplication of storage, which may lead to unwanted competition between these MO entities.

To connect a cryptographic key to a proof of space, a MO can generate a public key/secret key pair (pk, sk) and generate a challenge C from a ledger and pk, e.g., by computing a hash value C=hash(pk, ledger, TRANS) or alternatively C=hash(pk, hash(ledger), TRANS). Here, TRANS is a description of valid transactions that have been reported. The ledger corresponds to a series of already recorded public keys. For each such recorded public key pk, the owner of the corresponding secret key sk can spend the associated resource, or parts thereof, by using the secret key sk to generate a digital signature on a document such as an invoice; this digital signature can be verified using the associated public key pk and invoice, and further, based on being recorded on the ledger. The public key pk, in one embodiment is an RSA-2048 key, and the associated secret key sk is the corresponding secret key of the RSA-2048 public key pk. Other crypto systems can also be used In one embodiment, the root value R is a randomly selected 256-bit number, or a SHA256 hash of a random number, the source code for the MO software, or another essentially a priori unpredictable value. Furthermore, as one example, L is 80, meaning each one of the path values will be 80 bits long. This is the length of an answer A to a challenge C. C is a SHA256 hash of the current ledger value, which is instantiated to an empty string as the system is set up, and a public key pk corresponding to a secret key sk, where the key pair may rely on RSA signatures using a modulo that is at least 2048 bits long. The function f is chosen as SHA-256. A selection value V is computed from the most recent ledger value as the SHA-256 on the ledger value, and |V|=128. Using the value V, a selection of the challenge C is computed using an n-choose-k method such as the one disclosed by McCaffrey; a correct answer A=i corresponding to the leaf $leaf_i$, for which n-choose-k(C,V) =n-choose-k($leaf_i$, V), where n-choose-k(I,V) corresponds to taking the input I of length 2|V| and selecting with an essentially uniform distribution the bits in the |V| positions of the bit string I and outputting the concatenation of the selected bits, which is a length-|V| bit selection of the input I. Concretely, this corresponds to comparing C and $leaf_i$, in only the selected positions, where V is used as a selector of 128 of the 256 bits. One can also select a smaller or larger number. The algorithm for the MO determines n-choose-k (C,V) and then looks up, in a database, a leaf value that matches n-choose-k(C,V); if the leaf values are stored in a lexicographically sorted manner, and all values are stored, then MO looks up the value in which all the bits of C that are not selected are set to 0. If the MO only stores values in an interval [int1, int2] then a padding of the unselected values of C is set to cause the resulting value to fall in the interval [int1, int2], after which the leaf value matching the padded selected value C is looked up. There are other ways to perform the lookup. As a leaf is successfully looked up by the MO, the path value i associated with the leaf $leaf_i$ is set as the answer A. The value A is made public and included in the ledger, causing the public key pk to be authenticated, and the corresponding key sk used to perform a payment. The disclosed proof of space method also finds applications in other contexts where proofs of work can be used. For example, it can be used in a distributed ledger system used to record data, where data is associated with a ledger by being used as input to the challenge C. Alternatively, the data can be signed using a public key pk associated with the ledger to create a temporary association, which can then be made permanent by computing a challenge C based at least in part on the ledger, TRANS and the signed data, and distributively generating an answer A to the challenge. As an answer A to a challenge C is identified, it is added to the ledger, and a new challenge is generated that is based on the ledger after the answer A has been added to it.

In the embodiment above in which an n-choose-k selection is made, and related embodiments, the probability of success of mining for an MO that stores a portion k of the entire tree is proportional to k. Thus, an MO storing 1/100 of the leaves of the tree would expect to succeed with generating an answer to a challenge with a probability that is approximately 1%, or 1/100. Without the n-choose-k selection, and using a fixed selection instead, the probability of success is instead proportional to the square root of k. Thus, an MO that stores 1/100 of the leaves would expect to succeed with a probability that is approximately 10%, or the square root of 1/100. This can be seen as favoring small-space MO's relatively to large-space MOs. In many settings, the former is more desirable, as it reduces the size of the tree for a set level of desired difficulty. Accordingly, it is also desirable with an embodiment in which an MO has a lower probability of success relative to the portion k of the tree it stores. In one alternative embodiment using the n-choose-k method described above, a correct answer A to a challenge C comprises X unique paths of leaves, each one of which matches the challenge; such a design would result in an expected success for an MO storing a portion k of the tree that is proportional to $k^X$, i.e., for an MO that stores 1/100 of the leaves, and X=3, the probability of success is approximately $1/100^3$=1/1000000, or one in a million. This can be seen as a preference for large-space MOs. One way to achieve this is to compute a collection of selector values $V_j$, where j is selected as 1 ... X, and $V_j$=hash(ledger,j), and for each selector value $V_j$, identify a leaf $leaf_i$, that matches the challenge C according to the matching function MF and the selector value $V_j$. The answer A to the challenge C is the collection of paths i corresponding to the identified leaves $leaf_{ji}$, for j=1 ... X.

The same method, applied to the embodiment in which the n-choose-k method is not applied but the multiple-path approach is used, the probability would be proportional to $sqrt(k)^X$. Similarly, by varying the number of bits that are selected, and the matching function MF, additional success probabilities for various portions k can be created. These techniques show that it is practically possible to select parameters that favor a particular size MO, such as a typical laptop or home computer; or a cluster of coordinating large computers.

In one embodiment, the initial ledger comprises all parameters and algorithms, or a hash of these, and a public key associated with the TSP. The TSP may sign digital signatures associated with this key as needed, including parameter change notifications.

An MO can generate a valid answer A to a challenge by iteratively generating and inspecting leaf values, ending only after a match is found. One way in which this can be avoided is to let the function f used to generate a leaf value from the root and the path be a trapdoor one-way function, where the trap door is needed to compute the leaf from the root and the path but the root can be generated from the leaf and the path. Such a tree can be generated by the TSP and distributed, after which portions can be stored by different MOs. After a leaf is found matching a challenge, the leaf and the challenge comprise the answer to the challenge; this answer is verified by applying the function f in the public direction, verifying that the root is the generated value. One example trapdoor one-way function that can be used is exponentiation modulo a composite modulo While the disclosed technology is a proof of space, it should be noted that the leaf values can also be computed in real time, meaning it can also be used as a proof of work. To discourage an MO using it as a proof of work, the function f used to derive leaves from the root is selected as a relatively slow function, e.g., a hash function that takes one extra parameter $r_i$ as input, where $r_i$ is chosen as the 6-bit number that causes the difference between the challenge value C and the resulting leaf value hash(R,i, $r_i$) to be as small as possible, with ties broken by selecting the $r_i$ value that is the smallest of the two or more "competing" $r_i$ values. Here, R is the root value. Computing a leaf value, thus, has a cost approximately $2^6$ greater than that of computing a leaf value in the previously described approach. However, the verification cost to check whether a submitted answer A is correct is also approximately $2^6$ greater than that in the previously described approach. An alternative approach for this is to only allow leaf values $leaf_i$=hash(R,i) for which the y least significant bits of i are the same as the y least significant bits of $leaf_i$. Thus, since hash acts as a random oracle, this would disqualify all but a portion $\frac{1}{2^y}$ of the otherwise allowable leaf values. Given a path value i, a verifier can determine that this corresponds to a valid $leaf_i$, by computing the leaf value $leaf_i$, determining that the y least significant bits of i are the same as they least significant bits of $leaf_i$, (which is a very low-cost operation), and to verify that the leaf value $leaf_i$, matches the challenge C, as described before. Since an MO that computes leaves on the fly would have to "discard" all but a portion $\frac{1}{2^y}$ of the otherwise allowable leaf values, this would increase its cost of processing by a factor $2^y$. For an MO that stores leaf values, this penalty would merely exist during setup. There are additional related techniques that increase the cost of a computationally bound MO relative the costs of a memory-bound MO.

In one embodiment, an MO performs two rounds of computation. In the first round, instead of a public key used as input to determine the challenge $C_1$, a fixed value, such as 0, is used. Thus, the challenge is set as $C_i$=hash(0, hash(ledger)), using the previous formula with pk set to 0. The MO computes a first answer A1 to the challenge $C_1$. This first answer is not submitted yet. Instead, it is locally combined with the ledger, resulting in an updated value $ledger_1$=ledger|$A_1$, where | denotes concatenation. Other combining functions can also be used instead of concatenation. A second challenge $C_2$=hash(pk, hash($ledger_1$)) is generated. This follows the previously described formula, but using the locally updated ledger instead of the actual ledger. The MO determines a second answer $A_2$ to the challenge $C_2$. The MO then submits ($A_1$, $A_2$, pk) to be added to the ledger. A benefit of this approach is that the computation of the first answer depends only on the publicly available ledger, and not on locally modifiable variables such as the value pk. When an MO can locally modify the value pk, it can use a large collection of public keys, such as a million unique public keys, and then attempt to derive the answer to the corresponding challenges. If the MO only stores a portion of the tree T, it will only be successful with a probability roughly proportional to the amount it stores, for each public key for which it attempts to find a resulting answer. However, in the situation where a "double challenge" is used, and the first one does not depend on a local variable, then the associated first answer can be generated with a probability proportional to the amount of storage the MO has, and the second part can be generated with a greater probability. Nevertheless, the first challenge constitutes a barrier in spite of the potential use of a large number of candidate public keys. The probability of success can be modified by requiring an answer to correspond to multiple challenges, each one of which is generated from the same public key but with different paddings, as is described in this disclosure. This holds for both the first and the second answer in the two-round version described above.

In an alternative embodiment, an MO performs only one round of computation, using a challenge $C_2$=hash(cert, pk, hash($ledger_1$), TRANS) for which cert is a certificate on pk, and where there is a financial cost associated with getting any document, including a public key pk, certified. An example certification could relate to a previous public key, that is part of a ledger, and its associated secret key. Thus, a party with knowledge of a secret key whose corresponding public key is part of the ledger will be able to use this key pair to sign documents such as new public keys, in return for financial compensation. Alternatively, a public key in a ledger can be allowed to certify only a fixed number of documents, or a fixed number of public keys, such as only 100 public keys. If the owner of the key pair would certify more documents/public keys than the allowed limit, that may invalidate the public key. Alternatively, each public key in the ledger can be used to sign notes corresponding to the value associated with the public key. If the public key has the value 100 PoS-dollars, and each certification costs 1 PoS-dollar, then it is clear that after having signed 100 public keys, the public key is "spent". As a further example, after having signed a purchase agreement for a piece of merchandise, worth 50 PoS dollars, the owner of the public key above would only be able to certify 50 public keys before the public key is spent. The use of certified public keys pk means that the MO cannot use a huge supply of different public keys to maximize its ability to find an answer to a challenge, as there would be a large cost associated with this. If the benefit of an additional public key, in terms of finding an answer to a challenge, has a greater cost (such as 1 PoS-dollar) than having an extra amount of memory giving the same benefit in terms of the expected success, then it is better for the MO to invest in memory than to purchase extra certified public keys.

In one embodiment, the certificate on a public key pk is produced before the challenge was issued, as determined using a digital timestamping method. The certificate may incorporate data associated with the timestamp of the certification of the public key. There are other alternative methods of limiting the number of public keys that an MO can practically use when determining a challenge from a ledger, and generating the associated answer.

In one embodiment, each MO computes a set of leaf values as $leaf_i$=f(R, p, i) where p is a representation of a public key pk, such as p=pk, p=hash(pk), or other commitments to the public key pk. In some embodiments, the function f is a cryptographic hash function such as SHA256. Whereas the MO can use different public keys pk, and therefore also different values p, for different leaves $leaf_i$, they can also use the same public key. In one embodiment, the MO knows the secret key sk corresponding to pk. A challenge C is computed. One possible derivation is C=hash (L) where L is the current ledger value. The MO then searches its list of stored leaf values for a leaf value $leaf_i$, that matches the challenge according to the match function MF. The pair (pk, i) for any such path i associated with $leaf_i$, is a correct answer A to the challenge C. Optionally, the answer A is accompanied with a proof that MO knows the secret key sk corresponding to pk; one such proof is a digital signature on a value, such as on the updated ledger, where the updated ledger $L_{new}$ is the old ledger $L_{old}$ with the answer A appended. A party wishing to verify the answer A computes $leaf_i$=f(R, p, i) for the values (p,i) associated with the recently appended answer A, where p is computed from pk unless p=pk. The party wishing to verify A further verifies that $leaf_i$, matches the challenge C generated from the old ledger value $L_{old}$, according to the matching function MF. Optionally, a proof that MO knows the secret key sk corresponding to pk is also verified, e.g., by verifying a digital signature associated with the public key pk associated with the answer A. If the party wishing to verify A finds that the MO's computations were correct then it accepts the newly appended answer A as a valid extension of the ledger. A party that makes this determination would be able to derive a new challenge from the new ledger, and attempt to find an answer to this new challenge. As described above, this can be combined with the use of multiple challenges derived from the same input, such as a ledger.

In one embodiment, the derivation of the leaves is intentionally made more time consuming in order to encourage one-time generation of leaf values, and storage of these, as opposed to on-the-fly generation of leaf values. One example approach uses an existing function f, which may be a hash function such as SHA512, as a building block. For example, by requiring that the ten most significant bits of the output off are all zeroes, the system effectively makes the derivation of leaves $2^{10}=1024$ times more computationally expensive. While this increases the computational cost to an MO storing leaf values, it only does so during a setup phase. After the leaf values have been generated and stored—and only "legitimate" leaf values will be stored—there is no additional cost for such an MO. However, an MO that attempts to solve challenges without relying on a large amount of storage, but instead by computing leaves on the fly, would be penalized, since the computational burden would apply to each and every use of the function f. Note that this design does not penalize the verification of an answer A attempted to be appended to the ledger. This is because a verifier does not have to exhaustively solve a large number of computational puzzles, but simply needs to determine whether a supplied answer A is legitimate, as described above. This only involves one application of the one-way function f, as opposed to 1024 applications. By combining this approach with multiple challenges per answer, this is further enhanced. For example, by requiring three path values in an answer A, each path value corresponding to a valid leaf value matching the challenge associated with the ledger, the increase of the burden associated with a computationally bound strategy increases disproportionately compared to that of a strategy based on storage.

If multiple answers related to one and the same open ledger are received within a short time, that is indicative that the challenges are too easy. If that happens increasingly common, such as for more than 10% of all cases, then the authority may increase the difficulty of mining. There are other ways for an authority to identify that the difficulty of mining should be improved, such as that for two consecutive ledgers, there were more than three answers received within two minutes, etc.

The size of the PoS we have disclosed can easily be varied in real time by modifying the value N; the matching function and the number of positions in which two values are compared by the matching function; and by modifying the number of required paths in an answer; and by selecting whether the ledger is combined with a public key to result in a first challenge, or whether the ledger is combined with a fixed value to result in a first challenge and the resulting answer used along with the ledger value and a public key to result in a second challenge.

The embodiments described above are considered illustrative only, and should not be viewed as limited to any particular arrangement of features. For example alternative processing operations and associated system entity configurations can be used in other embodiments. It is therefore possible that other embodiments may include additional or alternative system entities, relative to the MO and TSP entities of certain ones of the illustrative embodiments.

The MO and TSP entities described above may be part of an information processing system. A given MO or TSP in an information processing system as described herein is illustratively configured utilizing a corresponding processing device comprising a processor coupled to a memory. The processor executes software program code stored in the memory in order to control the performance of processing operations and other functionality. The processing device also comprises a network interface that supports communication over one or more networks.

The processor may comprise, for example, a microprocessor, an application-specific integrated circuit (ASIC), a field-programmable gate array (FPGA), a central processing unit (CPU), an arithmetic logic unit (ALU), a digital signal processor (DSP), or other similar processing device component, as well as other types and arrangements of processing circuitry, in any combination.

The memory stores software program code for execution by the processor in implementing portions of the functionality of the processing device. A given such memory that stores such program code for execution by a corresponding processor is an example of what is more generally referred to herein as a processor-readable storage medium having program code embodied therein, and may comprise, for example, electronic memory such as SRAM, DRAM or other types of random access memory, read-only memory (ROM), magnetic memory, optical memory, or other types of storage devices in any combination.

Articles of manufacture comprising such processor-readable storage media are considered embodiments of the invention. The term "article of manufacture" as used herein should be understood to exclude transitory, propagating signals. Other types of computer program products comprising processor-readable storage media can be implemented in other embodiments.

In addition, embodiments of the invention may be implemented in the form of integrated circuits comprising processing circuitry configured to implement processing operations associated with the embodiments described herein.

Processing devices in a given embodiment can include, for example, laptop, tablet or desktop personal computers, mobile telephones, or other types of computers or communication devices, in any combination.

Communications between the various elements of an information processing system comprising processing devices associated with respective parties or other system entities may take place over one or more networks. Such networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

An information processing system as disclosed herein may be implemented using one or more processing platforms, or portions thereof. For example, one illustrative embodiment of a processing platform that may be used to implement at least a portion of an information processing system comprises cloud infrastructure including virtual machines implemented using a hypervisor that runs on physical infrastructure. Such virtual machines may comprise respective processing devices that communicate with one another over one or more networks.

The cloud infrastructure in such an embodiment may further comprise one or more sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the information processing system.

Another illustrative embodiment of a processing platform that may be used to implement at least a portion of an information processing system as disclosed herein comprises a plurality of processing devices which communicate with one another over at least one network. As indicated previously, the network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. As indicated above, the processor may comprise a microprocessor, a microcontroller, an ASIC, an FPGA or other type of processing circuitry, as well as portions or combinations of such circuitry elements. The memory may comprise RAM, ROM or other types of memory, in any combination. Again, the memory and other memories disclosed herein should be viewed as illustrative examples of what are more generally referred to as "processor-readable storage media" storing program code of one or more software programs.

As mentioned previously, articles of manufacture comprising such processor-readable storage media are considered embodiments of the present invention. A given such article of manufacture may comprise, for example, a storage array, a storage disk, an integrated circuit containing RAM, ROM or other electronic memory, or any of a wide variety of other types of computer program products.

Also included in the processing device is network interface circuitry, which is used to interface the processing device with the network and other system components, and may comprise conventional transceivers.

Again, these particular processing platforms are presented by way of example only, and an information processing system may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure in place of or in addition to virtualization infrastructure comprising virtual machines. Thus, it is possible in some embodiments that system components can run at least in part in cloud infrastructure or other types of virtualization infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system. Such components can communicate with other elements of the information processing system over any type of network or other communication media.

As indicated previously, components or functionality of the system as disclosed herein can be implemented at least in part in the form of one or more software programs stored in memory and executed by a processor of a processing device.

Accordingly, a given component of an information processing system implementing functionality as described herein is illustratively configured utilizing a corresponding processing device comprising a processor coupled to a memory. The processor executes program code stored in the memory in order to control the performance of processing operations and other functionality. The processing device also comprises a network interface that supports communication over one or more networks.

The particular configurations of information processing systems described herein are exemplary only, and a given such system in other embodiments may include other elements in addition to or in place of those specifically shown, including one or more elements of a type commonly found in a conventional implementation of such a system.

For example, in some embodiments, an information processing system may be configured to utilize the disclosed techniques to provide additional or alternative functionality in other contexts. The disclosed techniques can be similarly adapted for use in a wide variety of other types of information processing systems.

It is also to be appreciated that the particular process steps used in the embodiments described above are exemplary only, and other embodiments can utilize different types and arrangements of processing operations. For example, certain process steps described as being performed serially in the illustrative embodiments can in other embodiments be performed at least in part in parallel with one another.

It should again be emphasized that the embodiments of the invention as described herein are intended to be illustrative only. Other embodiments of the invention can be implemented utilizing a wide variety of different types and arrangements of information processing systems, networks and devices than those utilized in the particular illustrative embodiments described herein, and in numerous alternative PoS processing contexts. Also, the particular types and configurations of root values, leaf values, path values, challenges, ledger values, proofs of space, match functions, etc. can be varied in other embodiments. Furthermore, the various types of contexts in which PoS are utilized can be varied. In addition, the particular assumptions made herein in the context of describing certain embodiments need not apply in other embodiments.

A Second Set of Embodiments

Quality Measures

A first type of quality function is a local quality function.

In one embodiment, a quality assessment value is derived from a public value, such as the ledger, a counter indicating the length of the ledger, a challenge computed from the ledger, a mining instance and its size, a public event description, or a combination of one or more of these types of values. It is beneficial if the extent to which the quality assessment value can be influenced in a deterministic manner by one or more miners is minimal. For example, it is not desirable that the quality assessment value depends on a value that can be manipulated by a miner. In some embodiments, the quality assessment value indicates whether a challenge provided to a mining instance is valid, whether a response to a challenge, generated by a mining instance, is valid, or a combination of these. If the quality assessment value indicates invalidity, the corresponding challenge and associated response are not legitimate ledger entry inputs in the context of the associated mining instance, meaning that the associated response to the challenge cannot be used to close the ledger, and therefore, is not successful outcome of a mining attempt. On the other hand, if the quality assessment value indicates validity, this does not preclude the challenge and associated response, if found, from being submitted as a ledger entry. In other words, such challenges and responses are valid, assuming they are well-formed, and will be considered by other miners as being valid ledger entries presuming they are received on a timely basis, relate properly to the observed transaction values submitted to the ledger, and satisfy other related and well-understood measures of correctness. In some embodiments, the quality assessment measure is computable with very limited resources. Example quality assessment measures are computed by performing a small number of operations, some of which may result in a state that a mining operator stores and does not need to recompute; an example quality assessment selects a portion of a string, such as a challenge string, and compares the selected portion to a pre-stored bit string, outputting "valid" if the two are equal. Another example quality assessment performs two or more such selections and comparisons, outputting valid if any one of the comparisons result in a match. Whereas more complex and demanding quality assessment measures can also be computed, it is, generally speaking, beneficial for the quality assessment measures to require a minimum of resources to compute or verify.

The disclosure relates the administration of mining, including the decentralized determination of what ledger entries are selected; setup of individual mining instances; operation of a mining instance, including the determination of whether a challenge, response or a combination thereof are valid in a given context; and the automated reparametrization of publicly available configurations governing the operation of the ledger, the mining entities, and any other entity performing transactions or verification related to transactions. While the techniques are described in the context of a PoS-based mining scheme, it is also to be applicable to a PoW-based mining scheme, or any PoS/PoW hybrid, as well as mining schemes based on other types of resources, such as secure data storage, communication bandwidth, specific processing capability corresponding to ability to evaluate a function of choice, and any other mining scheme based on providing access to a resource, whether physical or logical in its nature. The disclosure relates both to the retrofit of insecure or otherwise undesirable schemes of this nature by application, among other things, of the quality assessment process disclosed, and to the design of schemes around the described processes and methods.

In one embodiment, a miner selects one or more seed values, each one represented by a value s; then computing a collection of leaves in a Merkle tree from s by applying a one-way function to s. For example, if the leaves are numbered 0 . . . n−1, the miner generates the jth Merkle leaf as f(s,j), where f is a one-way function such as a cryptographic hash function. In one embodiment, f is the function SHA256. As a result, an array of n leaves are generated, where in some embodiments, n is a power of two; from these n internal node values are generated by applying, to each leaf, a one-way function such as a hash function h. These n interval nodes, are then concatenated pairwise, resulting in n/2 pairs, where each such pair is then hashed, resulting in n/2 internal nodes on the next level. This is repeated until only one resulting value is generated, where this resulting value will represent all the n Merkle leaf values generated from s. We refer to this value as the public key pk corresponding to the seed s. This corresponds to the root of the Merkle tree, which comprises the value pk or a function thereof. The miner generates a leaf value for the mining from the root value R a path value i and a public key pk, where the leaf value is represented by leafs. The miner then stores (leaf$_i$, i, s). The same value s can be used for multiple leaf values, however, it is beneficial for the miner to have multiple values s in use, as when all leaf values of the Merkle tree corresponding to one value s have later been disclosed, they are no longer secret to other parties. In one embodiment, there are different seed values such as $s_1, s_2, \ldots, s_k$, where each of the seed values $s_r$ is computed as a one-way function of a master secret MS and a value r. The value r can be chosen as a long random or pseudo-random number, such as a 160 bit number derived from a true random generator, as a hash of a series of inputs such as network timing information, bus timing information, network data values, bus data values, user action timings, user data from actions such as keyboard actions and mouse actions. The value r can also be generated using alternative techniques to create an essentially a-priori unpredictable value. In another embodiment, the value r is the same as the path value i, meaning that each value leaf$_i$, corresponds to a unique seed $s_i$, where was computed as h(MS,i). In this case, the miner need not store the seed value for each leaf value leaf$_i$ as the seed value can be computed from i; such a miner only needs to store one master seed MS and a collection of values (leaf$_i$,i). In another embodiment, no action is taken in response to all leaf values of the Merkle tree corresponding to one value s having been disclosed.

In some embodiments, when a miner receives a challenge c, it determines what leaf matches this challenge, using, for example, a matching function. If a leaf value leaf$_i$, matches c, then (i, pk) is a witness to the challenge. The miner discloses (i,pk). A miner that has not stored pk re-generates this from the seed value, which may also need to be generated, namely from a master seed MS and a path value i. Here, MS is stored securely by the miner, and i is extracted from the record, which is also stored securely. Given the seed, the miner can now recompute the Merkle tree and pk. In addition to disclosing (i,pk), the miner discloses as Merkle signature corresponding to pk, on a message that in some embodiments comprises two elements: a second public key P, and the set of transaction values T that the miner has observed. To do this, as is standard for Merkle signatures, the miner computes a hash of the message, i.e., of (P,T), where this hash value, call it H, is used to select from the n Merkle leaves used to generate pk, and the interval values generated from the Merkle leaves that were not selected. This is only one example use of a Merkle signature, and other approaches may be used, such as selecting values using the computed hash and a count of how many zeroes there are in the computed hash. The result is a Merkle signature on (P,T), using the public key pk. This is a ledger value.

To verify a ledger value, a verifier verifies the Merkle signature on the provided message (P,T), using public key pk, and verifies that T corresponds to a set of value transactions posted. The verifier then generates leaf$_i$, from (R,i, pk), where R is a public value associated with the mining. It finally verifies that leaf$_i$, matches the challenge c, and determines that this challenge is correct. In one embodiment, c is computed as the hash of a value that is the concatenation of the most recent ledger entry, and the transactions T' that were signed in the most recent ledger entry. Preferably, the challenge c is not computed using the most recent (and unsigned) transactions T as input; this is to avoid so-called grinding, in which a miner determines what transactions to use as input in order to increase its chances of successfully solving the proof of space. In the above, P may be an RSA public key or a DSA public key.

In an alternative embodiment, a leaf value $leaf_i$, is computed as a hash h of (R, P, pk, i), where different leaf values may use different public keys P, but do not have to. In this context, a witness corresponds to the triple (P, pk, i), and is submitted by the miner to the ledger along with a Merkle signature using public key pk, on the most recent set of transactions T that have not been signed in previous ledger entries. Thus, pk is not used to sign the other public key P in this embodiment; this is beneficial in that it further reduces the risk for grinding, as the miner's actions are predetermined and the miner cannot select a public key P on the fly with the goal of increasing her odds at correctly responding to a future challenge. To verify a ledger entry of this type, a verifier generated a leaf from (R, P, pk, i), determines that this leaf value matches the challenge c, and verifies that the associated Merkle signature using pk is a valid signature on the concatenation of the most recent ledger entry and the set T' of transactions signed in the most recent ledger entry. In an alternative embodiment, the Merkle signature is on a message that comprises only the most recent ledger entry, and not the corresponding set of transactions T', as these are implicitly part of the ledger entry by means of the Merkle signature in the most recent ledger entry.

In one embodiment, the miner, having found a leaf value that matches a challenge c, will use the Merkle public key pk associated with the seed leaf, and the associated leaf and node values, to generate two signatures. This can be done by partitioning the nodes of the Merkle tree into two parts, where the first part (such as the first half) is used to generate a first signature, and the second part is used to generate a second signature. This only requires that there is a sufficient number of nodes, e.g., using n=512 allows using 256 leaves and associated nodes for each of the signatures. The first signature is associated with the previous ledger entry, and the second signature with the set of transactions that have not previously been signed in a ledger entry, but which have been posted. Thus, the ledger entry comprises values ($leaf_i$, $pk_1$, $pk_2$, P, $sig_1$, $sig_2$, T) where $pk_1$ is the Merkle public key for the first Merkle signature $sig_1$, $pk_s$, is the Merkle public key for the second signature $sig_5$, and T is the set of transactions or references to these. As before, P is a public key of a minted coin, and i is the path. Here, sig1 is a signature of portions of a previous ledger entry—in particular, on the values ($leaf_i$, $pk_1$, $pk_2$, P, i) of this, but not on $sig_1$, $sig_2$ or T of that ledger entry. This is done by computing a first hash on ($leaf_i$, $pk_1$, $pk_2$, P, i) and using that to select what leaves of the Merkle tree associated with pk1 to reveal vs what internal node values to reveal; and by computing a second hash on the current (unsigned) transactions T, and using that correspondingly for a second Merkle signature corresponding to pk2. Here the challenge c is set as a function of values ($leaf_i$, $pk_1$, $pk_2$, P, i) for the most recent ledger entry, where the function may be a hash function, potentially using a padding unique for the purpose of deriving challenges, and not used in other contexts. This way, challenges do not depend on the transactions, and grinding is not possible other than to a very limited extent in which a miner with a small set of valid responses to a challenge—as opposed to only one such response—decides what selection is most beneficial and uses that.

Constructions such as "SpaceMint: A Cryptocurrency Based on Proofs of Space" (https://eprint.iacr.org/2015/528.pdf) suffer several problems. One design choice that is made in this particular approach and related approaches is that different users can set different configurations and parameters based on their independent memory constraints, each resulting in a proof of space that, given the space it is configured for, is likely to succeed. This means that two miners with very different memory sizes will have very different Proof of space instance sizes, but similar probability of success. To make this fair, the values of successful mining efforts for two such miners is set to be proportional to the memory space the configuration requires. One dramatic drawback of this is that miners can create configurations that result in very low-value minings, but where these can be effectively produced at a very high rate. This leads to a problem with grinding: such a miner can effectively dominate the mining by generating a very rapid stream of low-value ledger entries. Moreover, such a miner can practice grinding based on having two configurations: one low-value configuration that enables the miner to produce ledger entries at a breakneck speed, and choose collections of these to be posted, such that a chosen collection will maximize the probability of success for the mining of the high-value mining effort. Whereas the authors of "SpaceMint" designed constructions in which challenges would be delayed for multiple rounds of ledger entries to avoid grinding attempts, an attack like this very easily circumvents those protections. To address that problem, it is necessary to use a configuration in which a successful mining attempt is always valuable, and equally valuable, independently of a miner's memory resources, but where the probability of success of the mining is proportional to the memory resources put to use. Then, it is no longer rational to configure many small instances of the PoS, since this would not lead to any increase of mining success. Furthermore, and for the same reasons, such an improved system would not be vulnerable to the grinding attack described above. In one embodiment, to allow for this improved functionality, one starts with a mining method that is secure but for the grinding attack described above, and then change the policy so that all successful mining attempts result in the same value, provided the ledger entry is selected. In addition, though, a mining attempt that in a non-corrected design would have been considered legitimate will only be legitimate if it, in addition, also satisfies a criterion that is probabilistic, and for which the probability of success is proportional to the maximum space the system is designed to use. For example, for a system that is designed to use up to a quantity N of memory space, but which is only configured by one miner to use N/8 space, the success of mining should be only ⅛ of the success of the pre-corrected scheme. This can be achieved by requiring, for example, a bit pattern among one or more of the elements that is only achieved with a probability of ⅛. For example, a three-bit binary string can be selected using a pseudo-random generator taking the challenge as input, and only when a checksum or a particular output value ends with that bit string is the corresponding output considered a legitimate mining effort. This is very powerful, and can be adjusted in many ways. For example, to select a setting with a ¾ size of the maximum space, three two-bit bit strings can be generated by the pseudo-random generator, and of one of the bit strings is matched in the least significant bits of the target values, then the mining result is considered legitimate. It is further a benefit not always to select the same bit positions for comparison. For example, if p is a position of a string that is generated by the pseudo-random generator, and from this position on in the mined output, and for r bits, there is a comparison with one or more target bit strings, then the probability of success is the same as if the least significant position of the target value is used for comparison; however, this forces the miner to store all bit values instead of only some; and furthermore, does not change the computational complexity of verifying a mining attempt, since it can still be a log-time search of one or more target values.

In a 2015 publication, "Proofs of Space" (https://pdfs.semanticscholar.org/fe7c/1437c4da50f9fd9cfadc8a1ac6c59ea3ffe5.pdf), Stefan Dziembowski, Sebastian Faust, Vladimir Kolmogorov and Krzysztof Pietrzak describe a construction that can underlie a proof of space, and which can be configured to different memory sizes. Starting with a directed acyclic graph (DAG) that is hard to pebble, a prover commits to its nodes using a hash tree; proves in an initialization phase that it is able to open up challenges corresponding to nodes selected by a verifier; and later, in a proof of space phase, provide similar proofs to new challenges. The challenge can be set as the result of a one-way function that takes as its input a description of the tree-and-DAG graph and produces a pseudo-random output; this is commonly referred to as a random oracle. The problem with this design is that whereas it can be adjusted to different memory sizes, the probability of success for a non-cheating prover is always 100%; furthermore, different memory sizes would require different coin values associated with the memory size, or the construction would favor cheaters that register several small memory sizes to set up multiple trees. By applying a qualifying function to any valid output of this, or a similar, PoS, such PoS designs can be altered to level the playing field, making the success of the associated mining a function of the amount of storage space available to the prover/miner. In particular, the success probability can be set to a function that is linear in the amount of space, up to a maximum amount of space. Choosing a linear relationship means that there is no incentive for cheating miners to set up multiple smaller instances in order to perform grinding attacks, since their probability of success would not be affected by this relative to using all their available space for one larger instance of PoS storage.

The quality function disclosed herein, in one embodiment, is a matching function that computes a hash or other description of the response to the challenge provided by the underlying, imperfect scheme, and compares a portion of the hash or other description with a target value. For a miner with half the maximum space used, the portion to be compared would be a 1-bit long portion, e.g., the least significant bit (LSB) of the string produced by the hash function, or the LSB of the description otherwise generated from the response of the underlying scheme. The comparison would be made with a value that in one embodiment is a fix value, such as the value '1'. One can also compare to other positions, and not just the LSB, as long as the position is specified by the scheme. Furthermore, a miner with one fourth of the maximum space would compare a two-bit portion, such as the two most significant bits (MSB) of the result of the challenge, this again compared, for example, to a fix string such as '11'. This miner can have the same chance of success per memory space as the one that has twice as much memory, and for which the comparison was made on one bit only. To accommodate for miners with $3/16$ of the maximum space, for example, a four-bit portion would be compared, creating sixteen possibilities, out of which three patterns would be set as acceptable and lead to a successful mining. For example, a four bit comparison string represented by the bits a, b, c, d could be said to succeed when (a,b,c,d)=(1,1,1,1), or (a,b,c,d)=(1,0,1,1), or (a,b,c,d)=(0,1,0,1). This means that this miner would succeed in exactly $3/16$ of the cases where the underlying scheme outputs a valid response to a challenge. Again, this means that the scheme is fair, and that the probability of success for the miner is directly proportional (and linear) to the amount of space the miner uses for the PoS storage. For a miner that operates with the maximum space, no comparison would be made, all underlying responses being considered valid. This construction is also useful to reduce the probability of successful mining for all parties, e.g., to a setting where the probability of success for a miner with maximum storage is $1/1024$, whereas the probability of success for one with half of the maximum storage is $1/2048$. Here, maximum storage corresponds to an amount set by the system as the largest PoS size accepted, and can be any arbitrary size. This is achieved by adding ten bits to the comparison portion for all miners, causing the maximum size miner to apply a ten-bit comparison and the half-maximum miner to apply an eleven bit comparison. In some embodiments, this is done in two rounds: a first round on ten bits (for the common reduction in success), followed by a size-dependent comparison, which would be "always success" for the maximum size miner, a one-bit comparison for the half-size, and the same four bit comparison described for the $3/16$ miner above for the $3/16$ miner.

The scheme can use a non-linear reduction as well. For example, the matching used for all miners (in the above example, on a ten-bit string) could also be done to a longer string, such as a 20-bit string, and success could correspond to any output with a Hamming weight exceeding a threshold, with a result that if interpreted as an integer would exceed a threshold value, etc. This is beneficial as it allows a nimble approach to reducing (or increasing) the success probability in a scheme, set by a central authority or set as a function of past events, a time, a volume of traffic, a coin value, etc. In other words, the probability could be linked to external events, such as "decrease the success probability by 1%" when the trading price of the coin exceeds $1000, or any arbitrary pre-set function that can be publicly verified.

Thus, one aspect of the disclosed technology is a qualifying function that transforms a collection of PoS instances with different associated memory sizes to a probabilistic PoS for which the probability of successful mining can be tailored by setting the parameters. One set of parameters reduces the overall probability of success, as described above, and in some embodiments is a function that is modified over time, where the modifications can be automatic and depend on publicly observable events, but which can also be manually generated and announced, or be automatic and depend on an event that is not publicly observed. In the latter case, the announcement of the change of the policies, in some embodiments, is made at least one ledger entry before it takes effect, where the announcement may be made, for example, in the form of a transaction being added to the ledger. A second set of parameters adjusts the probabilities of success for different-sized PoS instances according to a reduction formula that in some embodiments is linear based on the size of the PoS instance, but which can also be another function. For practical purposes, the reduction formula may only apply to discrete PoS sizes, such as 16 MB, 32 MB, 64 MB, etc, but not sizes in between these discrete PoS sizes. The qualifying function can also be applied to two or more small instances of a mining scheme that a miner runs. For example, a miner may run one 64 MB and one 32 MB instance of a PoS scheme. The qualifying function would be applied to both of these instances, determining for each whether an associated mining attempt of the underlying scheme should be reported as a successful mining or not. The qualifying function determines for each one of such instances, which may be of the same or of different sizes, whether the mining attempt matches the qualifying function, and accordingly, should be posted as a ledger entry. As an entry is posted, the same qualifying function, operating on the same inputs as it was for the posted ledger entry, is evaluated to determine whether the ledger entry should be accepted or not. This is typically done as part of the verification of ledger entries, which is performed by miners in order to determine the current state of the ledger.

This qualifying function can be applied to any underlying mining scheme, including PoS schemes, PoW schemes, and hybrids of these, as well as other mining schemes relying on other types of resources, and not time and space. In some embodiments, the qualifying function is applied to an underlying mining scheme by generating a match string from at least part of the ledger entry of the underlying mining scheme, or at least part of the challenge associated with the ledger entry, or at least part of a description of the instance of the underlying mining scheme. In some embodiments, the match string is not possible to influence for a miner, but depends on data that is public and which depends on data that the individual miner does not have direct control over, except for in a binary sense by either mining or not mining a coin. Thus, it may be beneficial for the match string not to be a function of recent transactions that have not yet been committed to by having been included in a ledger entry that has been closed. Thus, in some embodiments, the match string is not a function of very recently submitted, but yet-not committed, data. Otherwise, a cheating miner would be able to perform a grinding attack in which multiple tentative transactions or other events are tested to determine if any one of them, if made public, would create a successful mining event based on the evaluation of the qualifying function on the underlying mining scheme. The cheating miner could then make public exactly the mining event that would result in success for it. This would have been a successful grinding attack. This is not practically possible using the design disclosed herein.

This is analogous to how the challenge to a PoS instance should not, in some embodiments, be a function of data that can be controlled by a cheating miner. The qualifying function can also be directly built in to mining schemes, and not applied to underlying schemes, thereby resulting in the beneficial functionality.

In one embodiment, the quality assessment is applied to the output of an underlying mining scheme, thereby assessing whether the generated tentative ledger entry is valid or not, given the reduction of the success probability mandated by the scaling of success based on the size of the PoS instance. In another embodiment, the quality assessment is instead applied to the challenge value, thereby determining whether this is valid, in the context of a given PoS instance, based on the size of the PoS instance, and in some embodiments, based on publicly available information associated with one PoS instance but not another.

In one embodiment, the quality assessment is computed by comparing a counter to a target value, where the counter relates to the number of the ledger entry to be computed, according to a count or offset count of these; and where the target value and its selection depends on at least one of the associated PoS instance, a size parameter value associated with the PoS instance. For example, consider a PoS instance whose size indicates that only one out of 2000 challenges should be considered valid; consider further a quality assessment engine that determines whether the counter associated with the ledger entry to be computed, modulo the value 2000, matches a constant such as a value from 0 to 1999 that is deterministically determined from a portion of the PoS instance, such as its public representation value; or matches a value associated with the public identity of the miner, or another publicly verifiable value or part thereof. This example quality assessment is straightforward and a priori deterministic in that a miner can anticipate when a challenge will be valid, which has some benefits such as improved scheduling. However, there are benefits associated with deterministic quality assessment methods that are not possible to evaluate a priori, such as a better security against targeted attacks such as targeted DDoS attacks, due to the fact that it is not a priori knowable whether a particular miner can engage in a particular challenge or not. This can be achieved by making the quality assessment function be a function of the challenge and a public descriptor, in which case it is only publicly computable whether a mining instance is relevant or not in the context of a particular challenge once that challenge is known. A solution that further strengthens this security involves computing the quality assessment value based on the response to a challenge. This has the benefit that external parties cannot determine whether a particular miner can produce a valid response to a challenge until the miner itself publishes such a response. This protects miners from the risk of targeted DDoS attacks aimed at miners that can be publicly determined—a priori or at the time the challenge is computable—to potentially being able to generate a valid response to the challenge. This is therefore a beneficial security measure in contexts where DDoS risk is a concern. Other approaches of achieving this last benefit involves basing the quality assessment on a value that is not publicly known, but for which a one-way image is publicly known or verifiable, thereby allowing a miner to prove having a valid number in order to show that a challenge/response pair is valid. To make this repeatable, a hash chain or Merkle structure can be used, where the root is part of the publicly registered value associated with the mining instance.

In one embodiment, the material stored by a PoS instance comprises a collection of nodes associated with a Directed Acyclic Graph (DAG), where nodes that depend on others have values that are functions of the values of the associated nodes on which they depend. For example, the function may be a one-way function, such as SHA-1. In such an example, one node in the DAG may be a function of three other nodes, and computed by concatenating the values associated with these three nodes and applying SHA-1, assigning the result of the computation to the node depending on these three parent nodes. One or more nodes in the DAG will not have any parents, but will be generated, in some embodiments, in part as a pseudo-random string, but the miner or an entity associated with the miner. Mining will comprise revealing at least a subset of the nodes, meaning making public the values associated with these nodes. In addition, the nodes are also sometimes associated with a Merkle tree or other authentication structure. In the case of the Merkle tree, then as a subset of nodes is revealed as part of mining, then corresponding nodes in the Merkle tree are also made public in order to authenticate the revealed values and allowing a verifier to determine their authenticity relative to a value associated with the Merkle tree structure. The intention of PoS based mining associated with a structure like this is to force a miner to store a very large portion of this associated data structure in order to have a high chance of being able to find a subset of nodes (referred to as a response), that is valid in context to a challenge or a personalized challenge which is a type of challenge that is modified to be consistent with the size of the mining instance.

However, one form of potential abuse relative to a structure like this is what is referred to as scrolling. Consider for concreteness a structure in which nodes are organized in a matrix, in which all nodes associated with one row depend on nodes in the row above, e.g., the upper row comprises the parent nodes of the nodes in the lower row. Assume that the size of this structure is 100×100. One adversarial abuse is to generate a 100×101 sized matrix, or a 101×100 sized matrix, and then create two mostly overlapping 100×100 matrixes from this, corresponding to two individual mining instances, where each such mining instance has a success probability associated with its size, but where the two derived matrices require essentially the same amount of storage as one matrix would have, i.e., using a form of compression. This can, for example, be done iteratively, e.g., using a 100×105 matrix to create size different but overlapping matrices, or even more if the columns can be reordered. This is a powerful form of cheating. In one embodiment, in order to prevent this, each node is assigned a position, which in a 2-dimensional matrix like the one in this example would correspond to an x and y value; in addition, each node is also associated with the size of the matrix, e.g., 100×100, which we represent by the value S. Instead of taking as input a value v of one or more nodes when computing a new node value with the input values being its parents, we take the tuple (v, x, y, S) as input, or the collection of such tuples where more than one parent exists. Thus, the new value computed from these parent nodes will depend on the positions of the associated nodes and values, and this form of "scrolling" abuse is not possible. For simplicity of denotation, this is not called out in the figures, but is assumed to be used when desirable and applicable.

The cost of proof for the style of graph described above is $3*\log(S)$ where S is the number of source nodes. The graph size is $S*\log(S)$. Assuming a vertex size of 16 bytes, and a minimum graph size of around 1.4 GB gives S=4,194,304 and $3*\log(S)=66$ and a proof size of (66*16 bytes) =1056, or slightly over 1 k byte.

Assuming a 100 TB drive array, the prover would need to manage ~68 k graphs. So, each challenge (block generation) would require 68 k disk reads of 16 bytes each for a total of ~1 MB to locate the highest quality response. Assume that the array consists of 15 drives means 4,500 seeks per drive. Given an average seek time of 10 ms results in total read time >45 seconds.

Assuming that the challenge is determined by the current block, namely 4, gives a minimum block generation time of ~12 seconds. (45 seconds/4≈32~12 seconds).

Consider a second set of parameters as follows:
S=4294967296
Graph size: ~14 TB
Number of instances: 7
Proof size: 1536 bytes This results in an effort of 7 disk reads—plus some overhead for the tree, not taken into consideration here for the sake of simplicity. These two examples show the tradeoffs associated with the parameter choices described.

If the ledger closing speed is on the order of a few seconds, then the parameters of the first example is not suitable, as the miner with that installation would not benefit from having large storage space. That miner would want the second parameter choice. However, a small-space miner (say, a user with an iPad) would not be able to use the second set of parameters, and would have to use the first set (but with less memory). That means both can finish within milliseconds, say, giving them both a chance to submit a proof "on time". This shows the benefit of allowing multiple sizes for proof instances, thereby enabling devices with various memory sizes to participate in the mining effort.

A second type of quality function is a central quality function.

The above portion discloses a local quality function used to control the probability of winning, the number of submissions generated, and the relationship between the graph size and the probability of winning. In addition, to break ties between largely concurrent submissions, a central quality function can be used.

To determine what ledger submission to select among competing mining instances, SpaceMint and related technologies have a server-side quality measure that assigns a score to each submission. The user with the best score wins. If a user has more space, his odds for a good score increases (although not linearly with the amount of space) In our disclosed approach, in contrast, all submissions (independent of denomination/space) will have the same odds of winning. The disclosed technology is associated with computing a quality measure for each, such as the distance between hash(challenge) and hash(response) and select the response with the minimum distance. This is a server-side quality measure. A local quality metric based on the number of 0s in the left-side of a solution is also considered.

An example embodiment takes at least a portion of the ledger entry, which we refer to as E here, and the challenge, which is referred to by c, and compute a distance D=|hash(E)−hash(c)| where denotes taking the absolute value, − is standard subtraction with carry, and hash is a hash function such as SHA256. This is done for at least two potential ledger entries E1 and E2 that are competing during a particular time frame. The winner is the ledger entry with the lowest value of D. In one optional embodiment, an additional time decay value is introduced, where a verifier comparing two or more potential entries and which knows an ordering in terms of the arrival time, will discount the known-to-be-more-recent entries by multiplying their computed value D by a small multiplier weight, such as W=1.1. Thus, if a verifier knows that E1, E2 and E3 were seen (by the verifier) before E4 was seen, which was in terms seen before E5 was seen, the verifier may assign weight 1 to D1, D2 and D3, where these are the distances associated with E1, E2 and E3, and a weight 1.1 to D4, and a weight 1.1*1.1 to D5. Thus, this makes the earlier submissions stronger. Different verifiers will likely have different views on the arrival times of entries, and so, there will not be a global agreement on what the ordering is. Nevertheless, the distributed decision making of large numbers of verifiers will result in a selection that favors old submissions. The weight W can be selected as different values, such as W=1.01 to W=2, resulting in different degrees of preference to early submissions. Selecting a small value W will cause greater branching (which is potentially disadvantageous) but also better consensus-forming (which is good). The best choice for W may depend on the number of verifiers, the number of miners, the extent to which the network is synchronized, and other factors. In one embodiment, the value W is set by individual verifiers in response to their observations of the number of branches, for example. If the number of branches exceeds a threshold value T as a rolling average over some number of ledger closings, then this may cause a verifier to increase the weight W. Other verifiers will most likely do the same, provided they are aware of the extent of branching, and therefore, a new value W will be used by a large number of verifiers (including miners) and therefore cause the consensus mechanisms to react in response to detected imbalances. This is an aspect of the disclosed technology, and is used in different context as described herein.

Many PoS schemes do not allow for different graph sizes, or require these to correspond to separate ledger graphs. In other words, different graph sizes are interpreted as different denominations. This potentially causes lack of robustness. In contrast, in the disclosed approach, a miner can submit multiple attempts. Each attempt can only be submitted to one chain branch (or is invalid). Only attempts that satisfy the local quality function qualify to be submitted. The local quality function has a probability of causing qualification that is linear in the size of the graph. As a result, the disclosed technology does not need different denominations, and can still support different graph sizes. Here, twice the graph size causes twice the chance of qualifying to be submitted, and therefore also twice the chance of winning, since the central selection is also linear.

It is understood that heuristic functions may be undesirable, as well as any other functions that result in a lack of linearity of probability of winning, relative to the assigned memory size of the miner. In contrast, the disclosed technology does not suffer from this, and has a largely linear behavior A third type of quality function is a branch-selecting quality function.

Due to lack of synchronization resulting from distributed storage of ledgers, it is likely for multiple branches to the ledger graph to co-exist temporarily. However, since the ledger graph should be a linear graph, in some embodiments, synchronization is performed. This may be achieved using distributed consensus mechanisms. BitCoin and other existing crypto payment schemes and their corresponding mining mechanisms use a complex quality measure function that combines the scores of ledger entry submissions with scores associated with series of ledger entry submissions (for example entire branches) with various heuristic weights to combine these. These can be used in the context of the disclosed mining method; however, an alternative and much simplified method can also be used for the disclosed technology. This is a third type of quality measure, which relates to the selection of a branch. The underlying disclosed structure avoids the complex and heuristic methods in favor of a branch selection strategy that simply selects the longest branch, using the central quality measure as a tiebreaker between two equally long branches. This is a distributed consensus method, and its success depends on the rational behavior of the miners, each one of which will select the longest branch that they do not already have a stake in. Since branches will be short, there will only be a small number of miners with a stake in a given branch; these are the only miners for which cheating (i.e., not choosing the longest branch) is rational. Since there will be much fewer of these miners for any one situation (given that branches will be only a few ledger entries long), the fact that there is a massive number of competing miners will automatically cause the longest branch to be selected by the largest number of miners. This will be the branch that the miners will use to submit ledger entries to.

In one embodiment, the challenge will not be a function of any data related to the separate branch, but only to data that is common between all potential branches. This can be achieved by setting the challenge to be computed from previous ledger entries from a period that exceeds the number of ledger entries in branches, which in turn sets the granularity, i.e., speed, of the closing time for ledgers. Challenges are computed from data that is not derived from data that is submitted or otherwise controlled by miners, to avoid grinding, as described in this disclosure.

Competing proposals use a discount factor in the computation of a quality value related o the chain, i.e., to a branch. While this is compatible with the disclosed technology, it is not necessary, and the disclosed technology can be used without the use of discount factors.

Avoiding Compression

Another form of abuse that could affect PoS based mining schemes is a form of compression that involves generation of a PoS mining instance, including registration of a value associated with this, when applicable, followed by storing of only a portion of the instance such as the seed from which it was computed or some subset of the values it comprises; followed by the generation of another mining instance, as above. Then, during mining, the miner can determine whether one mining instance results in a valid response, and if it does, submit the corresponding response to the challenge as a ledger entry; but if it does not correspond to a valid response, then re-generate another mining instance from the seed or other values representing it, and determining whether this second mining instance provides a correct response to the challenge. A more severe version of the attack is that the one or more values that the cheating miner stores can be used to determine whether the mining instance will, or will be likely to, generate a valid response, and selectively regenerate only those mining instances that provide the best probability of mining success. We can think of this abuse as an attack with "regeneration of compressed mining instances." However, the same type of abuse also applies when there has been no prior generation of the instance, and instances do not have to be a priori registered, e.g., by submitting a representative value as part of a transaction to the ledger. To counter these types of generation-based abuses, it is sufficient that the expected time of generating a mining instance exceeds the time during which a ledger entry typically remains open before a miner succeeds in finding a valid response to the current challenge, and closes the ledger by submitting a ledger entry comprising the valid response. This can be achieved by replacing some of the functions used with slower functions filling the same need. For example, instead of computing a SHA-1 of a collection of values corresponding to parents of a node to determine the value of the child note, we can compute a function that corresponds to the 1000-time serial application of SHA-1, meaning that SHA-1 would be applied to the values of the parent nodes (along with the associated coordinates, as described above), and the result of that application is hashed, using SHA-1, and the result of that last SHA-1 application is hashed using SHA-1, etc., until a total of 1000 SHA-1 applications have been applied. In one variant of this approach, an additional parameter such as a counter is also included in the input of each SHA-1 round, and if the result of that round does not satisfy a criteria, such as having 0 as its least significant bit, then the round is re-done with a new counter value, such as increased by one, to determine whether that satisfies the criterion. This would be repeated for at least a portion of the hash function applications in the series. This leads to a slowdown of the derivation process, and that the degree of this slowdown depends on the number of bits that are matched to determine the criterion. A variety of criteria can be used, such as comparing multiple bits with zero, or with another target string, or to compare that some arithmetic constraint is satisfied, such as the result being divisible by 5, etc. These methods can be applied not just to SHA-1, but any function, including functions that are not hash functions.

When a verifier, including another miner, wishes to verify a submitted ledger entry, in some instances, the verifier would have to perform the "expensive" function to verify some of the nodes, such as in the example with the 1000-iteration SHA-1; however, in the example involving a counter, it would simply have to know the value of the input to the hash function, just as in the example in which the result had to be divisible by 5. In other contexts, it is sufficient for a verifier to determine that there is a preimage to a node value, in which case the miner submitting the ledger entry can provide this number, which in the iterated-SHA-1 example would correspond to the second to last value in the chain of hash function applications, i.e., the preimage to the node value. In some embodiments, some verifiers are satisfied with this, whereas other verifiers, which we may call bounty hunters, verify each step of the computation, and if they find an error, then they submit evidence of this in return for some reward, thereby also invalidating the incorrect ledger entry and, potentially and based on a policy, all subsequent ledger entries. Such proof could be submitted in a manner that is associated with a public key, in which the bounty hunter proves knowledge of the error, and of the secret key associated with a public key, thereby assigning value (namely the bounty) with the public key. In one alternative embodiment, the proof is a proof of knowledge, and is of either the error or of the secret key corresponding to the public key, or both. In one embodiment, this is done by submitting a first transaction which comprises a public key and an encryption of the evidence of the evidence of error, where the encryption uses a key not related to the public key such as a randomly selected AES key. Then, in a subsequent time period, the bounty hunter would provide the AES key or other decryption key, allowing anybody to access the evidence. If the evidence in question has not been submitted before, this would automatically invalidate the ledger entry that is proven wrong and provide the bounty hunter with value, such as the value of $1/100$ of a coin, where a coin corresponds to the value obtained by successful mining. An example of evidence of error in one example comprises a value that is a preimage to the node, but which, when the iterated hash function is applied, does not produce the correct node value. This can be derived by a bounty hunter that get access to a sufficient number of preimages to derive what the node values should be.

In another embodiment, a regular verifier verifies that the response to the challenge, corresponding to the ledger entry, is consistent with the already published Merkle tree value associated with the mining instance, where such a value exists.

In some embodiments, there is no use of a Merkle tree, nor of prior registration of a mining instance. The case where such a Merkle tree instance is used is described in the examples in the Figures described below; however, in instances where no Merkle tree is used, analogous techniques are used wherein instead of using the Merkle tree representation value (referred to, for example, as value 1110 in FIG. 11), a constant value is used, such as the value 0, or a value associated with the owner of the mining instance, where such a value may be a public key.

One benefit with PoS based mining is that it does not require a lot of power, nor a lot of time. To make ledgers not close too often (which would not promote any benefit, and which could cause inflation), the probability of success should be relatively low. Every time a new transaction is submitted, a new opportunity to mine would present itself in a system where the challenge depends on transactions that are submitted, as opposed to only on the ledger entries. (Both types are described.) If the ledger entries occur too frequently, the success probability can be automatically reduced, as described in this disclosure. Similarly, if the ledger closings are too infrequent, the success probability can be improved in an automatic manner, according to the same principle. If transactions arrive with reasonably tight inter-arrival intervals, then no miner can hope to control the mining by finding a transaction that would give them an advantage and then submit that, as by then, another transaction would be likely to be submitted, too. Verifiers and miners will determine the set of transactions to consider based on their arrival order, but may have different views since this is a decentralized system. In some embodiments, this is dealt with by permitting multiple branches of the ledger, but to automatically prune it down to one branch once the ledger grows sufficiently far beyond a first branch, which may be, for example, four ledger entries away. Any ledger portions that are "pruned away" in this sense are no longer considered, and any ledger entry corresponding to such portions are invalid, and the associated public keys not validated. However, all the branches, in some embodiments, take the same transactions as input. The selection of what branch to prune away is based on miner-based consensus, where ledger entries that include a larger number of valid transaction descriptions (that other miners are also aware of and are taking into consideration) are considered better, which could be done using a scoring system, where each transaction is given a number of points, and transactions observed early on are given more points than transactions observed later, and wherein each miner assigns a score to a collection of transactions accordingly. Excluding one transaction or intentionally reordering transactions for the purposes of getting a challenge that can be answered will lead to a ledger entry with a lower associated score. After some number of ledger entries after a potential branch, the scores are compared and the highest-scoring branch selected to keep. This will be a distributed decision, where miners will be incentivized to mine on branches that are likely to survive the pruning. As a miner decides what transactions to include, it can only include transactions that have not yet been included in an already closed ledger for that particular branch.

In a PoS based system in which the challenge is only a function of old ledger entries and not on transactions that are submitted, another problem surfaces: if no miner has a response to a challenge, then this will not change as transactions are posted. One approach is to let only a small number of transactions be able to influence the challenges. We can call these super-transactions. These may be selected using methods similar to those used to compute the quality measure, where a transaction that is detected to be a super-transaction based on the evaluation of a quality measure on it would contribute to the challenge, modifying it, e.g., by taking at least portions of the supertransaction as input to the function that computes the challenge.

Alternative Approach to Avoid Compression-Based Abuse Using Hints.

Crypto payment schemes using Proof-of-Space (PoS) constructions are based on graph structures, where a graph comprises a set of nodes arranged, for example, as a Directed Acyclic Graph (DAG).

Some graph structures, such as the graph structure of SpaceMint, are selected based on a theoretical result that describes the asymptotic complexity of generating or using the graphs. SpaceMint has a known complexity of $\theta(N/\log$ N) for storage requirements, in order to meet computational requirements; here, N denotes the number of nodes in the graph. However, whereas asymptotic behavior is beneficial to understand, it is not sufficient to avoid attacks and abuse based on cheating strategies such as a strategy to essentially only store a seed for a graph, and then expand the seed to its corresponding graph to determine whether the graph corresponds to a potentially winning response to a challenge. Such as response, if winning, would be part of a ledger entry. The reason is that the asymptotic notation hides constants, as is well understood in the related fields of complexity theory and theoretical computer science.

Other graph structures, such as the graph structure of BurstCoin, are instead based on being sufficiently complex that there may not be any practical attacks against them, or that these attacks are difficult to create due to the complexity. This approach could end up being very vulnerable once the associated crypto payment scheme gets sufficient attention, since that is likely to bring greater scrutiny and incentives for abuse. This may encourage sufficient analysis for dramatic flaws to be found, as developments in the field of cryptography occur.

One example of an approach to address abuse against graphs is to select a one-way function used for the computation of node values in a manner that makes the computation slow. That would allow the use of either type of graph, and in particular, would permit the use of graphs for which there are asymptotic computational behaviors that are well understood. For example, if there is a seed-expansion attack that takes a second to execute on a typical attacker computer, and it is desirable to guarantee that attacks take at least 1000 seconds to carry out, then one solution is to replace the one-way function with another one-way function that is a thousand times slower to compute. BurstCoin uses a slow hash function for the derivation of node values for the graph, and most likely for this reason. One drawback with this approach is that the slow function may not have been given much scrutiny, and may therefore be flawed. It is better to use a common hash function, or other one-way function, that has received much scrutiny. It is known in the art how to slow down known functions instead of replacing them with unknown functions. This is typically done by iterating the one-way function a thousand times, taking the output of the previous iteration as the input to the next iteration. This is also beneficial as the approach permits a largely arbitrary slowdown; for example, to slow down a given function ten thousand times instead of a thousand times, the number of iterations would simply be changed to 10000. This can even be done in response to network events, if the iteration count is a variable that can be changed by system events.

However, this approach is still problematic, especially for very large multipliers, in that it would also cause the slowdown of verifying a PoS proof, which is a common operation performed by any miner before the onset of a mining effort, and which should also be performed in the context of verifying ledger entries.

The current disclosure addresses the problem of slowing down functions, when performed during setup or expansion from a seed, but which do not slow down verification. Moreover, the slowdown does not apply to the mining process, which is desirable to limit energy costs of mining, which is one of the main raisons d'être for PoS-based crypto payment schemes. In particular, to keep PoS based crypto payment schemes green, it is beneficial for the mining either not to need lots of computation, or for the mining not to need a lot of computation to reach a point where the miner can determine whether a particular mining instance has a good chance of winning. It is acceptable, once that is determined, that it may cost a fair amount in terms of energy or processing to process the instance to get it ready to be submitted, as this is only performed in a very selective manner.

The current disclosure achieves these goals by introducing a construct we refer to as hints. In one embodiment, hints are specific to each node, whereas in another embodiment, hints are instead specific to a selected layer in the graph, where all nodes of a layer are functions of the nodes of the previous layer.

Let the following be nodes on layer i:

$Ni1\ Ni2\ Ni3\ Ni4\ \ldots\ Nin$

The nodes on the next layer j=i+1 are:

$Nj1\ Nj2\ Nj3\ Nj4\ \ldots\ Njn$

For some existing graph structures, Nja=hash(Nib, Nic) for some (a,b,c) according to a pre-set pattern. This does not achieve the goals this disclosure addresses. Instead, we set $Nja=\text{hash}(Nib, Nic, \text{hint\_layer\_}j)$ for some (a,b,c) according to a pre-set pattern. Here, a value hint_layer_j is valid if $XOR\_\{all\ a\}\ LSBk(Nja)=0$, i.e., the XOR of all the strings of k least significant bits of the values on the same layer is all-zero. A variety of other criteria can be used, such as the XOR of the n least-significant k bit strings matches another pattern. Note here that if a value hint_layer_j does not satisfy the criterion, then a new value hint_layer_j needs to be tested. This is done by recomputing all the Nja values using the new value for hint_layer and determining whether the resulting combination satisfies the criterium. Other combination functions than XOR can be used. In one embodiment, this is applied to all layers but the last layer, with a potentially different value for the hint for each layer.

Note also that the validity of a hint may not be determinable without computing all the node values and combining them. Thus, k can be relatively small, such as 1 or 2 bits, and the computational impact would remain very large. The number of hash value computations per layer corresponds to $2^{kn}$ rounds of computing all values. So for k=1 (we only consider the one least significant bit) and n=10, we have an additional effort of a factor 1024 compared to the "normal" version without hints; this means that the layer takes 1024 times longer to compute than it would for a version that has not been augmented with hints. For k=2, n=10, it is a factor of one million. This is for each layer. In some embodiments, to avoid having to re-do this work, the hint is stored. This hint is approximately of the size log 2(kn) bits. Thus, the miner stores all hints. With these, the determination of whether a mining instance is winning is rapidly performed using a small number of lookups. In one embodiment, honest miners would store all the hints and the seed from which the graph was computed, but not the individual nodes of the graph, which are rapidly regenerated from the seed value and the hint values. However, a cheating miner that does not store the hints would face a very large computational burden, and a resulting delay in determining whether a mining instance is likely to generate a winning response to a challenge or not. This forces miners to be honest, or they are likely to lose the race of quickly providing responses to challenges, which is what the mining task corresponds to.

An alternative approach involves hints that are unique to individual nodes. The following is an example of how this can be done:

Let the following be nodes on layer i:

Ni1 Ni2 Ni3 Ni4 . . . Nin

The nodes on the next layer j=i+1 are:

Nj1 Nj2 Nj3 Nj4 . . . Njn

We set

Nja=hash(Nib,Nic,hint_node_(j,a))

Here, a hint value hint_node_(j,a)) is valid if it satisfies a pre-set computational criteria, such as LSB_k(Nja) may have to match a pre-set string such as the k-bit zero-string. Here, hint_node_(j,a)) is k+e bits long, where e is a length that is set to make it very likely that a valid answer is found, e.g., e=16. In one embodiment, the hint value is a variable-length string that the miner selects to satisfy the criteria. In one embodiment, the criteria is that LSB_k(hint_node_(j,a)) =LSB_k(Nja) for hint_node_(j,a) to be valid.

In one embodiment with node-specific hints, the hint is verified for each node, and stored. It is possible to combine the two types of hints by having both a node-specific hint and a layer-specific hint, and for each of these, an associated validity function. In this embodiment, the miner may have to find variable choices for both node-hints and layer hints that satisfy the criteria associated with these.

For all these variations, it can be seen that once a hint is computed and stored, the miner can very rapidly compute functions of the graphs, and allow a verifier to verify such functions. One example function relates to the computation of a node value from its parent nodes.

In some embodiments, it is beneficial to combine the above structure based on hints with a Merkle tree or related technique to verify that a response to a challenge corresponds to a previously registered graph. While the disclosed structures and techniques do not require that graphs are registered before mining can start, there are often security benefits associated with doing that. The computation of the Merkle tree, and the verification of the same, can be done independently of whether hints are used or not, and that the disclosed technology is backwards compatible with previously proposed methods for registering graphs.

In this example we search for a node specific hint. The function findHint takes a node digest (s), a node index (i), and a difficulty (difficulty). The function then tests monotonically increasing values for a hash parameter p.hint in order to find a string p(s, i, hint) such that the least significant bit count returned by the function LSB is greater than or equal to the desired difficulty level. When a suitable value for p.hint is found the value is returned to the caller via a hint parameter.

```
int findHint(Digest const *s, uint32_t i, int difficulty, Digest *hint) {
  // p is a string containing (s, i, hint)
  LeafHashParameters p;
  Digest d;
  p.s =*s;
  p.node_index = i;
  uint16_t lsb = 0;
  p.hint = (int)0;
  while (lsb < difficulty) {
    gross_hashes++;
    simpleHash(&p, sizeof(LeafHashParameters), &d);
    lsb = LSB(d);
    if (lsb >= difficulty)
      break;
    p.hint += 1;
  }
  *hint = p.hint;
  return lsb;
}
int LSB(Digest d) {
  int lsb = 0;
```

-continued

In this example we search for a node specific hint. The function findHint takes a node digest (s), a node index (i), and a difficulty (difficulty). The function then tests monotonically increasing values for a hash parameter p.hint in order to find a string p(s, i, hint) such that the least significant bit count returned by the function LSB is greater than or equal to the desired difficulty level. When a suitable value for p.hint is found the value is returned to the caller via a hint parameter.

```
  for (int i=d.length( ); i >0; i--) {
    uint8_t byte = d.value[i-1];
    for (int j=0; j<8; j++) {
      if (byte & 1) {
        return lsb;
      }
      byte >>= 1;
      lsb++;
    }
  }
  return lsb;
};
```

Additional Method to Avoid Compression

Yet another example approach to avoid compression is to require that an evaluation of a challenge requires not only that a select portion of the graph G is accessible, but that a much larger space is assigned. In particular, existing techniques have a deficiency in that a cheater can store a small number of nodes, or a seed, and then compute a select portion of the graph G from such data in order to evaluate a challenge for a given graph G. To avoid this, it is beneficial to force that at least a portion of the Merkle tree associated with G is known to evaluate the challenge. Denote the Merkle tree of G by M(G). M(G) corresponds to the tree used to register an instance corresponding to G. To compute M(G), it is necessary to store G, and it is not practical for a cheater to store a seed from which traces of G are computed, while at the same time storing the entire M(G): doing so would cause a lower degree of compression than what the cheater would desire. Let m(G,Ni) correspond to the nodes of M(G), or some portion of these, that corresponds to the trace of M(G) that is used to prove that Ni is a node of G. For a challenge C, at least one node Ni is selected, where Ni is part of the response if the challenge can be answered. However, in order to determine whether Ni is part of a successful response to C, m(G,Ni) is needed. One approach to require that is to compute the local quality measure as a function of (Ni, m(G,Ni)), i.e., by computing H=h(Ni m(G, Ni)) where denotes concatenation, and determine whether H satisfies a quality criteria. This way, a miner is not able to determine what graphs G produce a potentially winning response to a challenge C without storing at least m(G,Ni). Since a cheater cannot predict what node Ni will be useful to store, it will also not know what portions m(G,Ni) are useful. Storing only portions of M(G) will degrade its success by at least a fraction corresponding to the portion of M(G) that is not stored, and therefore, a cheater will need to store M(G) in its entirety or be prepared to compute m(G,Ni) on the fly, upon seeing C. This leads to a computational task of size approximately the same as computing M(G), which may require computing all of G, as opposed to just a small portion of it. This method can be used alone or along with one or more methods to avoid compression, and that there are variants for how to require the computation of M(G) by forcing the miner to know at least a portion of M(G), where this portion is a priori unpredictable.

A Memory-Bound Time Delay Function that Cannot be Abused for Grinding.

Whereas crypto payment schemes based on proofs of work have many drawbacks, including their environmental impact, the cost of mining, and more, payment schemes based on the competing proof of space paradigm have other potential weaknesses. One such weakness is a risk that mining pools may identify a potentially winning mining instance but not make it public immediately, instead determining if the mining pool has another, and competitive mining instance, and then attempt to determine which ones of these two instances is likely to result in the highest likelihood of finding a third instance based on either the first or the second instance. This way, the mining pool can create and select a path that benefits its members, thereby placing others at a disadvantage. This is particularly troublesome in the context of proofs of space that are very rapidly generated, and could result in some mining pools creating very long chains of subsequent mining instances in milliseconds, then submitting these entire chains while other miners are submitting single instances. Since it is beneficial for the longest branches to prevail, this gives a large benefit to large miners and mining pools, and corresponds to a discouraging drawback to small miners. This, in turn, reduces the number of interested participants, which results in a slower rate of closing of ledgers and lesser robustness of the scheme in general. To overcome this problem, it is beneficial to combine the proofs of space with a time delay function.

A time-delay function is a type of proof of work, but different from what is currently used in existing proof of work based crypto payment schemes. If the time-delay function is applied before the proof of space, it would incur a cost to miners independently of whether they have a winning instance or not. If the time-delay function is part of the proof of space, the result is a hybrid proof of space and proof of work approach that, unfortunately, inherits the shortcomings of each of the two contributing approaches by incurring a processing cost (and therefore an energy cost) for each lookup that is part of the proof of space based mining. Therefore, the time delay function should be applied after the proof of space, and be dependent on the proof of space. Using a time delay function after a proof of space dramatically reduces the incentives for mining pools and large mining entities to attempt to build multiple branches and select the longest one, as opposed to simply submitting mining instances that have a good chance of winning. That is because the delay associated with having to compute the time-delay function increases the risk of this type of strategy, as competing parties may succeed in advancing the chain while the misbehaving mining pool or large mining entity attempts to establish what series of mining instances to select.

Existing proposals for time delay functions are based on processing, just like proofs of work are. Thus, the delay associated with the time delay is inherently associated with processing, and therefore with energy costs. Whereas these costs would only apply to already selected proof of space instances with a potential to win, the delay is nevertheless directly associated with an energy cost. In this disclosure, we introduce the notion of a memory-bound time delay function. This is a time delay function that derives its property not solely from the action of performing processing, but to a large extent instead, from the action of loading data from memory into a processor. In addition, this approach is beneficial as devices of very different computational capabilities commonly have very similar bus speeds. Therefore, by using a memory bound time delay function, the playing field is levelled between smaller consumer devices and larger special-purpose mining rigs, therefore incentivizing a large number of users to contribute their devices to the effort of mining. For the same reason that it is a drawback for a scheme to be dominated by a small set of mining pools and large miners (resulting in a smaller marketplace and reduced robustness, among other things), it is beneficial to level the playing field by making it desirable to use not only powerful devices for mining but also less powerful devices. Therefore, one important aspect of the disclosure is the notion of a memory-bound time delay function.

One aspect of a good time delay function is that it should be dramatically faster to verify a solution than to compute the solution. For example, while it may be desirable for the delay function to impose a one second delay for the miner, it is not acceptable for a verifier to have to spend a second to determine whether the result of a time delay function is valid. This should be near-instantaneous.

It is desirable for the generation of the output of the time delay function not to be parallelizable. Whereas small degrees of parallelization is not a big problem, it would be defeating the purposes of the time delay function if it were possible to massively parallelize its generation. That is because this would, again, encourage large-scale collaboration between large sets of collaborating computers (whether part of a mining pool or a large miner) to quickly compute the time delay function. If that were possible, it would again allow mining pools and large miners to gain an advantage over (and at the cost of) smaller parties, which would be undesirable. This is another reason why the use of a memory bound function is beneficial: in the absence of large-scale replication of the data used to compute such a function, parallel processing would simply not be possible. At the same time, massive replication of large pieces of data would come at a cost, since it would take space that could otherwise be used to store proof of space mining instances that can be used to mine.

Furthermore, it is important for the time-delay function not to enable grinding. Grinding the action of introducing randomness into the mining process in order to allow multiple opportunities at responding to a challenge with a single proof of space instance, simply by offsetting the challenge in multiple ways and therefore be given multiple chances. Grinding is undesirable as it turns constructs that otherwise would have been predominantly proof of space instances into hybrid instances with substantial aspects of proof of work, thereby inheriting undesirable properties of proof of space schemes. Accordingly, neither the proof of space component nor the time delay function should offer a miner the opportunity to grind. This, effectively, results in requirements relating to deterministic functions for which a verifier knows that the result was generated in a deterministic manner (or at least, where there is no advantage to introduce randomness).

In this context, we will let C denote the challenge to the Proof of Space (PoS) instance, and let A denote the answer. The generation of A from C can be done in a multiplicity of ways, some of which have been described in this disclosure. Other competing PoS can also be used with our disclosed time delay function. The answer A typically comprises a set of nodes NA of a graph G that is used for mining, as well as a proof P(A) that this set of nodes corresponds to a registered instance of the graph G. Such a proof typically comprises a set of values corresponding to a Merkle tree, or a similar construction.

A first time delay function, described for educational purposes only, involves finding a value V such that $F(C,A,V)$ satisfies a requirement. For example, F can be to apply a hash function to the inputs, select the 20 least significant bits, and determine whether they are all zero. If they are, the value V is a valid result of the time delay function, as applied to the proof of space instance corresponding to (C,A). Here, the hash function associated with F, as well as all other aspects of F, would be commonly known. To verify a value V, a verifier would obtain (C,A,V) and determine whether F(C,A,V) satisfies the requirement, e.g., whether LSB20 (hash(C,A,V))=0. If that is so, then the verifier accepts V as a valid time-delay function related to (C,A). It is clear that this first time delay function requires substantially more work to compute (or generate) than to verify, since a prover will find that most tentative values V do not result in a valid outcome, e.g., the twenty least significant bits would not be zero. It would take on average a million attempts at selecting a value V before a miner finds a value V that is a valid time-delay function relative to (C,A), but a verifier would be able to verify a triple (C,A,V) using only one hash function application. However, this first proposal, while simple, is both easy to parallelize (a million computers can try their own value of V concurrently, with the computer that succeeds announcing the result) and a potential source of grinding.

Therefore, to address these two shortcomings, a modified version of the first time delay function described above is disclosed. In this second version, the value V comprises k nodes, collectively denoted N, where each of the k nodes of N are nodes of the graph G associated with A, that in turn is the answer to the challenge C. In addition, P denotes a set of proofs, one proof for each of the k nodes of N, where one method of generating the proof is the same approach as used to generate the proof PA that is part of the answer A. That is, each part of this proof P, corresponding to one node of the graph G, would correspond to an opening up of a Merkle tree associated with G. Here, if k=1, that means that it is sufficient to find one node of the graph G and to hash that node, its corresponding proof, the value C and the value A, to determine whether this corresponds to a valid evaluation of the time delay function F.

Here, the inclusion of the proof related to the instance is optional for the purposes of computing the time delay function, and in one alternative version, is not included in the computation of the hash value. Including the proof makes the computation slower, and discourages attacks in which portions of the graph G is shared with different collaborating processors, each collaborating processor attempting to solve the time delay function. That is so because the inclusion of the proof forces the miner to have access to a larger amount of stored data.

If k=3, for example, then the miner may have to select combinations of three nodes from the graph, and apply the function F to C,A and these values, and optionally to the proofs associated with the three nodes of G, and then determine whether the result satisfies the criterion. The verification process is the same as for the "educational" first version, except that a verifier would also have to verify that the proofs associated with each of the k nodes N are valid and correspond to the same graph G as was used in the proof related to A. This is a quick verification, and only requires a small number of hash function applications.

Moreover, since the miner is constrained in the sense that it needs to select a value V that corresponds to its already registered graph G, this approach limits the degree to which grinding is possible, but it does not preclude a limited amount of grinding. One aspect of the disclosed approach is to eliminate the possibility of grinding, both for the PoS component and the time-delay function, and therefore also for their combination. This is done by computing challenges C only from past challenges, past answers (such as A), but not from the values V comprising the time-delay function values. That means that the time delay function is included in the submitted mining instance, which comprises (C,A,V), and is part of the verification of the instance, but that it is not used for the computation of future challenges.

The generation of the time-delay function output will succeed with high likelihood as long as $|G|^k *p\gg 1$, where $|G|$ is the number of nodes of the graph G, k is the parameter indicating the size of the set of nodes from G in V, and p is the probability that the function F, on a random input, will be valid. In the above example, $p=2^{-20}$, given that it requires that the twenty last bits of the computed hash function value are zero, and a hash function operates as a random oracle. If G has 215 nodes and k=2, then $|G|^k *p=1024$, making success very likely. If a pair (C,A) has no valid time delay function output for a given associated graph, this simply means that the answer A is not valid, given the absence of a solution V; this should be relatively rare, though, or the combination of the proof of space and the time delay function becomes more of a proof of work hybrid than if the time delay function mostly always has a valid solution.

One particular example instance of the disclosed time-delay function is therefore described as follows:

---

A time delay function TimeDelay which searches a graph G for an initial node i such that i meets or exceeds the time delay quality value defined by GRAPH_DIFFICULTY. The node digests are streamed in from a low cost serial storage device SD and processed in real time. The serial nature of the device prohibits parallel processing of the nodes.

```
int TimeDelay(Graph G, Digest *C, Digest *A) {
  // search G for V meeting TimeDelayFunction
  uint32_t i;
  time_t start_time = time(NULL); // for characterization
  for (i=G.first_leaf_index;i<=G.last_leaf_index;i++) {
    Digest V =*getNodeFromStorage(SD, G,i);
    if (TimeDelayQuality(C, A, &V))
      break;
  }
  printf("Time delay = %'ld seconds\n", difftime(time(NULL), start_time));
  if (i>last_leaf_index)
    i = -1;
  return i;
}
bool TimeDelayQuality(Graph G, Digest *C, Digest *A, Digest *V) {
  TimeDelayHashParameters p;
  Digest F;
  p.C = *C;
  p.A = *A;
  p.V = *V;
  Hash(&p, sizeof(p), &F);
  int quality = F.getQuality( );
  return quality >= GRAPH_DIFFICULTY;
}
```

---

Instead of basing the time-delay function on one search task, it is sometimes beneficial to base it on multiple smaller tasks instead, to reduce the fluctuation in time for performing the computation. To avoid that these multiple tasks are performed by several processors, i.e., to avoid parallelization, it is desirable to link the tasks to each other. One way to do that is to base task number j+1 on the solution of task number j; this can be achieved by using the solution to task j as part of the input to the function that specifies task j+1. For example, if task j involves finding a value x such that f(x) satisfies some criteria, then task j+1 could be defined as finding a solution y such that f(x,y) satisfies the criteria. In the example where corresponds to identifying one or more nodes of a graph, f is a hash function, and the criteria associated with evaluating f(x) is to match portions of this value with a string, such as the string "0000000" to be matched with the LSB of f(x). Then, the j+1 st problem would be to find a value y (one or more nodes of the graph) such that f(x,y) matches the string "0000000", where again, f corresponds to a hash function. This way, it is not practically meaningful to start computing the solution to the j+1st task before a solution has been found to the jth task.

In one embodiment, the time-delay function is based not only on nodes of G, but also on nodes in the Merkle tree associated with G, which we refer to as M(G) here. This is beneficial because this complicates matters for a cheating miner that wishes to compress the state by storing only portions of G and M(G), or storing portions of these graphs in a compressed manner. Thus, representing the collection of nodes of G and M(G) as a graph G2 and performing the time-delay function computation relative to G2 instead of G, this strengthens the resistance against compression-based attacks.

ASIC (Application-Specific Integrated Circuit) Resistance.

Another goal is to provide resistance against ASIC-based mining (should this be desired) and to penalize cheaters that do not store the entire graph G but builds at least portions of it each time a new challenge is received. One beneficial approach involves computing the nodes of G from at least one parent value, and from at least one god-parent value. Here, the godparents are selected among all the nodes of G that have already been computed, using the value of the at least one parent.

An example embodiment has the following components.

1. The graph G is generated from a root value R that is pseudo-random, random, or a priori unpredictable to a potential attacker.

2. For simplicity, assume the graph G to be constructed has H layers of W nodes each, for a total of n=L*W nodes in the graph.

3. On layer 1, node $N1i=hash(R,i)$, $1<=i<=W$

4. On layer k>1, we compute a selector value $Ski$ for each node $Nki$ to be computed, where $Si=hash(N(k-1)i)$. This means that the selector is based on one parent value, which in this case is the node straight above the node to be computed. This selector value is used to determine what one or more godparents to select. In this example, we will assume the use of three godparents, but any number of godparents can be used, and that the number of godparents can either be fixed, be a function of the layer k, a function of H and W, or be selected based on the type of device that is used for mining.

5. In this example, $Ski$ is the portion of G that has already been computed, i.e., all nodes on layers above the to-be computed value, and those on the same layer but with lower values of i. (This assumes, for example, that the computation on a layer proceeds in terms of increasing values of i.) Using this collection of nodes $Ski$, at least one node of $Ski$ is selected, and this is used to compute the value of the node to be computed. As this node gets computed, it is added to $Ski$ and the process is repeated. We refer to the selected nodes as godparents. The values of these nodes are used, instead of the nodes of parents as is traditional, to compute a new node value. The god parents themselves are selected based on at least one aspect of $Ski$, such as the most recently computed value, the value of a traditional parent node, etc. This can be done by extracting indices, one for each godparent to be selected. In the case where $Ski$ is not long enough to do that, $Ski$ is used as a seed to a pseudo-random generator or a longer value $Si$ is computed in the first place. The latter can be done, for example, using a collection of hash functions that are keyed differently, e.g., using keys 0, 1, 2, etc, to create a vector of outputs that is referred to as $Ski$. By interpreting the value $Ski$ or a suitable portion of this as a coordinate in G in terms of layer and location within the layer, the godparents are selected and their associated values buffered.

5. Using the selected godparent values, the node value of the node $Nki$ is generated by hashing the values of the series of godparent node values. One way to do this is to concatenate all the selected godparent node values, in the order they were selected in step 4, and then hash them. As an alternative to hashing, any other one-way function can be used.

If there is a cheater that wants to store a very small set of node values then the fan-out of the ancestry will very soon require a very large number of stored values. In particular, at height h in the tree, the number of ancestors will be $h^p$. Very soon, in other words, an entire layer has to be stored.

By using the graph G in a time-delay function, as described in this disclosure, the resulting time-delay function inherits the ASIC resistance and the resistance against compression-based cheating. This approach also involves or entails fast access to all nodes in the graph, and so, in some embodiments, the entire graph is stored in RAM. For very large graphs, this increases the cost and complexity of an ASIC solution and increases the ASIC resistance.

The example above assumes, for simplicity of denotation, that each layer of the graph G will have the same number of nodes. In some contexts, this is not the most desired structure. However, there are various ways of adapting the example method described above to conform with such graph structures. As long as the graph G is a DAG (Directed Acyclic Graph), a mapping can be performed from $Ski$ to a selection of a godparent node in G. This can be done, for example, either using a mapping function that runs only once per attempt to map, or it can be done by attempting a first mapping, and if that does not correspond to a location of a node in G, then another value $Ski'$ is derived from $Ski$, e.g., by hashing $Ski$, or another way of selecting a node G from $Ski$ is performed, such as extracting another segment of bits, performing an arithmetic operation on the selection data, or other variants of this. Thus, the value of the parent node (or nodes, if multiple are selected) is used to select one or more godparent nodes, and the values of these are used to generate the value of the node. The selection of godparents can be sequential, requiring one godparent value to generate the next location for a godparent, just like the parent node was used to locate the first godparent; alternatively, multiple godparent node locations can be determined from the value of the parent(s). The value of the node may be determined from at least the values of the godparent nodes and the parents, for example by using a hash or a combination of the influencing node values such as an XOR of these, or a variant combination function.

It should be noted that the techniques we describe for ASIC proofing systems also work for PoW based approaches, where the proof of work may be to generate a graph G based on a challenge value C, then perform an optional quality determination such as the local quality measure, and then to submit the resulting value. In one embodiment, a miner would hash the challenge C and a public key P for which the miner knows the corresponding secret key S, resulting in a value R that is used as a root for the generation of the graph G, as described above, from which a result is generated. This result may be a leaf node of G. The result is then optionally input to a local quality function to determine whether it qualifies, and then submitted along with P as part of a ledger entry. In some embodiments, to make verifying the ledger entry computationally lightweight, the miner would also submit a trace through the graph or a collection of values of nodes that are selected based on the challenge C or parts of the graph G. If the result is a winning ledger entry then the secret key S is used to perform transactions, such as transferring value to other parties. Similarly, the other methods in this disclosure are also meaningful in the context of proofs of work.

In one embodiment, the graph G has width 1 and depth n. A first series of d nodes is computed as $Ni=hash(N(i-1))$, for $i<=d$. For $i>d$, Ni is computed by generating a selection $Si=hash(N(i-1))$, and using this to select the godparents and then compute the value of Ni. For example, for N100, this selection is $S100=hash(S99)$ is the string used for selecting, assuming d<100. To select k godparents using Si, k substrings are extracted from Si and interpreted as locations in the sequence $N1 \ldots N(i-1)$. For example, if k=4, and i=205, the godparents may be the nodes with indices 46, 80, 139, and 17. Thus, $N205=hash(N46,N80,N139,N17)$. After Ni is computed, the next value $N(i+1)$ is computed. A miner that does not store essentially all the n nodes will be forced to recompute at least a portion of the graph $G=\{N1 \ldots Nn\}$ with a big probability, where the probability increases dramatically with the degree of compression that the miner has exposed G to, i.e., the number of nodes that the miner did not store. We note that other, traditional, forms of compression, such as zipping of data, is not meaningful due to the pseudo-random nature of the data. Thus, this is a compression-resistant approach. It is also an ASIC-resistant approach, given the lack of structure used for the computation, complexity of computation, and large memory requirements increase the cost of development and cost of construction of the ASIC solution.

One of the techniques that strengthens the system against ASIC-based abuse is the chain of computations associated with the selection and use of god-parent nodes; this technique frustrates the construction of ASICs. This technique can also favorably be applied to the computation of the time-delay function, as described above. This is done by instead of computing a value that depends on a collection of nodes, and comparing this to a target value, to compute a value that depends on at least one node, use that value to select at least one more node, compute a new value that depends on that at least one more node, where this chaining can be repeated multiple times, and where the final value computed is compared to a target value. This has the same benefits in terms of ASIC resistance as the method described above for the generation of the graph G; it also has another benefit, namely that the time-delay function can be changed dynamically. Thus, if large-scale ASIC-based abuse is identified, where this is related to the time-delay function, then the system can automatically reconfigure the description of how to compute the time-delay function. For example, instead of using a selected node value to compute a next value according to a function F, the system can provide an updated function F2 to be used instead, thereby invalidating the ASICs with a good probability.

One Illustrative Embodiment in which Elements are Combined.

The disclosed system uses a graph G that may be generated in one of the ways described above; however, alternative graph structures are possible to use, and there are other variations of the disclosed graph-related structures and methods that achieve the same goals using the same or similar techniques. For example, whereas we have referred to the use of hash functions, the system can also use other one-way functions, such as elliptic curve based one-way functions, symmetric ciphers, and functions that are computationally complex to invert. It should be noted that some graph structures offer ASIC-resistance and compression resistance.

After a party has created one or more graphs, in some embodiments, the party registers these graphs. The registration can be performed on the graphs one by one, or in a collection, and can be performed by submitting them as a recordable transaction to a ledger, which can be a ledger associated with the disclosed system, or one relating to a competing proposal with sufficient security assurances. Registration can also be based on other time stamping methods or methods based on recording by a trusted authority. In some embodiments, graphs are not registered, although doing so adds additional security assurances. With enough trust in the system, registration can be avoided or only done in an optional manner.

A party that has a graph stores it or transfers it to another party, along with optional auxiliary information such as hints, and including an associated Merkle tree structure and values used to make the traversal of the Merkle tree structure efficient. A party that stores such information is referred to as a miner.

A miner determines whether a challenge offers the opportunity of a potential profit by using one or more quality measures, such as the local quality measure disclosed herein; by evaluating the graph; by generating a potential response; and by evaluating the potential response; or at least some of these actions. The resulting response can be submitted by the miner as a candidate ledger entry, or can be submitted along with or associated with a value representing a time-delay function that takes at last part of the response as input or the challenge as input.

A verifier evaluates one or more ledger entries to determine whether these are valid, and to determine which one is determined to be the likely winner. This is done using a quality function such as the central quality function. In addition, in some embodiments, the miner evaluates the associated output of the associated time-delay function computation to determine that this is valid. Additional verifications can be performed in some embodiments, resulting in a decision for each verifier which ledger submission is the winning candidate. In some embodiments, miners perform the actions of verifiers, although some miners may opt not to.

In some embodiments, verifiers also compare the quality of two or more competing branches to one sequence of ledger entries, such as using a quality measure that determines what branch is most likely to win. This action, like the other actions by the verifiers, are used to generate a distributed consensus mechanism that determines what ledger entries should be considered as part of the series of ledgers.

The system, comprising miners and verifiers, determines when a ledger is closed, i.e., committed to, based at least on some parameters that determine the number of ledger entries under consideration need to remain open until closed; this parameter, like many others are, in some embodiments, computed (and recomputed) using a feedback loop that aims to stabilize the maintenance of the graph made up of the ledgers and ledger entries. In one embodiment, there is no such feedback function, and another potential mechanism for implementing distributed robustness is employed by miners and verifiers.

As a ledger is closed, the miner that contributed the associated ledger entries gain a benefit associated with the ability to digitally sign documents using a key associated with the ledger entry, in turn enabling the miner to transfer funds associated with the capability to generate such signatures. This corresponds to the spending of funds that were minted as a result of a successful submission of a ledger entry, and provides the compensation for closing ledgers. As ledgers are closed, the order of events described in the associated ledger entries are committed to in a way that is computationally difficult to reverse, or which requires a take-over of the entire mining effort to generate alternative branches retroactively. As the ledger chain grows longer and longer, this becomes increasingly unlikely. As a result, a time stamping mechanism has been created for the benefit of anybody wishing to have a document timestamped, and fueled by the wish for miners to successfully generate ledger entries. The value of the ledger entries can be automatically set by the system using an automated feedback loop, as can other parameters as described above.

This is just an exemplary but simplified description of the disclosed methods, and that variants and alternatives can be used to achieve a system with the same high degree of security, robustness and common benefit.

Using Empty Memory without Showing.

A traditional approach for PoS based mining protocols is to use available space on a storage medium to store graphs, using traditional memory management. However, an alternative approach and a part of this disclosure is to store graphs and other data on an archival drive or other storage medium in a manner that the mining process can access the information but the information relating to mining is not visible to other processes. If another process attempts to write data, a memory manager or other handler will determine if there is available space that is not used by any process. If there is, then that space will be used. Otherwise, the memory manager will identify a location containing mining-related information to overwrite. This corresponds to what we refer to as "invisible" memory. The memory manager then updates a table identifying available "invisible" memory associated with the mining to identify that the overwritten space is no longer available for mining, and has been used by the requesting process. This is no longer part of the invisible memory, but is regular memory that has been used. If this space is later erased, it is regular memory that is not used, and can either be used as regular memory is, or be returned to be used as part of the invisible space by using it for mining data. Any other portion of the storage associated with the same graph or other instance of mining is also freed up, since that information cannot be used without the overwritten information.

In an alternative embodiment, as a process initiates a write request to a storage unit with no "visible" space, the memory manager identifies a portion of data associated with a mining instance that can be overwritten and later recomputed from other still stored data associated with the same graph or instance. This could, for example, be data related to hints, which can be recomputed at a processing cost. If the requesting process later frees up space or the graph is needed for purposes of mining, then the overwritten data can be recomputed from still stored data relating to the graph or instance.

In an alternative embodiment, the storage device is initialized with a very large number of very small graphs, but the graphs are not published to the logical file system. This way the region used for PoS graph storage appears unused to the operating system, applications, and user. The mining software is programmed to locate and index the graphs for use in mining. The mining software is able to identify fully or partially overwritten graphs. The graphs are then repaired or removed from the mining software index tables. This way the native filesystem continue to function at full performance.

The result is that memory devices, such as hard drives, can be sold with a plug-and-play mining capability, where a user can overwrite these pre-configured instances by storing data to the memory device, thereby gradually degrading the mining capabilities associated with the storage unit. However, until the entire space is claimed by other processes and their data, the memory device functions as a storage unit for one or more mining instances.

Tying Mining to Specific Devices.

In one embodiment, one of the components of a ledger entry, in addition to the components described above, is a proof related to a device identity, such as a proof generated by a trusted execution environment, related to a device identity, a device type, or device manufacturer. The trusted execution environment contains a memory which is isolated from any software access bus and which can be accessed only by trusted hardware. This memory contains secrets such as private keys used for provisioning, device attestation, and digital signatures as is well known to anyone familiar with the art. This memory is configured with at least one private key used for device attestation and at least one private key used to digitally sign proofs of space as previously described in this disclosure. These may be the same key. When a proof of space is submitted the proof is digitally signed by hardware or software executing within the trusted execution environment using a private key stored with the protected key store. A public key associated with the signing key is made available to verifiers through approved authority nodes within the blockchain. Verifiers use the public key from the preexisting authority node to authenticate the the digital signature of the proof of space, and to accept or reject the proof. New authority nodes may be added to the chain by existing authority nodes. Authority nodes may encompass specific devices, device types or device manufacturers.

In another embodiment the proof of space is coupled to a specific device type or device manufacturer, the device characteristics including processor performance, memory size and speed and storage size and performance are included with the authority node stored in the blockchain, and graph commitments are restricted to graphs that fit the device characteristics.

In an example embodiment a device manufacturer builds an ASIC for use in mobile phones. The ASIC includes 64 GB flash storage, 1 GB RAM, a quad core ARM processor, a trusted execution environment with protected key store. At the time of manufacture the device is configured with a private key intended for device attestation and to digitally sign proofs of space. An authority node containing a public key associated with the device private key and the device characteristics including CPU performance, RAM size and performance and flash storage size and performance is digitally signed by an existing authority node and committed to the proof of space blockchain. When a device commits a graph to the blockchain the block generator compares the graph size against the device characteristics and rejects the commitment if the sum of all existing commitments exceeds the storage capacity published in the device authority node.

In another embodiment the proof-of-authority is replaced or combined with a proof of stake. A graph commitment as described in this disclosure is accompanied by a digitally signed token. In one embodiment the token is signed by an authority identified by an existing authority node published in the blockchain. As described elsewhere in this disclosure the authority node may include characteristics of a device identity, type, or manufacture. Alternatively the digitally signed token may be configured to indicate the device identity, type, or manufacturer. The graph commitment is constrained to fit within the characteristics of the device. In an embodiment where a mobile device manufacturer participates in an application marketplace such as Apple's App Store or Google's Play Store, a digitally signed token is acquired through an existing store infrastructure.

A Third Set of Illustrative Embodiments

The embodiments described above are considered illustrative only, and should not be viewed as limited to any particular arrangement of features. For example, alternative processing operations and associated system entity configurations can be used in other embodiments. It is therefore possible that other embodiments may include additional or alternative system entities, relative to the miners and verifiers and other entities of certain ones of the illustrative embodiments described above.

Miner and verifier entities, as well as other entities described herein, may be part of or may be implemented using one or more information processing systems. A given miner, verifier or other entity in an information processing system as described herein is illustratively configured utilizing a corresponding processing device comprising a processor coupled to a memory. The processor executes software program code stored in the memory in order to control the performance of processing operations and other functionality. The processing device also comprises a network interface that supports communication over one or more networks.

The processor may comprise, for example, a microprocessor, an application-specific integrated circuit (ASIC), a field-programmable gate array (FPGA), a central processing unit (CPU), an arithmetic logic unit (ALU), a digital signal processor (DSP), or other similar processing device component, as well as other types and arrangements of processing circuitry, in any combination.

The memory stores software program code for execution by the processor in implementing portions of the functionality of the processing device. A given such memory that stores such program code for execution by a corresponding processor is an example of what is more generally referred to herein as a processor-readable storage medium having program code embodied therein, and may comprise, for example, electronic memory such as SRAM, DRAM or other types of random access memory, read-only memory (ROM), magnetic memory, optical memory, or other types of storage devices in any combination.

Articles of manufacture comprising such processor-readable storage media are considered embodiments of the invention. The term "article of manufacture" as used herein should be understood to exclude transitory, propagating signals.

Other types of computer program products comprising processor-readable storage media can be implemented in other embodiments.

In addition, embodiments of the invention may be implemented in the form of integrated circuits comprising processing circuitry configured to implement processing operations associated with the embodiments described herein.

Processing devices in a given embodiment can include, for example, laptop, tablet or desktop personal computers, mobile telephones, or other types of computers or communication devices, in any combination.

Communications between the various elements of an information processing system comprising processing devices associated with respective parties or other system entities may take place over one or more networks. Such networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

An information processing system as disclosed herein may be implemented using one or more processing platforms, or portions thereof.

For example, one illustrative embodiment of a processing platform that may be used to implement at least a portion of an information processing system comprises cloud infrastructure including virtual machines implemented using a hypervisor that runs on physical infrastructure. Such virtual machines may comprise respective processing devices that communicate with one another over one or more networks.

The cloud infrastructure in such an embodiment may further comprise one or more sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the information processing system.

Another illustrative embodiment of a processing platform that may be used to implement at least a portion of an information processing system as disclosed herein comprises a plurality of processing devices which communicate with one another over at least one network. As indicated previously, the network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. As indicated above, the processor may comprise a microprocessor, a microcontroller, an ASIC, an FPGA or other type of processing circuitry, as well as portions or combinations of such circuitry elements. The memory may comprise RAM, ROM or other types of memory, in any combination. Again, the memory and other memories disclosed herein should be viewed as illustrative examples of what are more generally referred to as "processor-readable storage media" storing program code of one or more software programs.

As mentioned previously, articles of manufacture comprising such processor-readable storage media are considered embodiments of the present invention. A given such article of manufacture may comprise, for example, a storage array, a storage disk, an integrated circuit containing RAM, ROM or other electronic memory, or any of a wide variety of other types of computer program products.

Also included in the processing device is network interface circuitry, which is used to interface the processing device with the network and other system components, and may comprise conventional transceivers.

Again, these particular processing platforms are presented by way of example only, and an information processing system may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure in place of or in addition to virtualization infrastructure comprising virtual machines. Thus, it is possible in some embodiments that system components can run at least in part in cloud infrastructure or other types of virtualization infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system. Such components can communicate with other elements of the information processing system over any type of network or other communication media.

As indicated previously, components or functionality of the system as disclosed herein can be implemented at least in part in the form of one or more software programs stored in memory and executed by a processor of a processing device.

Accordingly, a given component of an information processing system implementing functionality as described herein is illustratively configured utilizing a corresponding processing device comprising a processor coupled to a memory. The processor executes program code stored in the memory in order to control the performance of processing operations and other functionality. The processing device also comprises a network interface that supports communication over one or more networks.

The particular configurations of information processing systems described herein are exemplary only, and a given such system in other embodiments may include other elements in addition to or in place of those specifically shown, including one or more elements of a type commonly found in a conventional implementation of such a system.

For example, in some embodiments, an information processing system may be configured to utilize the disclosed techniques to provide additional or alternative functionality in other contexts. The disclosed techniques can be similarly adapted for use in a wide variety of other types of information processing systems.

It is also to be appreciated that the particular process steps used in the embodiments described above are exemplary only, and other embodiments can utilize different types and arrangements of processing operations. For example, certain process steps described as being performed serially in the illustrative embodiments can in other embodiments be performed at least in part in parallel with one another.

The embodiments described above are considered illustrative only, and should not be viewed as limited to any particular arrangement of features. For example, alternative processing operations and associated system entity configurations can be used in other embodiments. It is therefore possible that other embodiments may include additional or alternative system entities, relative to the miners and verifiers and other entities of certain ones of the illustrative embodiments described above.

Exemplary Figures for Robust and Secure Proof of Space Based Mining.

Figure 11:
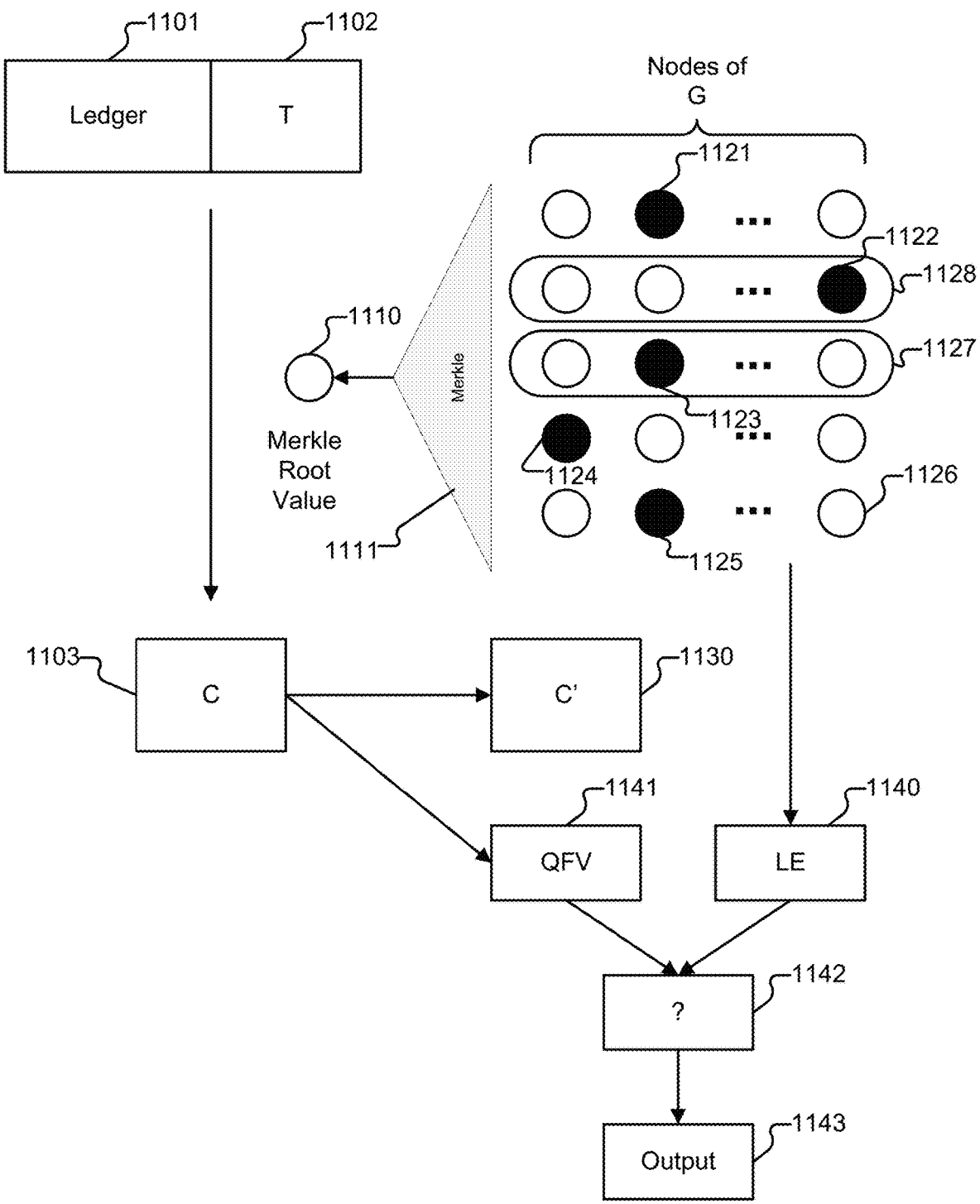
FIG. 11 shows an example embodiment comprising a ledger component, a set of transactions, and a challenge.

FIG. 11 shows an example embodiment comprising a ledger component 1101, a set of transactions T 1102, and a challenge C 1103 computed from at least some of the ledger component. Also, element 1110 is a representation of a miner's state, and in some embodiments is recorded in the ledger corresponding to ledger component 1101. Those elements are, in some embodiments, publicly available. In addition, the example shows a collection of nodes such as 1121, 1122, 1123, 1124, 1125 and 1126. In this example, these are arranged in rows, where two rows 1127 and 1128 are shown. The nodes are stored by the miner, and are used at a setup time to compute value 1110. This can be done using Merkle tree structure 1111, or another structure such as a hash function, a compression function, or a combination of such. Challenge 1103 is processed by the miner to obtain a personalized challenge C' 1130 that can be the same as challenge 1103, but which could also be an adjustment to account for the size of storage of the miner, as represented by the nodes the miner stores. For example, if the miner does not have a large storage, personalized challenge 1130 may be an adjustment of challenge 1103 that takes this into consideration, thereby making personalized challenge 1130 suitable for the miner's memory configuration. In one embodiment, the personalized challenge 1130 indicates a selection of nodes. In this example, personalized challenge 1130 corresponds to a selection of node 1125, but not a selection of challenge 1126. It further corresponds to a selection of nodes 1121, 1122, 1123 and 1124. In this example, this corresponds to exactly one node per row, although this is not a necessary constraint. The collection of nodes selected as a result of computing personalized challenge 1130 corresponds to element 1140. In a traditional PoS based mining scheme, 1140 corresponds to a valid potential ledger entry LE. However, here, a qualifying function value QFV 1141 is also computed from challenge 1103, or from other public information that, in some embodiments, is not under the control of any one miner. The miner then performs a matching evaluation 1142 to determine whether the set of selected nodes 1140 match the qualifying function value. This process takes into consideration what the memory constraints of the miner are, causing the evaluation 1142 to succeed with a greater frequency for larger memory configurations than for smaller memory configurations, thereby leveling the playing field to make the likelihood of the evaluation 1142 succeeding roughly proportional to the size of memory used to store the nodes used by the miner. Non-proportional relationships may be created as well by modifying the function used to compute the qualifying function value; thus, this is only one embodiment. If the evaluation 1142 results in success then the value 1143 is output, where value 1143 comprises selection 1140, and, in some embodiments, references the value 1110 or the ledger position in which this was recorded. In one embodiment, nodes 1121, 1122, 1123, 1124, 1125 and 1126 are public keys. As the miner submits a valid ledger entry, corresponding to a challenge-response pair comprising one of these nodes, such as node 1123, this public key value becomes the public key value associated with the coin the miner obtains, and the miner would use the corresponding secret key, which is not shown in the image, to sign transaction requests, such as purchases. Any type of appropriate digital signature scheme can be used in this context, such as RSA signatures, Merkle signatures, or DSS signatures. Nodes 1121, 1122, 1123, 1124, 1125 and 1126 may correspond to different public keys or to the same public key, the latter, in some embodiments, augmented with a counter or other location indicator such as a matric position indicator, as described above.

Figure 12:
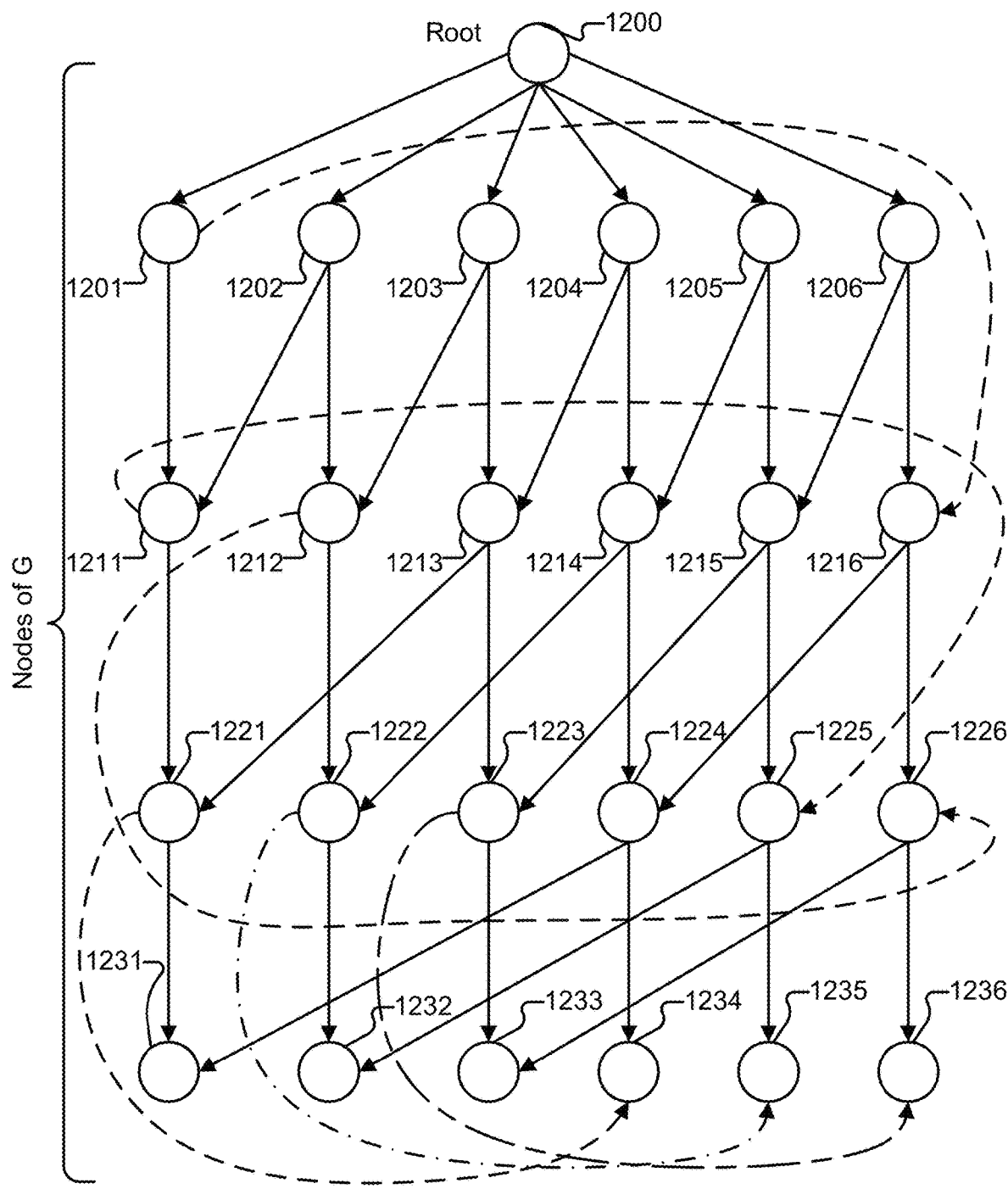
FIG. 12 shows an example relationship between nodes stored by a miner.

FIG. 12 shows an example relationship between nodes stored by a miner. Value 1200 is a seed, and is used to generate values 1201, 1202, 1203, 1204, 1205 and 1206, which correspond to a first row. The values in the first row are then used to compute the values of the second row, i.e., the node values 1211, 1212, 1213, 1214, 1215 and 1216. In this example, value 1211 is derived from values 1201 and 1202, e.g., by combining these and applying a function. For example, values 1201 and 1202 may be concatenated and input to a cryptographic hash function, such as SHA-1. Similarly, value 1222 is generated from values 1212 and 1214. The pattern of generation does not have to involve only values from the row above being used to derive a value, but the pattern of any directed acyclic graph (DAG) can be used. The result is a series of values that were derived last, i.e., which were not used for the derivation of any other node values in the collection. In this example, that is the series of values 1231, 1232, 1233, 1234, 1235 and 1236.

Turning to mining, an example personalized challenge 1130 may be a value in the range 1-6, selecting one of the values that were derived last, such as value 1232. Value 1232 is therefore part of the response 1140 to the personalized challenge 1130. In addition, response 1140 also comprises the values needed to generate node 1232, or some portion of these. In this example, that selection comprises the node values 1222 and 1225. In one example embodiment, both of these are "tracked back" in the same way as value 1232 was tracked back to values 1222 and 1225 by including these values in the response 1140; however, in another embodiment, only one of the values 1222 and 1225 is tracked back. For example, the miner may choose the value 1222 based on an evaluation function indicating that 1222 satisfies a criteria that 1225 does not satisfy, e.g., that the value 1222 has a smaller Hamming distance to the personalized challenge 1130 than the value 1225 does. In this example, that would cause node value 1222 to be tracked back, and values 1212 and 1214 included in the response 1140. Using the same selection criteria, the Hamming distances between these two values and personalized challenge 1130 are computed, In this example, this results in the same distance, causing a deterministic tie-breaking function to be used; for example, the larger of the two values is selected for tracking back, or the one whose node identification number (such as 1201 or 1202) is the smallest. In this example, that selected tie-broken value may correspond to node value 1212. Accordingly, values 1202 and 1203 are included in the response 1140.

In another example, the personalized challenge 1130 directly selects a collection of nodes, such as nodes, 1201, 1211, 1226 and 1233, and include these in the response 1140, along with all the nodes that are their direct ancestors.

Figure 13:
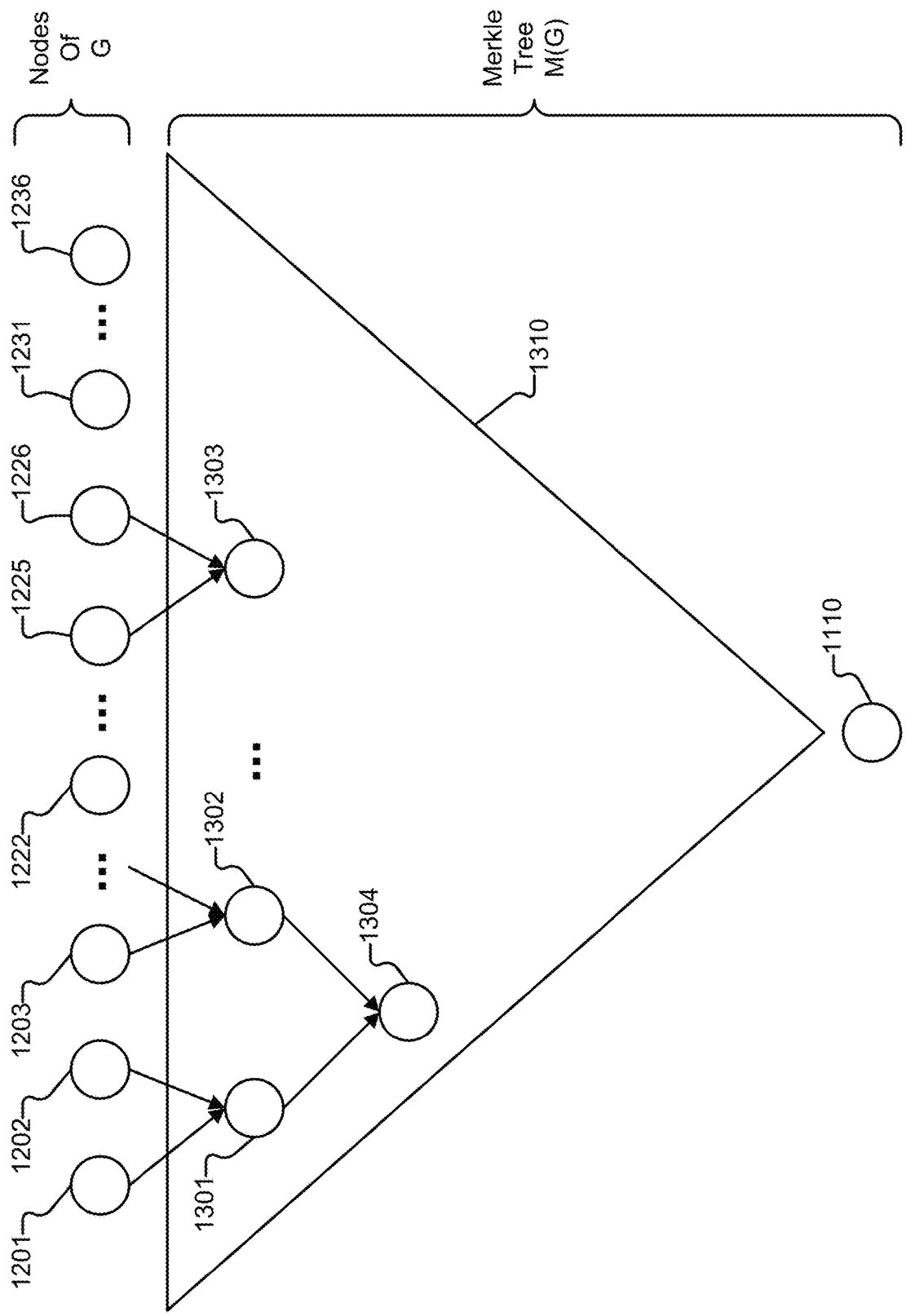
FIG. 13 shows an embodiments of how nodes are combined in a Merkle structure to generate a value or part thereof

FIG. 13 shows an embodiments of how nodes 1201, 1202, . . . 1236 are combined in a Merkle structure 1310 to generate value 1110 or part thereof. Here, values such as node value 1201 and 1202 are combined to obtain value 1301, and similarly, node value 1203 and 1204 (not shown) are combined to obtain value 1302, where values 1301 and 1302 are, in turn, combined to obtain value 1304. Here, the combination could be performed by concatenating and applying a cryptographic hash function. This is repeated for all the nodes, and the resulting values, iteratively, until a single value 1110 is obtained. If the number of input values is not a power of two, then the "missing" values needed to make it a power of two can be set to a constant value, such as the value 0. Therefore, each set of nodes 1201 . . . 1236 can be represented as a single value 1110. In some embodiments, this value is made public before mining commences for the miner corresponding to the value 1110, where this can be done by submitting the value 1110 as a transaction to be included in the ledger, or as part of such a transaction value—for example, by linking it to a small payment wherein the payment is made in reference to the value 1110. This can comprise a registration cost that the miner cannot recover other than by mining, and could be performed by paying the owner of the coin used in the transaction a small amount, such as $1, and make the value 1110 the "recipient" of the payment. In contrast, normally a payment is made to a public key, allowing the owner of the corresponding secret key to turn around and spend the corresponding amount later on.

Figure 14:
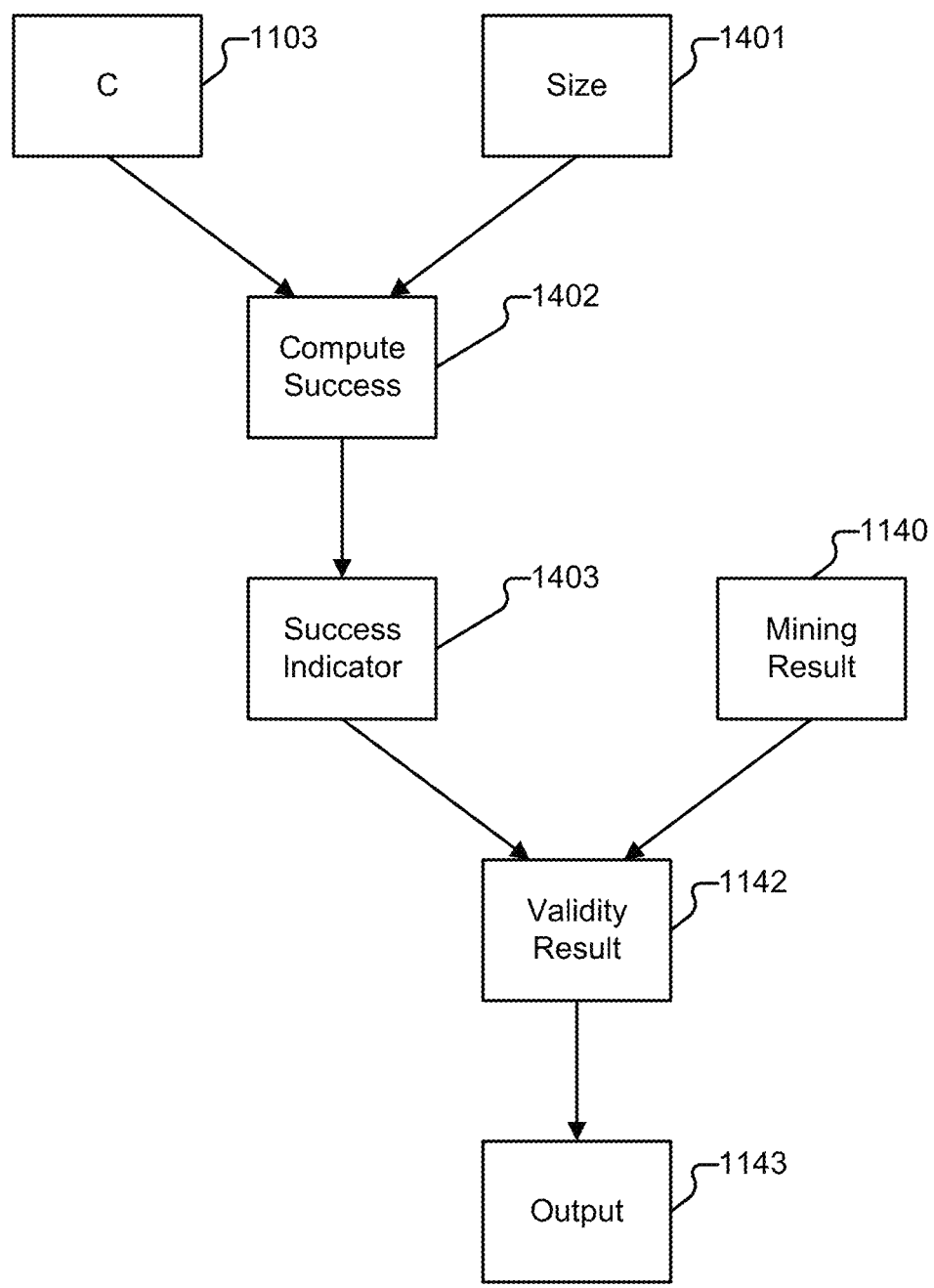
FIG. 14 shows an example quality measure determination.

FIG. 14 shows an example quality measure determination. Here, challenge C 1103 is a value that is deterministically determined from a public value that is at least in part portions of the ledger, and value 1401 corresponds to the size of the memory the miner is using, and could correspond to an indication, for example, that the memory size is $1/1024$ of the "maximum" memory size for a PoS instance. Values 1103 and 1401 are input to element 1402 that performs a computation, generating an output 1403 that is a string or other value to be used to determine success. In this example, value 1403 may indicate that out of ten bits, the least significant bit should be a 1 and the remaining bits should be 0. This corresponds to an event that occurs $1/1024$ of the time. Another potential value 1403 is the string 0100110011, which is another ten bit string, and therefore also has a probability of $1/1024$ to be selected if selected uniformly at random. The length of the string is caused by the value 1401 and the value of this string is caused by the value 1103. In one embodiment, a constant is used instead of input 1103, although using value 1103 has security benefits in that it makes output value 1403 a priori unpredictable to the miner. If the memory size is not a fraction of that maximum where this fraction is one over a power of two, then 1401 can comprise a collection of strings, such as one four-bit string and one ten-bit string. This particular example corresponds to a success probability of $1/16+1/1024$. In another embodiment, all success probabilities are reduced, e.g., by a factor $1/256$, making success correspondingly less likely. This applies to all instances, independently of and in conjunction with the reduction due to the size indicator 1401.

The value 1403 is used to determine by element 1142 whether the mining result 1140 is valid or not. If some predicate of value 1140 matches value 1403, then this corresponds to success. In the case where value 1403 corresponds to multiple strings, as described above, success corresponds to at least one of these strings matching value 1140. One example approach of evaluating this match is to generate a hash value from value 1140 and select the least significant portion of a length matching value 1403, determining if there is a bit-by-bit match for any of the string segments, whether one or more. If there is such a match, then the value 1140 is determined to be valid and is output. Value 1143 comprises value 1140 and value 1401. Value 1410 can be verified based on value 1110 and the associated inputs. In some embodiments, value 1110 also has auxiliary input indicating the memory size corresponding to value 1401; this can be achieved by inserting the auxiliary information in the input to the Merkle tree generation, such as in the form of one leaf, i.e., input. In one example, this counter value is prepended to the list of node values 1201 . . . 1236. In one example, additional auxiliary information is also added to the generation of the value 1110 at the time of setup. Such auxiliary information can also be added to the value 1110 by concatenating the auxiliary information to the output of the Merkle tree computation and using this as value 1110. When a miner wishes to determine whether a potential ledger entry is valid, it would verify the corresponding node values 1140, and that these are consistent with a previously published Merkle tree root value 1110, and that the quality measure function, which is public and deterministic, indicates that the value 1143 is valid. This corresponds to the value 1140 being valid and that it matches the value 1403 generated from the previously recorded value 1401 and the public challenge value 1103. If this is all correct, then the miner concludes that 1143 is a legitimate ledger value, or part of it. This approach can be used to modify proposed cryptocurrency schemes, such as "SpaceMint: A Cryptocurrency Based on Proofs of Space" by Sunoo Park, Albert Kwon, Joel Alwen, Georg Fuchsbauer, Peter Gazi and Krzysztof Pietrzak. It can be applied by using the process described to take a challenge value 1103 or other public value and a memory size descriptor 1410 and generate a value 1403 used to determine whether a tentative ledger value 1140 matches a quality criteria corresponding with the function of element 1402 and element 1142, and values 1103 and 1401.

Figure 15:
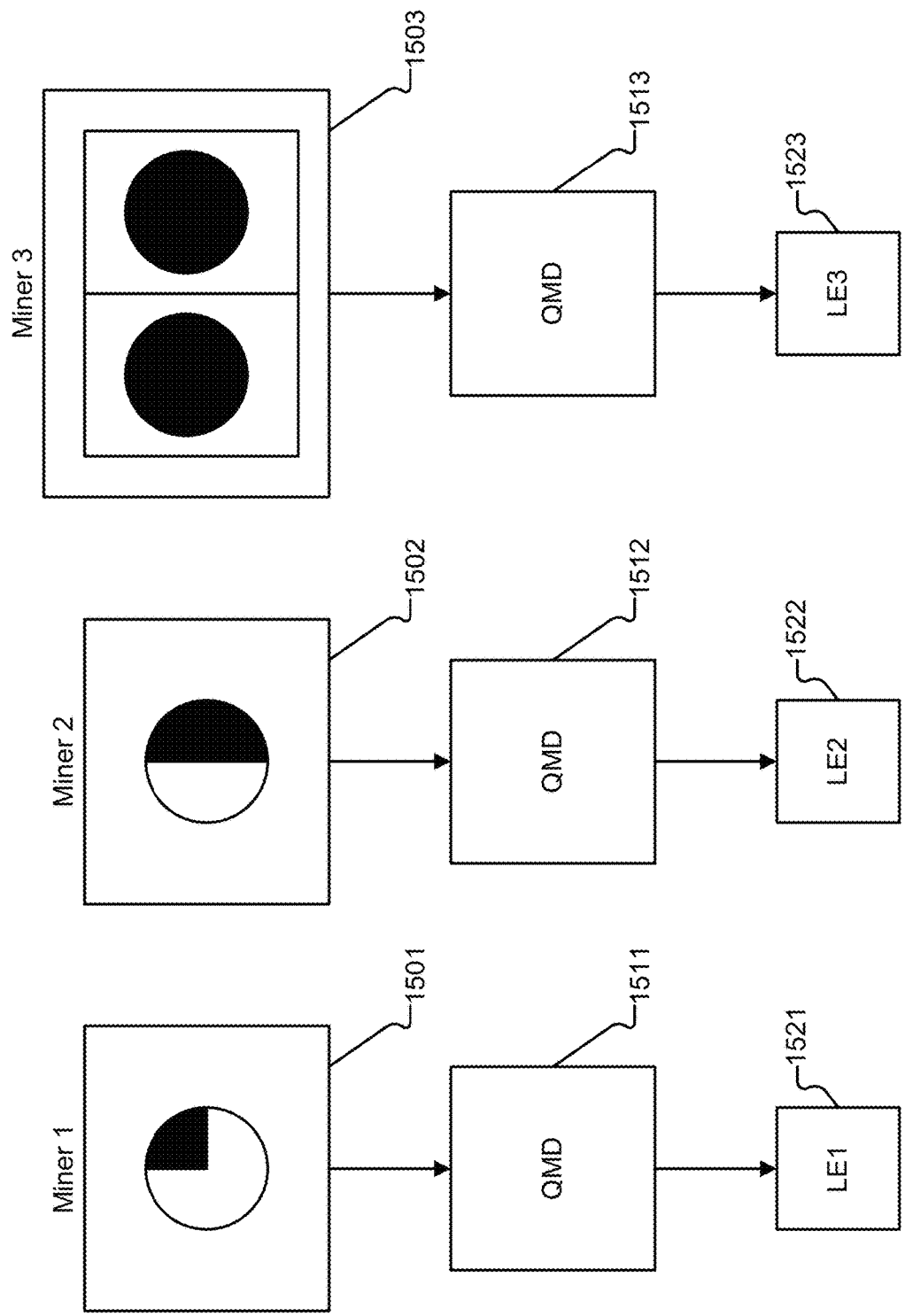
FIG. 15 shows an example with three miners.

FIG. 15 shows an example with three miners 1501, 1502 and 1503. Miner 1501 is represented with a quarter pie, miner 1502 is represented by a half pie, and miner 1503 is represented by two full pies. Miner 1501 uses a quarter of the maximum storage for a PoS instance, miner 1502 uses a half of the maximum storage, and miner 1503 uses twice the maximum storage. In one example embodiment, the maximum size PoS instance requires approximately 1 Tb of storage, which means that miner 1501 has a quarter of that storage capacity set aside for mining, miner 1502 has half of that amount, and miner 1503 has twice that amount. The elements 1511, 1512 and 1513 correspond to the quality measure determination QMD described in FIG. 14. In one particular embodiment, these elements are configured so that a miner with the maximum storage has approximately a probability of $1/2048$ for a valid collection 1140 to be determined to be valid ledger entry. Accordingly, the probability of success for one attempt is approximately $1/1024$ for miner 1503, $1/4096$ for miner 1502 and $1/8192$ for miner 1501; this corresponds to the expected probability of these respective quality assessment elements outputting valid ledger entries LE3 1523, LE2 1522 and LE1 1521, given a random challenge 1103, which is proportional to their memory sizes. If the quality measure element 1511 would result in success with a non-negligibly higher probability than half of that for the quality measure element 1512, provided the connections shown in the figure, then this would encourage miners to run multiple small instances instead of a larger instance of the same size as the cumulative sizes of the small instances, unless there is a limitation put in place addressing how many instances any party may register. Conversely, if the probability of success for miner 1501 combined with quality measure element 1511 were substantially less than half of the success expected from miner 1502 combined with quality measure element 1512, then this encourages larger parties, which encourages mining pools. Mining pools are understood to cause unwanted behavior such as fraud, so it is beneficial to create incentives for mining that avoids the use of mining pools and which does not favor larger parties at the cost of smaller parties.

Figure 16:
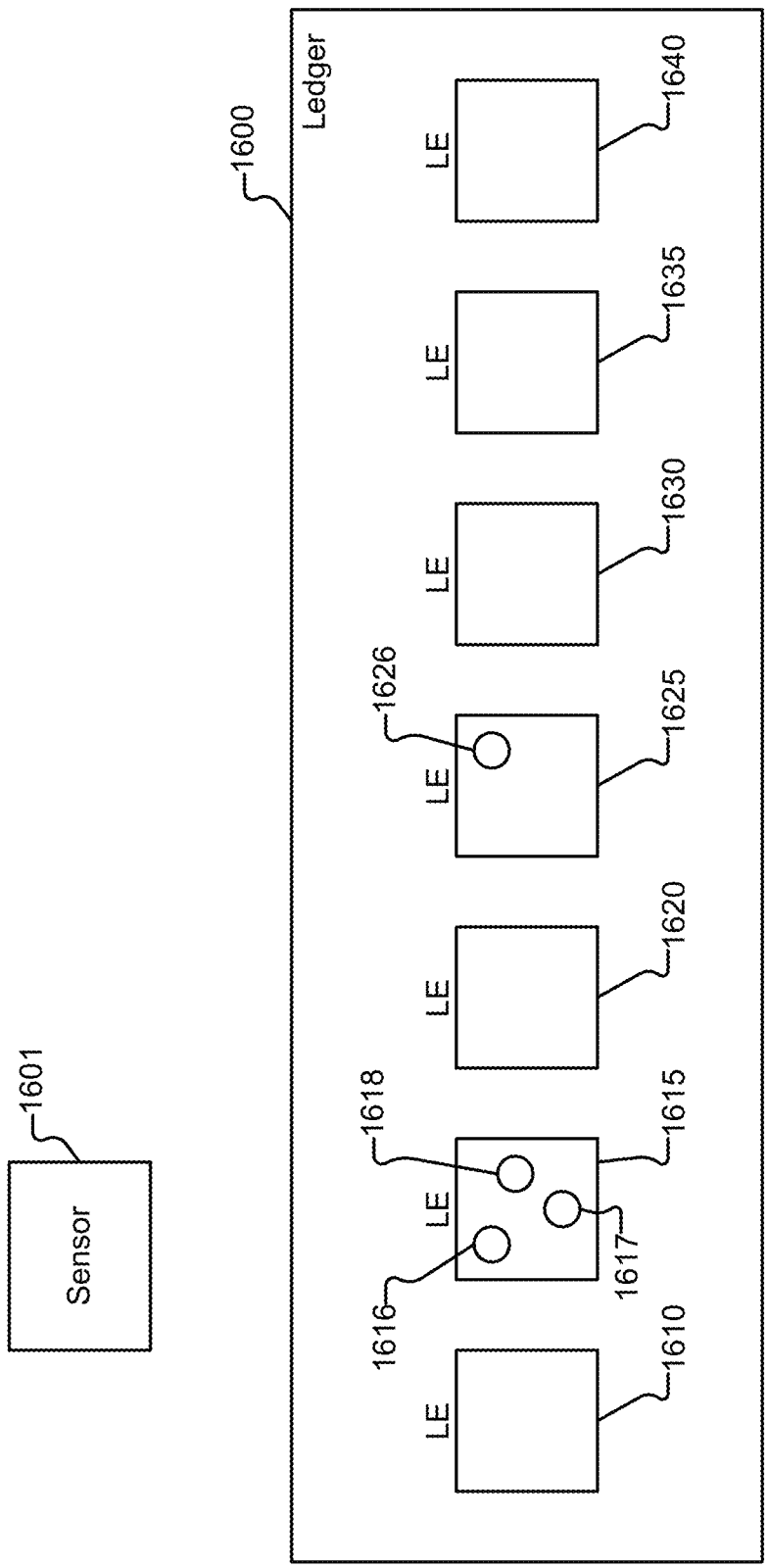
FIG. 16 shows a portion of an example ledger.

FIG. 16 shows a portion of an example ledger 1600 comprising ledger entries LE 1610, 1620, 1630 and 1640, and transaction sets 1615, 1615, 1625 and 1635, each corresponding to zero or more transaction descriptions. For transaction set 1615 three transaction descriptions 1616, 1617 and 1618 are shown. Here, 1616 corresponds to a purchase in which value is transferred from one previously mined coin and its associated first public key, to a second public key associated with a party other than the owner of the first public key. The transaction is said to have taken place after the ledger is closed, which in one embodiment is when ledger entry 1620 has been added, but which in another embodiment is when another and later ledger entry has been added, such as ledger entry 1640. Transaction 1616 corresponds to the recording of a value 1110 for a miner, allowing this miner to participate after the ledger has been closed. Transaction 1617 corresponds to the recording of a deed for the purchase of a home, or any other public statement that needs to be recorded and/or time-stamped. Sensor 1601 is a detector of a publicly verifiable event, such as the value of a coin exceeding $50, fewer than 1000 transactions being recorded in a transaction set such as transaction set 1615, or of the time interval between two consecutive ledger entries 1610 and 1620 being added is shorter than 100 ms. As the sensor 1601 detects the event, a notification transaction 1626 is added to the next open transaction set, identifying that a rule associated with the event should be applied. There may be multiple rules. One example rule is that for one of the example events described above, the difficulty of mining should be doubled for everybody, meaning that the probability associated with the quality measure, and with the generation in element 1402 and comparison in element 1142, should be reduced to half for all miners, based on the probability associated with the value 1401 associated with the memory size of the miner. In one embodiment, this does not take effect until after the next ledger entry 1630 has been added and verified, but in some embodiments it does not take effect until yet a later ledger entry, such as the tenth consecutive ledger entry made after the addition of event notification 1626 to transaction collection 1625. The delay has a benefit in that it stabilizes the system by making sure that there is consensus. All miners should observe ledger entries such as the notification 1626 to make sure that their mining efforts are meaningful. Similarly, miners also need to verify ledger entries and that they are valid, including that they have a valid evaluation of the quality measure. Not doing that will render their mining efforts meaningless, as they will build on invalid ledger entries.

Figure 17:
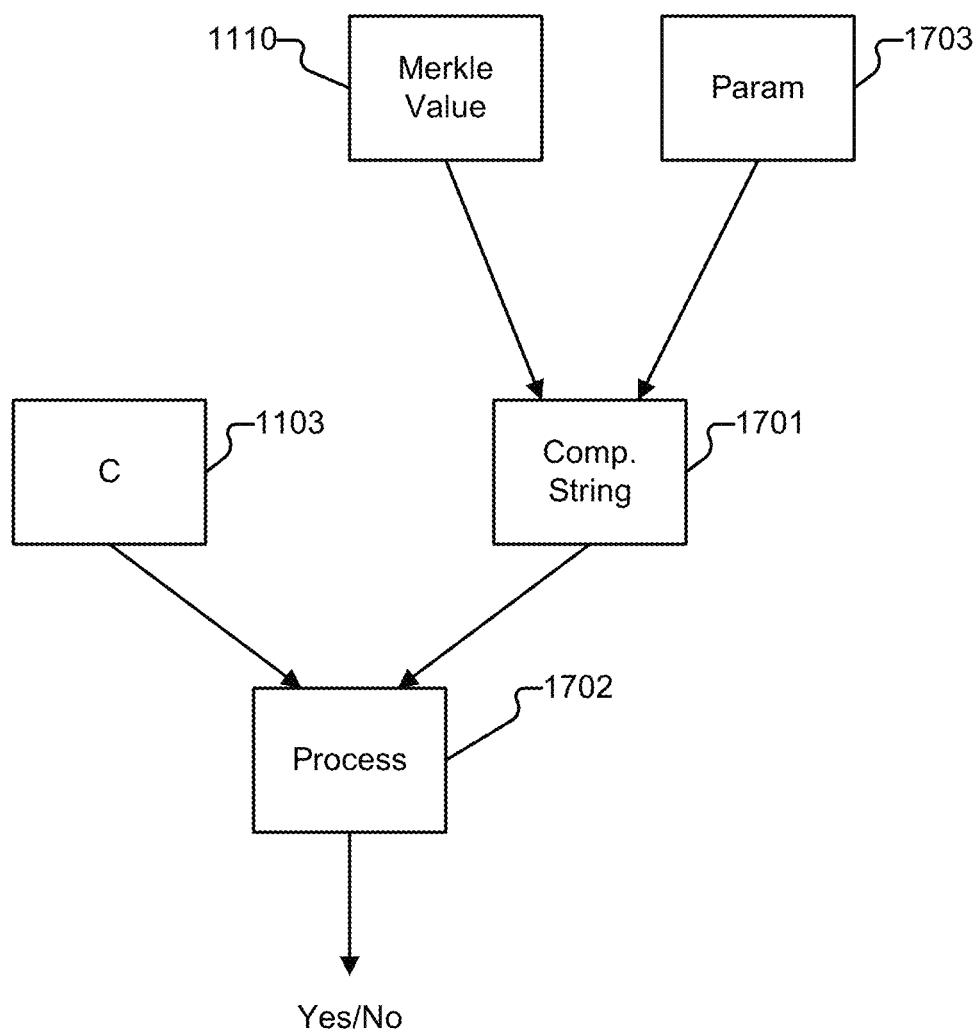
FIG. 17 shows an embodiment where a challenge is processed to determine whether it is a valid challenge with respect to a given mining instance

FIG. 17 shows an embodiment where the challenge C 1103 is processed to determine whether it is a valid challenge with respect to a given mining instance. This process can also be applied to personalized challenge 1130. The process generates a comparison string 1701. In one instance, shown in this figure, this comprises the Merkle root value 1110 (also referred to simply as the Merkle value 1110) and a parameter 1703 that is representative of the size of the mining instance, e.g., indicating whether it is a maximum size instance, a half-of-maximum instance, a quarter-of-maximum instance, or any other fraction of maximum or any particular size that is permitted. In addition, parameter 1703 may depend on an input value that represents the extent to which all mining instances are affected by a reduction in the mining probability, which could either be a constant value or a variable that depends on observed events. In this example, comparison string 1701 corresponds to an indication that the twelve least significant bits of challenge 1103 will be selected and compared to a string that depends on value 1110, parameter 1703, a constant, a combination of these, or portions thereof. In an alternative embodiment, multiple selections will be made, each one with is later evaluated independently, an action taken if at least one indicates validity. Using process 1702, a portion of the bit string corresponding to value 1103 is compared with comparison string 1701. The process 1702 outputs a binary value, in this examples shown as yes/no, that indicates whether the comparison resulted in equality or not. In the embodiment where 1701 represents multiple strings to be compared to multiple parts of the bit string corresponding to value 1103, process 1702 performs these multiple comparisons and outputs yes if and only of at least one of the comparisons results in an equality. In one alternative embodiment, process 1702 first applies a function such as a one-way hash or a CRC to input value 1103 before performing the one or more comparisons. If the output of the process, which is a quality assessment process, is yes, then the challenge 1103 is used to determine whether a response can be generated. In some embodiments, this is done by generating a personalized challenge 1130 from challenge 1103 and generating a response collection from this, as described above. However, if the process 1702 outputs 'no', then the mining effort is not applied, since this is not a valid challenge for the PoS instance. If a miner operates multiple PoS instances, then this determination is applied to each one of the instances.

Figure 18:
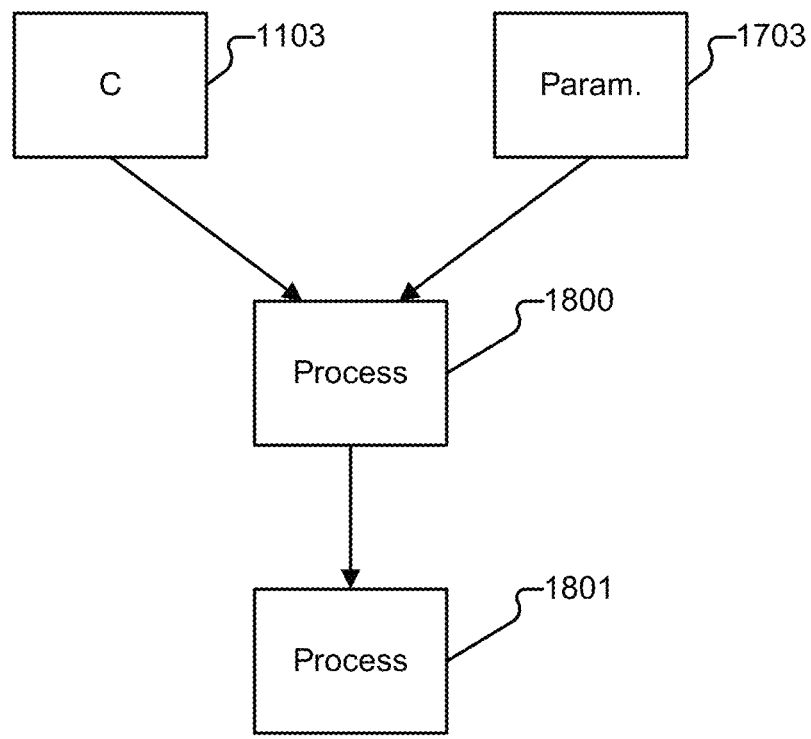
FIG. 18 shows an embodiment of a quality assessment function.
Figure 19:
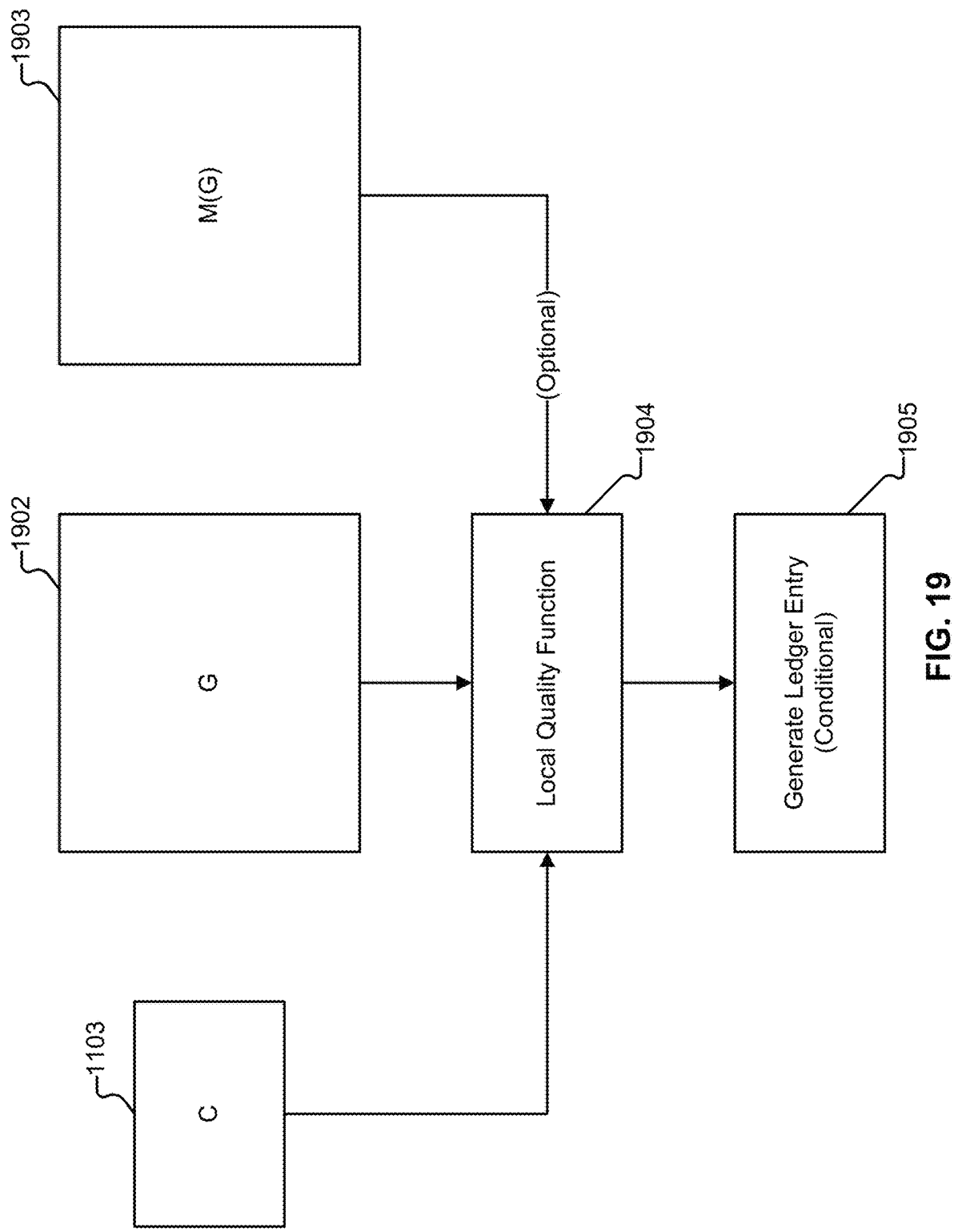
FIG. 19 shows an example of a local quality function.

FIG. 18 shows another embodiment of the quality assessment function. Here, challenge C 1103 and parameter 1703 are provided to process 1800 that may be a cryptographic hash function or another digest function, which causes a string 1801 to be selected and output. For example, if parameter 1703 indicates that the mining should succeed with a probability of 1/256, then output 1801 can be computed as 8 bits of a function of value 1103, where the function may be the identity function, a CRC, a hash function such as a cryptographic hash function, or an algebraic function. For example, this output 1801 may be the string "01001011". This is then compared to a portion of Merkle root value 1110 (also referred to as Merkle value or simply "value" where clear from the context) to determine whether the challenge 1103 is valid for the mining instance corresponding to value 1110. In one embodiment, this comparison is made to the least significant bits of value 1110, where the same-length string as the length of output 1801 is compared. If there is a match, then mining proceeds as described above; otherwise not. It is pointless for a miner to proceed with the mining if there is no match, since other miners will verify that the challenge was valid before accepting a ledger entry as valid. In an example where the success probability is not one over a power of two, then output 1801 corresponds to a series of strings, each one of which is compared to non-overlapping segments of value 1110, and if one of the comparisons result in a match, as described above, then the challenge 1103 is considered valid, but otherwise not. There may be many other variations on this concept, and that other quality assessment processes can be generated using these principles, and such quality assessment processes applied to existing cryptocurrency mining schemes, or such mining schemes built around the notion of the quality determination. As shown, the quality assessment can be made to different values, such as the challenge 1103 or a tentative response 1140; however, it can also be applied to other values, such as individual node values or collections of such, to determine whether they can be used in a particular response; and to other parameters and values used in the process of mining FIG. 19 shows another example of a local quality function. This takes as input a challenge C 1103, a representation of a graph G 1902 and an optional representation of a graph M(G) 1903. Here, graph G is an ordered list of the nodes of G, as also shown in FIG. 11, where the ordering, in some embodiments, is performed in terms of a the layer and position in the layer of nodes in G. The graph M(G) is the Merkle tree that uses all the ordered lists of nodes of G as leaf values and which generates successive internal nodes until the entire collection of nodes is represented by a single value, which corresponds to Merkle root value 1110. The local quality function obtains as input challenge C 1103, graph G 1902 and, optionally, graph M(G) 1903 and computes a quality function value. If this quality function value matches a target value, as exemplified in FIG. 18, then a ledger entry is generated in 1905. The ledger entry value comprises at least portions of G 1902 and M(G) 1903, allowing another party to re-generate the local quality function corresponding to the value generated in step 1904, and compare this value to the target value as in step 1904.

Figure 20:
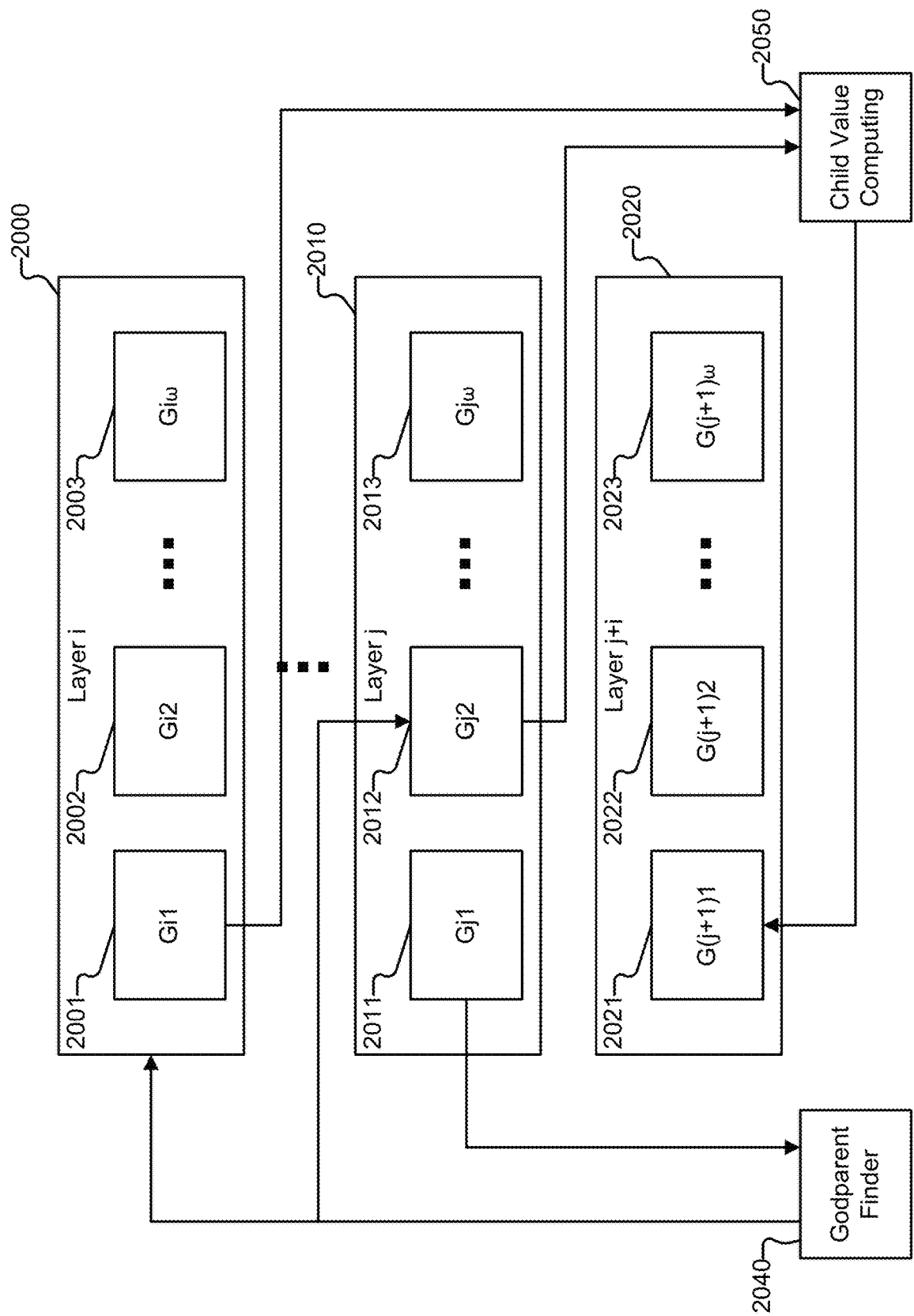
FIG. 20 shows an example of a graph being constructed.

FIG. 20 shows an example of a graph G 1902 being constructed. Graph G comprises at least three layers of nodes: layer i 2000, layer j 2010 and layer j+1 2020. Layer i 2000 comprises an array of nodes Gi1 2001, Gi2 2002 to Giw 2003. In this simplified example, all layers have the same width w. Layer j 2010 comprises an array of nodes Gj1 2011, Gj2 2012 to Gjw 2013. Layer j+1 2020 comprises an array of nodes G(j+1)1 2021, G(j+1)2 2022 to G(j+1)w 2023. In this figure, it is shown how the value associated with node G(j+1)1 is computed in order to provide ASIC resistance and protection against compression-based cheating of a miner. First, the value of at least one parent Gj1 of G(j+1)1 is processed in 2040 to generate a selection of at least one god parent node location. This may be performed, for example, by computing a hash such as SHA-256 of the value associated with Gj1 and to use the resulting string to select two values based on their location values in G matching the resulting string. Instead of a hash function, keyed hash function can also be used, which enables a modification of the matching technique to further combat ASICs. The values of the selected nodes, in this example Gi1 and Gj2, are retrieved from a database storing the graph G that has already been computed, and are provided to process 2050. Process 2050 takes the input values and generated a value from these, e.g., by applying a hash function, a keyed hash function or another one-way function or function that largely acts as a random oracle. The resulting value is output from process 2050 and is the value associated with node G(j+1)1. This is a simplified description, as the value provided from a first godparent node Gi1 2001 can be input to the god-parent funder process 2040 in order for the second godparent node Gj2 to be selected, from which the value of G(j+1)1 is generated by process 2050. The function associated with 2040, in one embodiment, creates a pseudo-random sequence of values of a suitable length to allow the selection of the sufficient number of godparents according to a parametrization of the generation process for generating G. The more of G that has already been generated, the more bits are needed to select the one or more godparent nodes. The child value computation of step 2050 can simply generate a fix-sized output, such as a 256-bit string generated by SHA-256.

Figure 21:
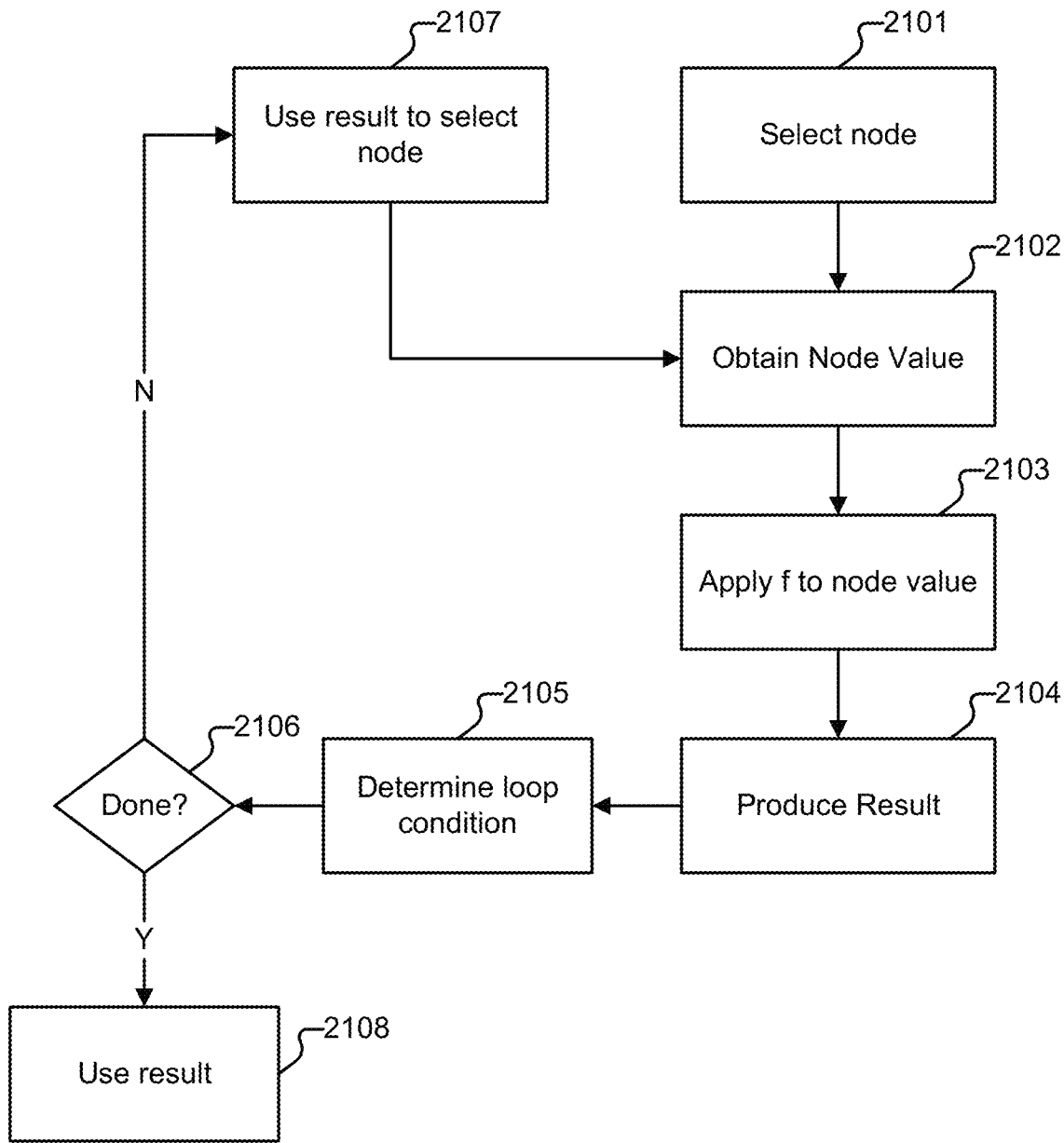
FIG. 21 shows an embodiment of a process used to frustrate ASIC use and compression-based cheating.

FIG. 21 shows an embodiment of a process used to frustrate ASIC use and compression-based cheating. The process starts with a node being selected in 2101. If the process is used to compute G, then the node being selected is the parent of the node of G for which the value is to be computed. If the process is used as a time-delay function, then the node being selected in 2101 is determined by a function of at least one of the challenge C 1103, the graph G as shown in part in FIG. 20, and the Merkle structure M(G) shown in FIG. 13, or values such as a ledger entry 1140 that is computed from such values. Other selections are also possible, and this is just for purposes of a concrete example. Based on the selected node from 2101, the corresponding node value is obtained in 2102. This is typically done by accessing the record associated with the selected node from a database or other storage structure. A function f is then applied to the obtained value in 2103. Here, f can be a keyed hash function, a non-keyed hash function, another one-way function, a function that is not one-way but which is computationally expensive to invert, a function that is many-to-one, or variations of such selections. The function f is typically fixed, but can be updated in some contexts in response to ASIC-based abuse. One such context is for a time-delay function. The result is produced in 2104, where this is the result of applying the function f to the node value of the selected node. In 2105, a loop condition is evaluated. One example loop condition corresponds to performing the loop shown in this figure a preset number of times, such as 3, or such as 75. Another loop condition is that the result produced in 2104 satisfies a criteria, such as ending in five zeros, being divisible by three, or another such condition. This condition may depend on the size of the mining instance, three examples of which are shown in 1501, 1502 and 1503 in FIG. 15. In step 2106 it is determined whether the loop condition was satisfied or not. If it was not, then the computation continues to 2107 where the result produced in 2104 is used to select a new node, e.g., by using at least a portion of the produced result to index into the graph from which the node was selected in 2101, thereby selecting a new node. The node value of this node is obtained in 2102, and the function f applied to the obtained node value in 2103. In an alternative embodiment, the function f is applied both to the node value most recently obtained and to the result produced in 2104 most recently, or to the node value most recently obtained and a state value that is set to 0 in 2101 and to which the result is concatenated in 2104. There are multiple aggregation processes that result in similar types of protection against abuse, and this figure shows just one such example. When the loop condition of 2105 corresponds to being done then the computation proceeds to step 2108 where the result is used. If the process is used to compute G, then the result is used by assigning the node value to this result. If the process is used as a time-delay function, then the result is used to evaluate the ledger entry or compared to a target value, or other use depending on the application context the time-delay function.

Figure 22:
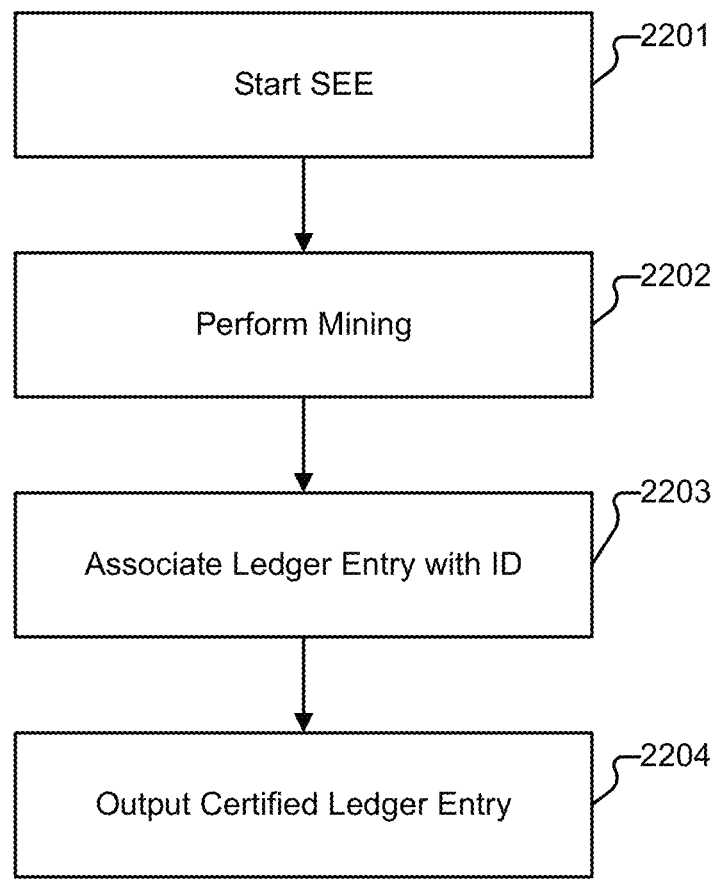
FIG. 22 shows an example construction that combines a proof-of-space (PoS) with a proof-of-authority (PoA).

FIG. 22 shows an example construction that combines a proof-of-space (PoS) with a proof-of-authority (PoA). In step 2201, the Secure Execution Environment (SEE) is started by making a call using an API provided by a hardware manufacturer. In step 2202, a mining operation is performed using a challenge C 1103 as input, is performed, resulting in a ledger entry 1140. In 2203, ledger entry 1140 is associated with the identity of the SEE, resulting in a certified ledger entry that is output in 2204. The certified ledger entry is submitted for consideration for inclusion in the ledger. The processing described for ledger entries 1140, e.g., in FIGS. 25 and 26, is performed for the certified ledger entry instead of for the ledger entry, and the verification steps 2506, 2604, 2605 and 2606 are augmented to also verify the certificate and associated identity association performed in 2203.

Figure 23:
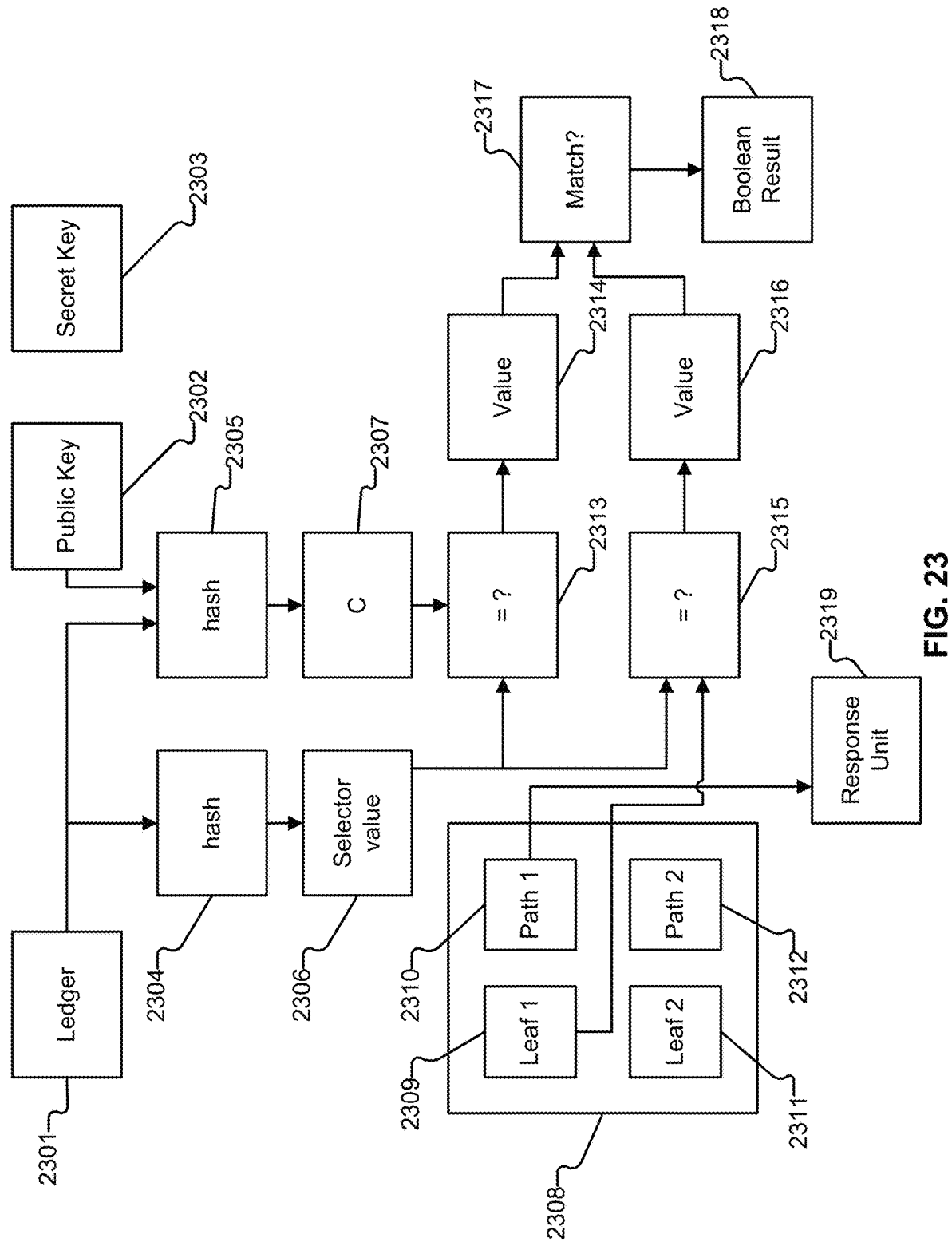
FIG. 23 shows an example value representing a ledger and a value.

FIG. 23 shows an example value 2301 representing the ledger and a value 2302 that is either a public key corresponding to a secret key 2303, or a fixed value such as the value 0. The value 2301 representing the ledger is fed into a function 2304 that, in some embodiments, is a one-way function such as a hash function, obtaining a selector value 2306. The value 2301 representing the ledger and the value 2302 are fed into a function 2305 that is, in some embodiments, a one-way function such as a hash function, generating a challenge 2307. The selector value 2306 and the challenge value C' 2307 are fed into a selector function 2313 that uses the selector value 2306 to select a portion of the challenge value C' 2307 corresponding to challenge C 1103, outputting the selected portion 2314. A collection of leaf values and paths are stored in repository 2308, and comprise a first leaf value 2309 and its associated path value 2310 and a second leaf value 2311 and its associated path value 2312. The first leaf value 2309 is fed along with selector value 2306 into the match function 2315 which, in some embodiments, is the same as the match function 2313. Match function 2315 produces an output 2316. The values 2314 and 2316 are input to a comparator 2317 that determines whether the two inputs match, and outputs a Boolean result 2318. If result 2318 is 'true' then the path 2310 corresponding to leaf 2309 is sent to a response unit 2319 that outputs path value 2310 as the answer to query 2307, which is relative to ledger representation value 2301. If result 2318 is 'false' then the next unprocessed leaf value 2311 is processed according to the same steps as leaf value 2309 was. Preferably, leaf values 2309 and 2311 are kept in a lexicographically sorted manner, and only leaf values that satisfy a criteria corresponding to the selected string 2314 are processed.

Figure 24:
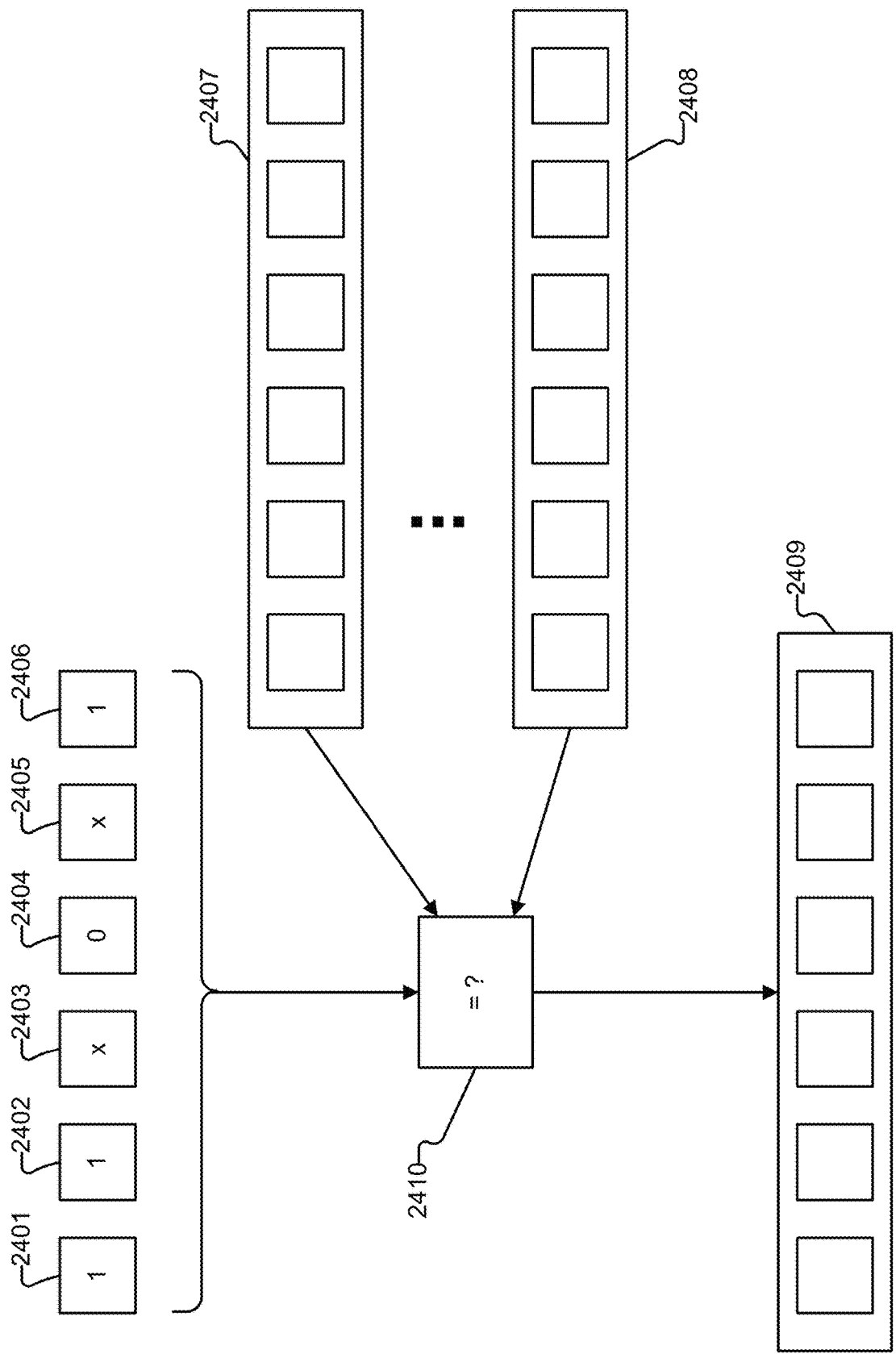
FIG. 24 shows an example selection process of a challenge.

FIG. 24 shows an example selection process of the challenge 2307, using the selector value 2306, resulting in the selection of four out of six bit positions of an example six-bit challenge. The first position 2401 is selected by the selector value 2306, and the corresponding position of challenge 2307 is a 1. The second position 2402 is also selected by the selector value 2306, and the corresponding position of challenge 2307 is a 1. The third position 2403 is not selected by the selector value 2306, and is marked X in FIG. 24 to indicate that. The fourth position 2404 is selected by the selector value 2306, and the corresponding position of challenge 2307 is a 0. The fifth position 2405 is not selected by the selector value 2306, and the sixth position 2406 is selected; this corresponds to a 1. A collection of leaves is stored in repository 2308. In this example, they are sorted in lexicographical order, starting with the lowest leaf value 2407 and ending with the highest leaf value 2408. There may be omissions between these values, i.e., not all consecutive leaves stored in repository 2308 are consecutive values. If a comparator function 2410 determines that a leaf 2407 matches the series 2401, 2402, 2404, 2406 in the corresponding bit positions, then the leaf 2407 is output in 2409 as a match, corresponding to a result 2308 that is 'true'. Since in this example, the two most significant bits of the selected challenge, namely the bits 2401 and 2402, are 1, then any value 2407 in repository 2308 that does not start with 1's as the two most significant bits needs to be matched further. This is only one possible matching process, and there are many others; furthermore, there are matching processes that are more efficient than the described matching process. Typical outputs from hash functions, such as function 2305, are considerably longer than the strings shown in FIG. 24, which are for illustrative purposes only.

Figure 25:
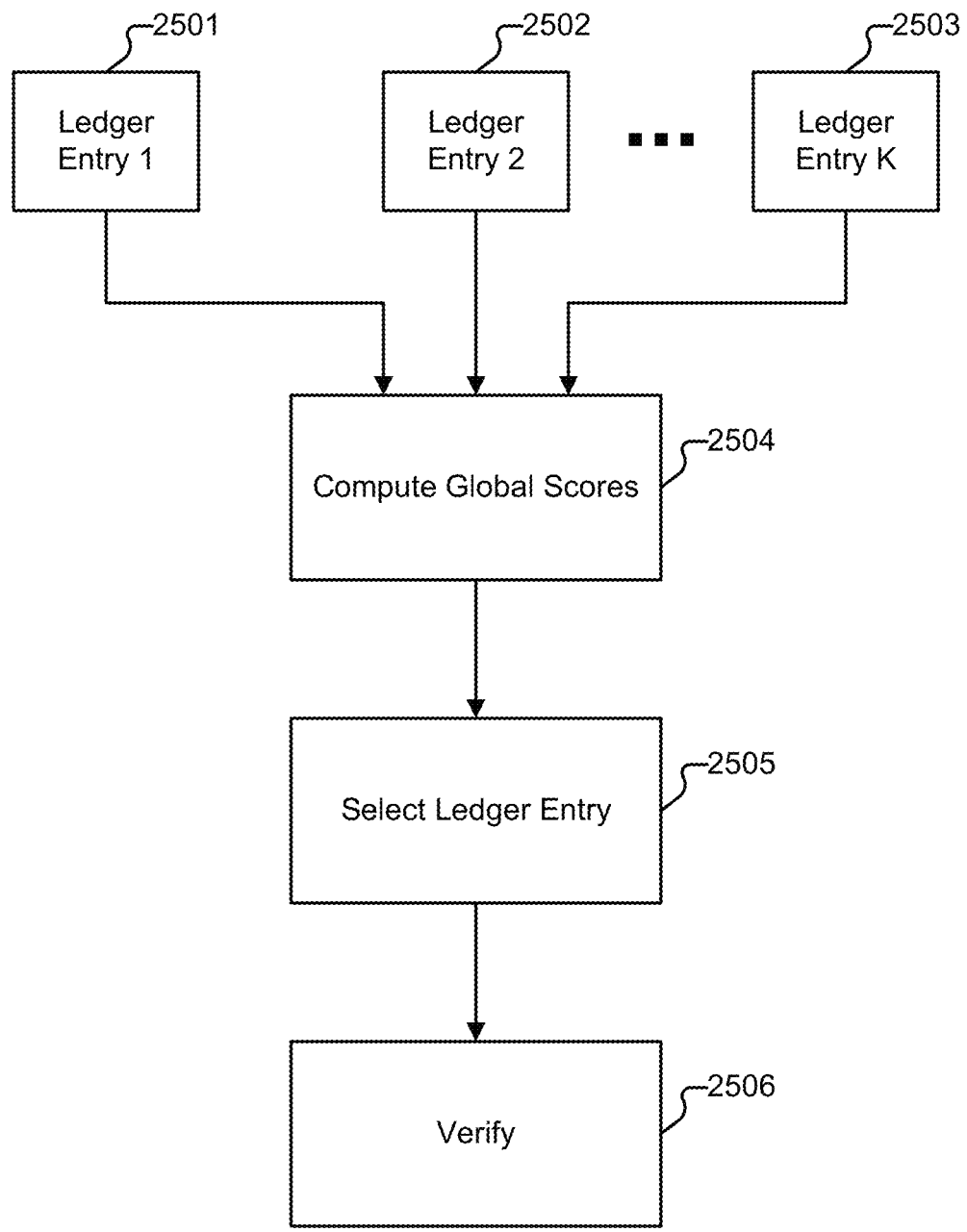
FIG. 25 shows an example selection of one out of several competing ledger entries
Figure 26:
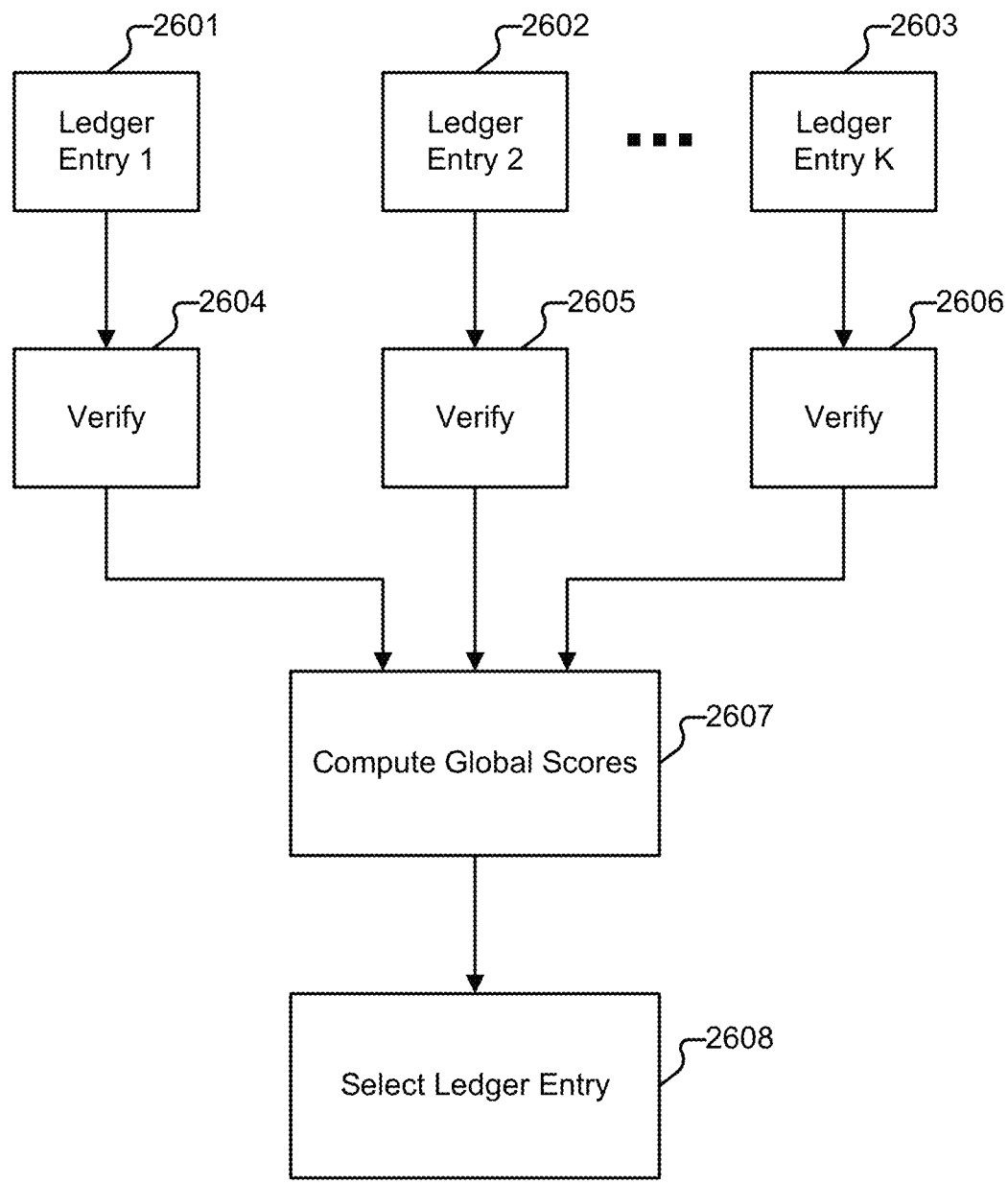
FIG. 26 shows an example approach to select the ledger entry with the highest global quality score.

FIG. 25 shows an example selection of one out of several competing ledger entries 2501, 2502, 2503. For all of these, global quality scores are computed 2504, and in 2505 the ledger entry 2502, for example, with the highest global quality score is selected. Selected ledger entry 2502 is verified to be a valid ledger entry in 2506. If it is, then this is output as the winning ledger entry; otherwise, the ledger entry with the second-highest global quality score is selected and verified, etc. Like many computations, this is performed in multiple locations, each verifier making a selection and a decision. The global selection and decision is made by the collective actions of all the parties involved in mining.

FIG. 26 shows an alternative example approach to select the ledger entry with the highest global quality score. This involves ledger entries 2601, 2602 and 2603, each one of which is verified in 2604, 2605 and 2606. If ledger entry 1, corresponding to block 2601 is not found to be valid in 2604, then it will not be forwarded to block 2607. In 2607, the global quality score is computed for each one of the ledger entries that verified correctly, and in 2608, the ledger entry 2602 with the highest global quality score computed in 2607 is output. This results in the same selection as the process in FIG. 25, and is simply used to illustrate an example of how order is sometimes not important to the final outcome. There are many such examples in this disclosure, and for each disclosed approach, there are alternative approaches that generate the same or very similar results, and furthermore, that there are many variations of the techniques disclosed herein.

Figure 27:
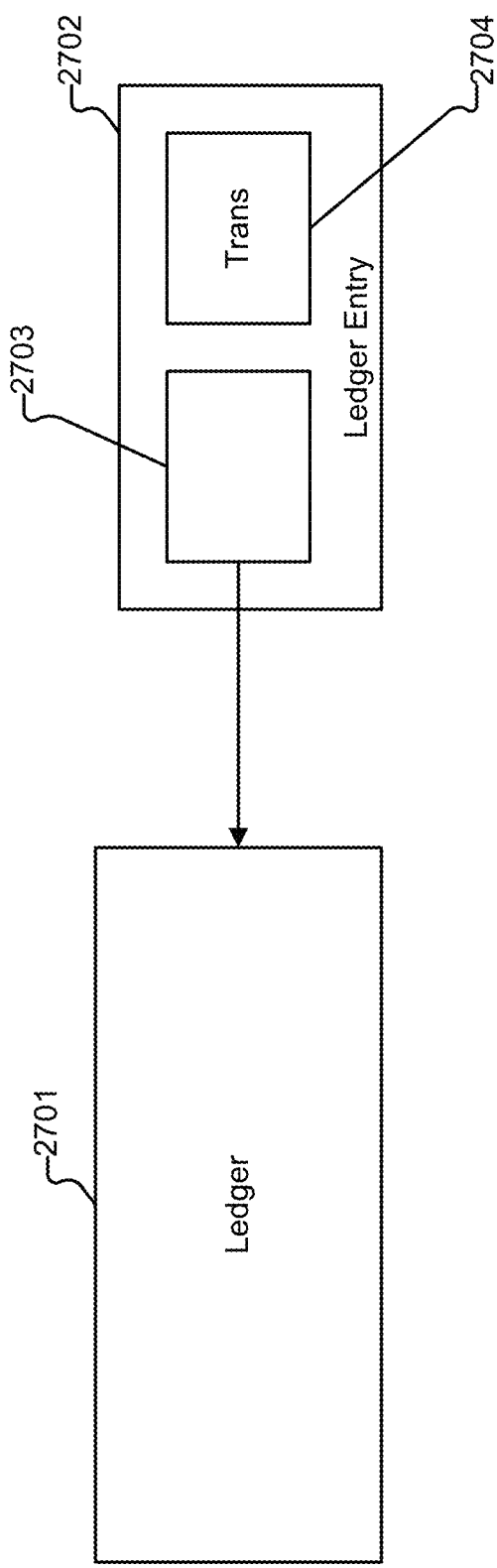
FIG. 27 shows an example of an old ledger representation and an answer that is a ledger entry to a challenge associated with a representation1 of the ledger and transactions.

FIG. 27 shows an example of an old ledger representation 2701 and an answer that is a ledger entry 2702 to a challenge associated with a representation 2701 of the ledger and transactions TRANS. The answer 2702 comprises a public key 2703 and at least one path value 2704. To verify the answer 2702, a verifier computes the leaf value corresponding to the root value (not shown), public key 2703 and the at least one path value 2704.

Figure 28:
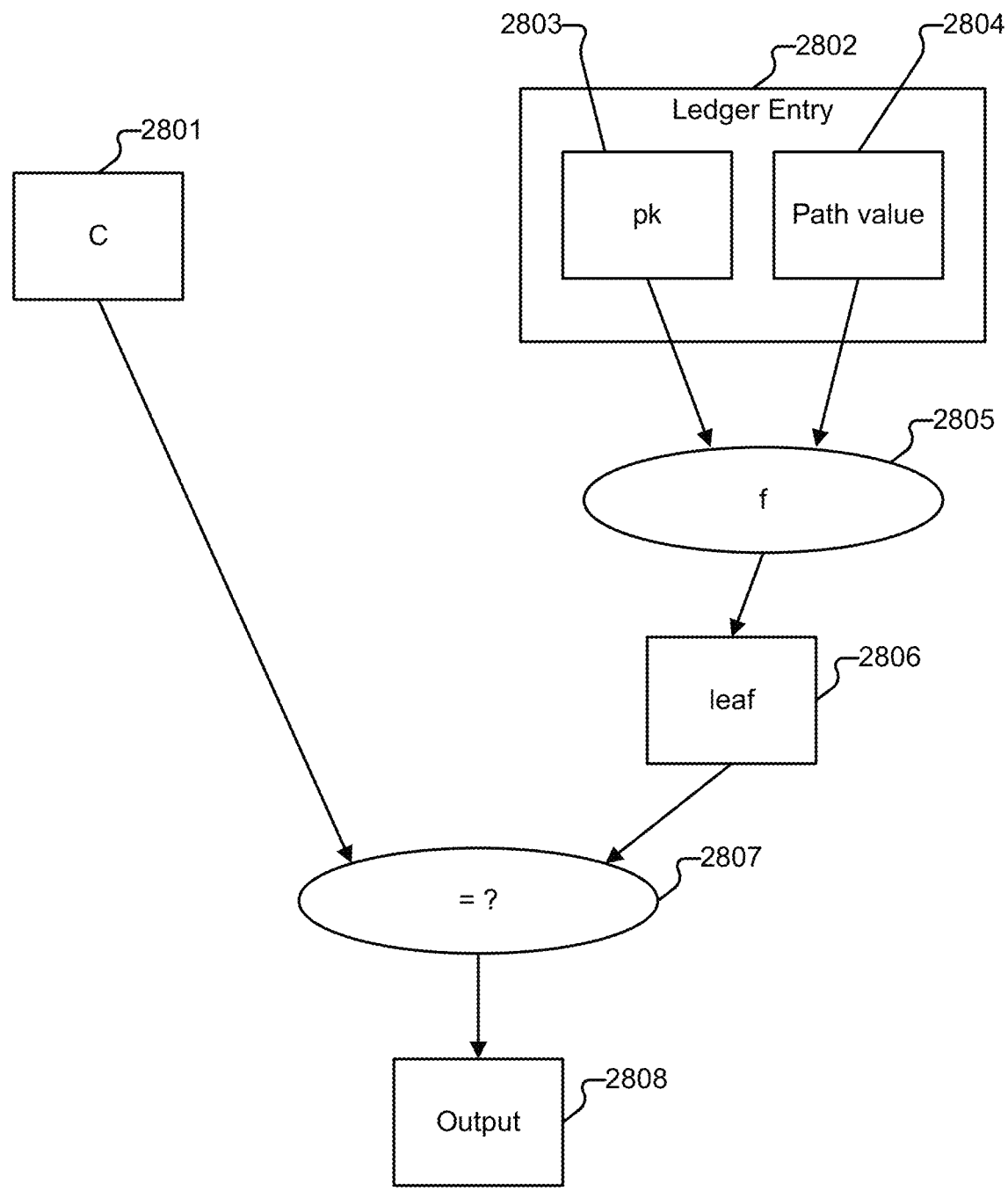
FIG. 28 shows an example process of verifying an answer with respect to an old ledger value.

FIG. 28 shows an example process of verifying an answer 2702 with respect to the old ledger value 2701. The verifier derives the challenge from old ledger value 2701 and stores this as challenge 2801. It applies a function f 2805 to the public key representation pk 2803 (of answer 2802 to be verified) corresponding to public key representation 2703, and to the at least one path value 2804 (also of answer 2802 to be verified) corresponding to the at least one path value 2704. In the case where multiple path values are used, function f 2805 is applied to each one separately, each time also using public key representation 2803 as input. The result of the application of function f 2805 is a leaf value 2806. The verifier uses match function 2807 taking input challenge C 2801 that may be the same as challenge C 1103 and leaf value 2806 to produce an output 2808 that corresponds to a determination whether the match function is satisfied by its inputs. If output 2808 is "true" or a corresponding value indicating that there is a match, then answer 2802 is accepted as a valid extension to old ledger representation 2701, and old ledger representation 2701 and answer 2702 are combined to form a new ledger representation. This effectively certifies public key 2803, allowing the holder of the associated secret key to perform actions limited to those with a certified public key 2803. The combination of old ledger representation 2701 and answer 2702 to form a new ledger representation also effectively creates a new opportunity to find answers to the corresponding new challenge.

Figure 29:
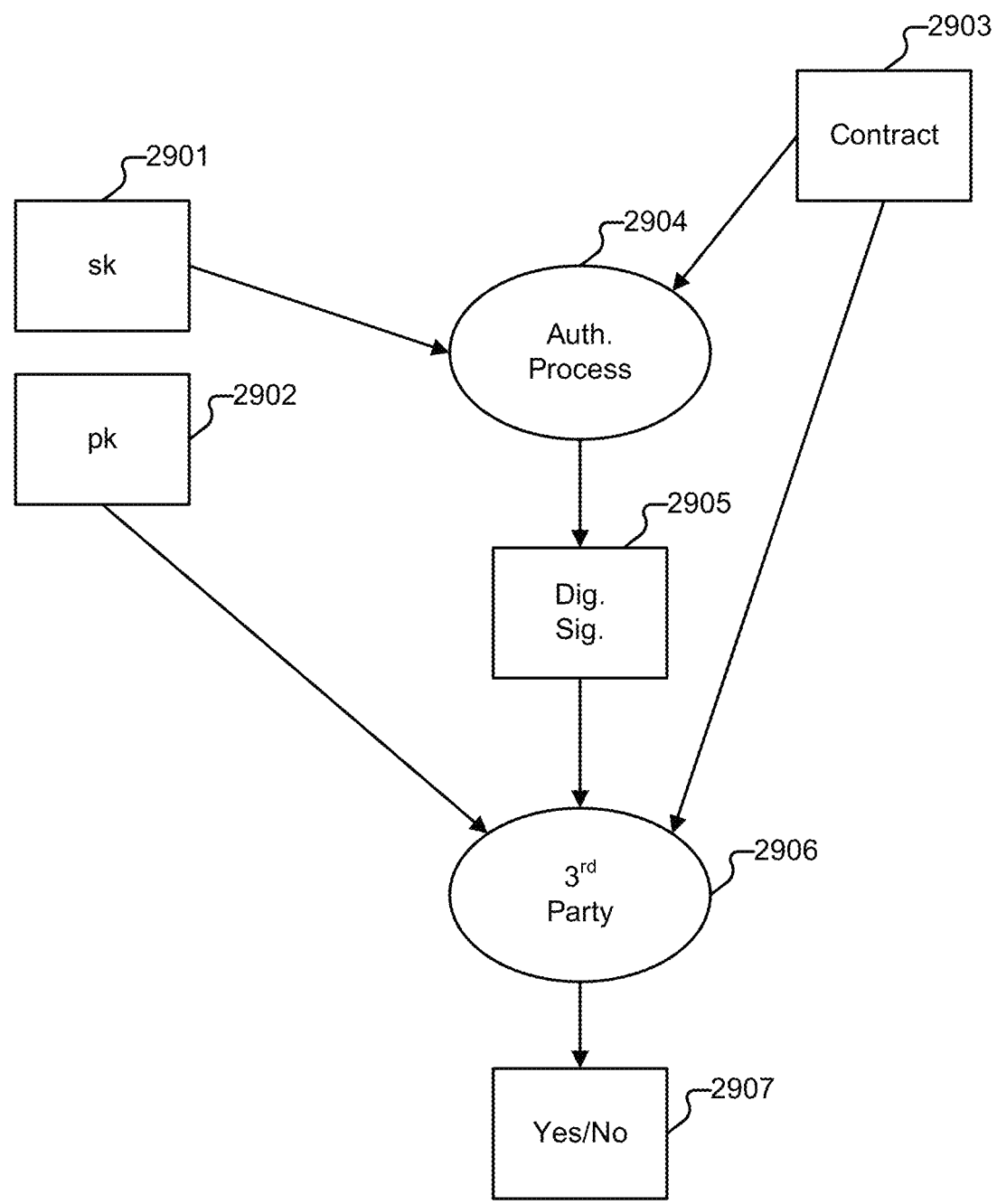
FIG. 29 shows an example use of a certified public key.

FIG. 29 shows an example use of a certified public key 2902 corresponding to certified public key 2803, and corresponding to secret key 2901. A contract representation 2903 is provided to authorization process 2904 that determines that contract representation 2903 should be agreed to and generates a digital signature 2905 using secret key 2901 and contract representation 2903. This digital signature 2905 is later verified, potentially by another party 2906, taking contract representation 2903 and certified public key 2902 as input and outputting decision 2907 that typically is a Boolean value corresponding to whether digital signature 2905 is a valid digital signature on contract representation 2903. This step typically also involves verifying that public key 2902 is part of the ledger.

Figure 30:
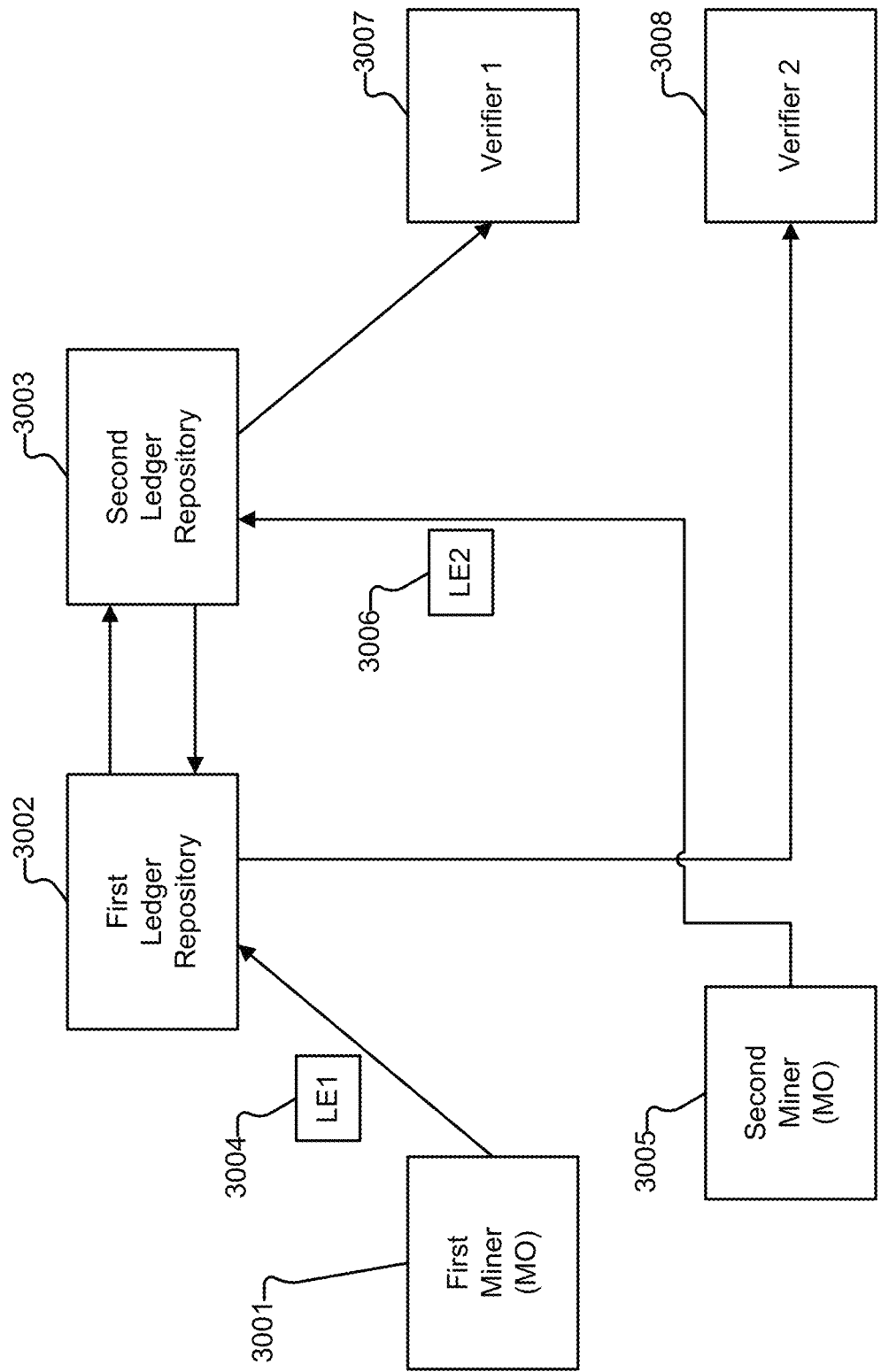
FIG. 30 shows an illustrative distributed system comprising a first miner, a second miner, a first ledger repository, a second ledger repository in communication with the first ledger repository, a first verifier, and a second verifier.

FIG. 30 shows an illustrative distributed system comprising a first miner 3001, a second miner 3005, a first ledger repository 3002, a second ledger repository 3003 in communication with the first ledger repository 3002, a first verifier (verifier1) 3007 and a second verifier (verifier2) 3008. The first miner 3001 submits a ledger entry LE1 3005 to the first ledger repository 3002, and the second miner 3005 submits a ledger entry LE2 3006 to the second ledger repository 3003. First ledger repository 3002 and second ledger repository 3003 communicate ledger entry LE1 3005 and ledger entry LE2 3006 to each other. First verifier 3007 receives a collection of ledger entries, transaction entries (not shown) and other components related to the ledger (not shown) from second ledger repository 3003, while second verifier 3008 receives a potentially different collection of ledger entries, transaction entries and other components related to the ledger from first ledger repository 3002. First miner 3001 and second miner 3005 also comprise verifiers such as verifier1 3007 and verifier2 3008, and derives a challenge from the information received.

The following are some example embodiments of the techniques described herein:

1. A set of quality functions, including a local quality function that determines whether a response should be submitted. The quality function can take the size of the graph into consideration so that a large graph results in a greater probability of getting to submit than a smaller graph. This results in the co-existence of different-sized graphs without having to create different coin denominations. It also permits a dynamic adjustment of the conditions of what can be submitted, which means that the system can automatically re-parametrize itself to adjust for too slow/too fast submissions. While it is a distributed assessment, the computation can be verified by other parties, which means that there is no point for a cheating miner to submit a response that should not be submitted. One way it works is that a response is computed from the challenge, from the graph, and (optionally but beneficial to do so) from the Merkle tree associated with the graph. Then this response is given to the quality function and it is determined whether to submit.

2. A time-delay function that can be used in combination with a PoS to avoid abuse. Known time-delay functions are based on a computational problem, such as computing iterated modular squaring. This results in a type of proof of work, and costs substantial amounts of energy. The example time-delay function described herein is: (a) memory-bound, and (b) associated with the PoS. The benefits of memory-bound functions is that they are more "equal" than computation is in the sense that different platforms (a phone, a desktop, etc.) have more similar bus limitations than they have computational limitations. In some embodiments, the time-delay function described herein is fed off of the graph of the PoS. Whereas this is not a necessary construction, it is a practical design since it means that an honest prover does not need to have any "additional" information stored— apart from what it already has to perform PoS mining. However, a cheater who does not store the entire graph is inconvenienced, and forced to perform computations. By making the time-delay function depend both on the graph G and the Merkle tree on G, this drawback for cheaters is increased. See, for example, FIG. 21.

3. A technique to use empty memory for PoS graphs, with the example properties that:

A. A user will have the impression that the PoS portion is empty, and is therefore able to store other material in this space, thereby gradually overwriting the PoS portion.

B. At the same time, the mining software will be able to access the PoS portion of the storage, which will be visible to this process.

C. We can see this as tiered memory usage, where some processes can overwrite the space of other processes.

D. This is ideal for archival storage, and can be made as plug-and-play for PoS mining.

4. The use of god-parents to obtain ASIC resistance. As described above, in some embodiments, this uses a parent based selection of godparents, where the godparent values are used to compute a node value. This also frustrates cheating efforts using compression of the graph by storing only partial information. The bigger the graph, the better the protection. Note that these techniques can also be used for POWs, and for time-delay functions. See, for example, FIG. 20 and FIG. 21.

5. The avoidance of cheating using compression by using the graph and its associated Merkle tree to determine whether a potentially winning response to a challenge can be computed.

Fair and Affordable Mining

Today's blockchain technologies suffer from a built-in unfairness resulting from the advantages reaped by ASICs (Application-Specific Integrated Circuits), both in terms of speed and power efficiency. This unfairness acts to destabilize the marketplace (e.g., increase the risk for 51% attacks or take-overs) by discouraging the participation of users relying on regular computers, thereby gathering control in the hands of a relatively small number of powerful actors.

Described herein is a practically useful graph structure that offers ASIC resistance, with security properties based on well understood hardware constraints. The use of the construction described herein is described as a part of a Proof-of-Space crypto mining scheme that is well suited for use on consumer-type devices using SSDs (Solid-State Drives) or DDRs (e.g., double data rate memories such as DDR RAM) during the graph generation phase, and using any common memory type for long-term storage. The resulting Proof of Space scheme levels the playing field between ASICs and general-purpose computers, and reduces the power requirements for all.

Fluctuations in the number of crypto currency mining operators are common. There are many reasons for these, including variations in the coin value and cost to mine (and therefore incentive to mine); competition for the attention of miners between different currencies; and perceptions of lack of fairness. Fluctuation, in turn, results in instability as it occasionally enables a small number of prominent actors to dominate and potentially take over the marketplace.

One of the underlying problems is the extensive use of ASICs—or application-specific integrated circuits. With a cost similar to an expensive desktop computer, these special-purpose computers offer mining speed enhancements over traditional computers of six orders of magnitude—and at equally reduced energy costs. This results in an uneven playing field that in turn discourages participation among miners that do not use ASICs, thereby limiting the population of miners and increasing instability. One such form of instability is expressed in the form of 51% attacks, which are attacks in which an attacker takes over the network. The consequences of 51% attacks include the ability for the attacker to double-spend coins, as well as to effectively control mining onwards. The rise of ASIC-based mining recently forced Coinhive to shutdown.

ASIC-resistance has been studied in the context of Proof of Work. One example proposal is a heuristic approach to make the hash function used for a Proof of Work depend on a large body of public data (namely, a blockchain), thereby making mining memory-bound. It has been observed that general purpose computers cannot compete with ASICs in terms of energy efficiency and a graph-theoretic approach has been proposed to reduce the energy cost advantage held by ASICs.

Figure 31:
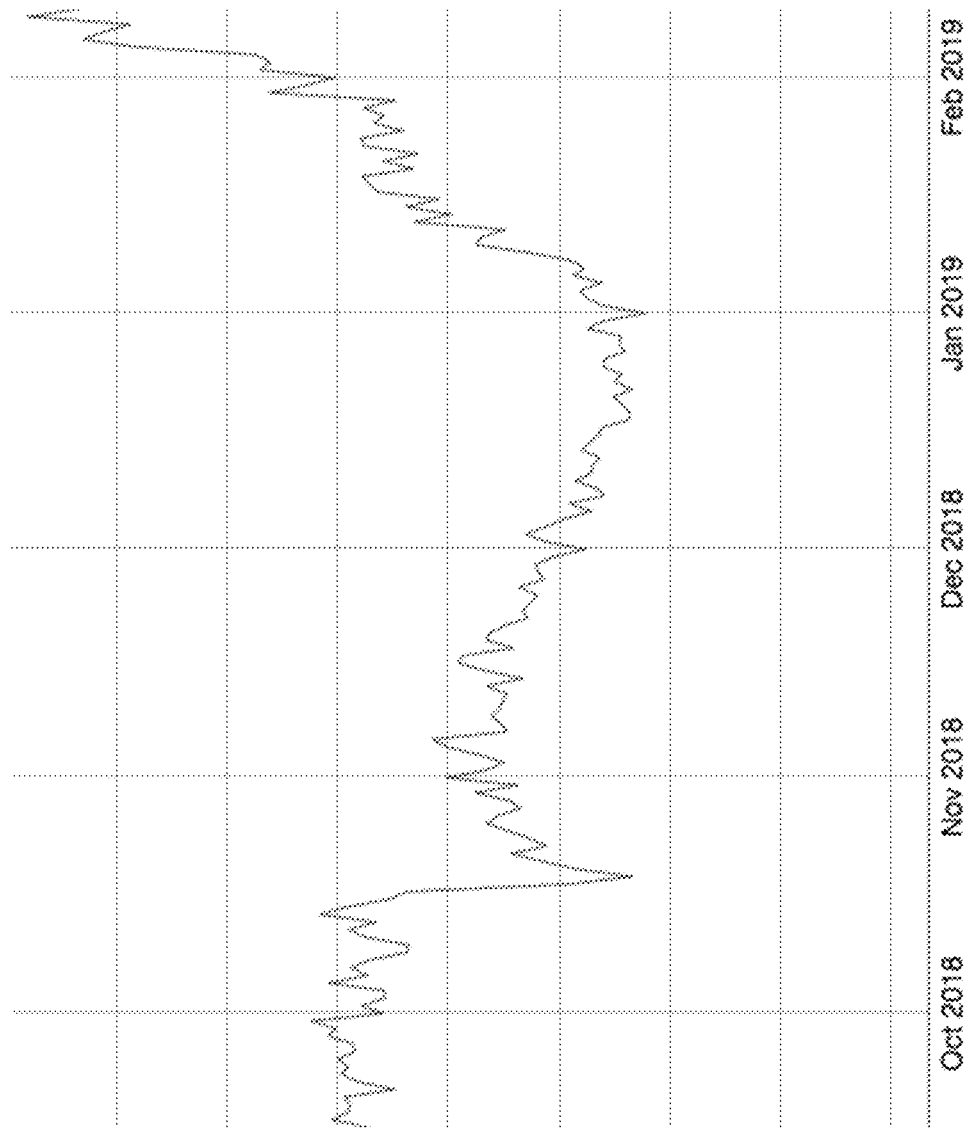
FIG. 31 shows an example hashrate.

The lack of success of existing proposed methods has forced developers to resort to periodic updating of the mining software to frustrate the use of ASICs. Monero developers, for example, have a pattern of releasing a new anti-ASIC patch every six months. For each patch, miners must upgrade their software in sync. While temporarily effective, the updates do not have a lasting impact, with the presumed ASIC miners coming back online with just a few weeks or months, as illustrated by FIG. 31. Apart from being a short-term fix, the deployment of patches is logistically complex and often disrupts honest miners that are not synchronized, in addition to the intended disruption of ASIC miners. Moreover, heuristic evidence indicates that every time ASIC farms resurface, they are a bit more stealthy and harder to detect.

There are concerns that the ASIC makers are controlled by nation states with ulterior motives. The introduction of a kill switch in the ASIC could allow a nation state to control the mining pool and perhaps initiate a 51% attack in time of conflict. Another concern is that the party controlling the mining could require that miners purchase a license to utilize the ASIC, thereby limiting mining to a specific group of people.

FIG. 31. The figure shows the hashrate for Monero at the end of 2018 and early 2019. The drop of the hashrate in mid-October corresponds to an ASIC patch release. At this time, it is estimated that ASICs control approximately 85% of the network.

Long-term approach. The long-term viability of an approach to discourage ASICs should have a focus on the underlying physical limitations, and be based on hardware constraints. This can be achieved by the use of memory-bound functions, forcing ASICs and general purpose miners alike to access slow storage (e.g., hard drives) to mine.

Described herein is a memory-bound function based on an understanding of inherent hardware limitations, and an ASIC resistant approach is described that does not rely on public data. The approach described herein is founded in an understanding of what creates an advantage for ASICs. Somewhat simplified for exemplary purposes, what makes ASICs so fast is that everything fits in a single stacked package. By designing a computationally light-weight algorithm that requires access to a dramatically larger storage space than a typical cache offers (where a typical ASIC has a cache with a capacity of a few kilobytes, and taking up on the order of 25% of the die size), and for which there exists neither locality of reference nor possibilities for prefetching or pipelining, the dominant computational cost—whether for an ASIC or a general-purpose computer—becomes the memory-bound component. Once the principal delay is that of accessing external storage, the playing field between ASICs are general-purpose computers has, effectively, been leveled.

Outline. Described are example details regarding the example specifications or requirements on the graph structure and the approach described herein (section on generation of commitment graphs). Focus is then placed on the engine of the approach: the graph generation (section on generation of commitment graphs). The approach described herein may be used in a variety of applications, including Proof of Work (PoW) and Proof of Space (PoS) based crypto payment schemes. The applicability of the graph structure described herein in the context of Proof of Space (PoS) based mining is demonstrated by describing one possible mining scheme based on the graph structure proposed herein (see section below on Security). The mining scheme described herein also exhibits a dramatic reduction of the energy costs of mining, even compared to competing PoS approaches.

Approach

ASIC Resistance Requirements. Describing the solution from the perspective of its computational consequences, the following example requirements are arrived at:

Memory. The computation should require access to a large memory, making IC (Integrated Circuit)-only solutions practically unattainable.

Look-ahead. The memory accesses should foil attempts to perform look-ahead; this may be achieved by an a-priori unpredictable access pattern.

Computation. To diminish the computational benefits obtainable from the use of ASICs, it is beneficial to minimize the amount of computation required, in relation to the amount of memory access.

Remembering the Needs of Honest Miners. At the same time as a protocol should be resistant to ASICs, it also should be practical and desirable to honest miners. This is not always straightforward, as illustrated by the memohash proposal. More specifically, energy costs are sometimes impacted by limitations on graph size. For example, Memohash requires graph sizes of the order of 2 MB in order to make the plotting (i.e., mining process) fast enough to support the type of ledger closing times (seconds or minutes, but not hours or days) that has come to be expected. However, since the typical memory space to be used is measured in terabytes, a very large number of graphs is required, which in turn dramatically increases the search cost and the associated power costs.

Access Patterns. The example requirements described above are satisfied by the graph traversal approach shown in the baby example in FIG. 22: To compute the value of the yellow node (2202), the value associated with the predecessor of the node is used to select a first godparent, whose value in turn is used to select a second godparent. (This is in contrast to traditional approaches, where the value of a node is computed from the values of two or more parent nodes, with fixed locations in the graph relative to the child node.)

The values of the sequence of predecessor and godparent nodes traversed is used to compute the value of the node. As soon as a value has been computed, the newly computed node is set to be the predecessor, and the process is repeated to compute the next value of the graph. Note that the process is deterministic; however, due to the pseudorandom values of the nodes, the traversal is a priori unpredictable.

In some embodiments, this structure is used both for the generation of graphs (section on generation of commitment graphs,) and in the context of mining (section below on mining.)

Generation of Commitment Graphs

Consider, for example, a graph G whose root $G_0$ has a value $G_0$·value that is a pseudo-random value. The graph is generated using the following example process:

1) Initialize. To compute the value associated with $G_i$, for a node number $i \geq 1$:
   (a) Set the location $L=i-1$,
   (b) Set the state $S=\text{hash}(G_L \cdot \text{value}, L)$, for a hash function hash such as SHA256.
   (c) Set the counter count=n, where n=2 generates a godparent sequence of length two.
2) Location. Using S as a source of randomness, select a new location L. (See Extraction below.)
3) Read. Read $G_L$·value.
4) Combine. Set $S \leftarrow S \oplus G_L \cdot \text{value}$, where $\oplus$ is a combination function such as XOR.
5) Done? Decrease count by one. If count≠0, branch to step 2.
6) Compute. Set $G_i \cdot \text{value} \leftarrow S$.
7) Write. Write $G_i$·value to memory.

Extraction. In one embodiment, the purpose of the extraction is to obtain—at a low computational effort—a uniformly distributed value in a range that is large enough to fit in a typical DDR, but too large to fit on an ASIC. (Based in current hardware constraints, that makes, for example, a range corresponding to a 32 Gb space suitable.) For a baby example, see FIG. 32 below.

A similar randomness extraction problem exists, for example, for DSS secret key generation in SSL, where the problem is solved by repeatedly hashing a value until it falls in the desired range. However, that approach would be unnecessarily computationally heavy for this context. Instead, the following example variation is used, wherein $b=\lceil \log_2 \rceil$ and where ROL shifts a bit string one step left, rotating in the MSB (Most Significant Bit) in the LSB (Least Significant Bit) position:

$$\text{While } \text{LSB}_b(S) > i-1 : S \leftarrow \text{ROL}(\text{ROL}(S)) \; L = \text{LSB}_b(S)$$

Note that rotating the bit string right instead of left would cause bias, as it is known that at least one of the two most significant bits of $\text{LSB}_b(S)$ must be 1 when the loop condition is true. However, rotating two steps to the left will not cause bias but for a negligible probability since the probability of halting, for each round in the loop, exceeds 50% and |S|=256. (Accordingly, the search will halt but for with a probability of less than $2^{-128}$ for a random state S.)

Figure 32:
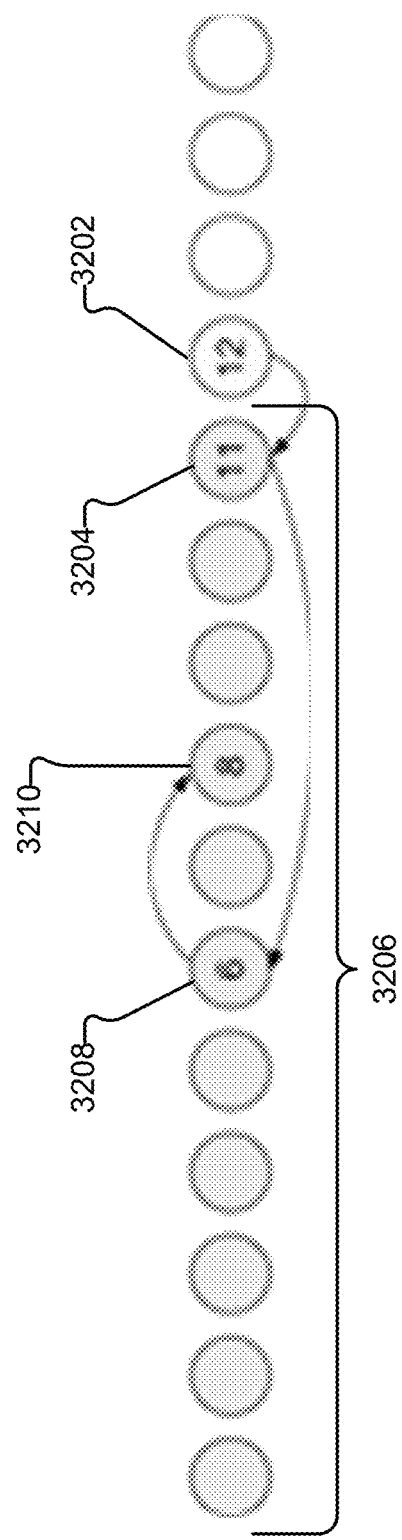
FIG. 32 shows an example of location computation.

FIG. 32: The figure shows a baby example of the location computation described above. The node to be computed, marked in yellow (3202), has location i=12. Its predecessor is in location 11 (3204), and the godparents are drawn from the range R=[1 . . . i−1]=[1 . . . 11].

Baby Example. Assume that it is desired to compute the value of $G_{12}$, the yellow node in FIG. 32. In step 1 of the example graph generation process, the location is set to L=11. This is the predecessor of $G_{12}$. Based on the value of the predecessor node, the location of the first godparent is computed—in this example, this is the location L=6. This new location will always be in the range R, marked in green (3206). Using the value of the first godparent node, $G_6$, a new location L=8 is generated, again from the same range R; this is the second godparent node. The value of $G_{11}$ will be an accumulation of the values of the predecessor and the godparents—in this example, the nodes $G_{11}$ (3204), $G_6$ (3208), and $G_8$ (3210).

Extraction Range. Note that in some embodiments, the range should be significantly larger than the amount of on-board storage available for ASICs (to discourage ASIC use, as shown in the security argument in the below section on Security), but small enough not to exceed the space associated with a DDR or SSD (so as not to complicate honest graph generation by general-purpose computers.) If the size of the graph to be generated exceeds the size of the DDR/SSD, then the range is selected to correspond to the latter, allowing a "moving window" approach of graph generation. To simplify, for exemplary purposes, the security argument in the section on security, a graph G with $N=2^{29}$ nodes is used, each one of which is a 256 bit value. This results in a graph taking space 32 Gb. Accordingly, the entire range [0 ... i−1] above may be used, where i is the location of the node of the graph to be computed.

Committing to a graph. Similar to most blockchain approaches, in some embodiments, the miner commits to a graph G by computing a Merkle tree of the nodes of G and submitting the root of the Merkle tree along with a public key used by successful miners to transfer value. To avoid submission of junk commitments, a miner may be required to pay a small fee to submit a graph.

Figure 33:
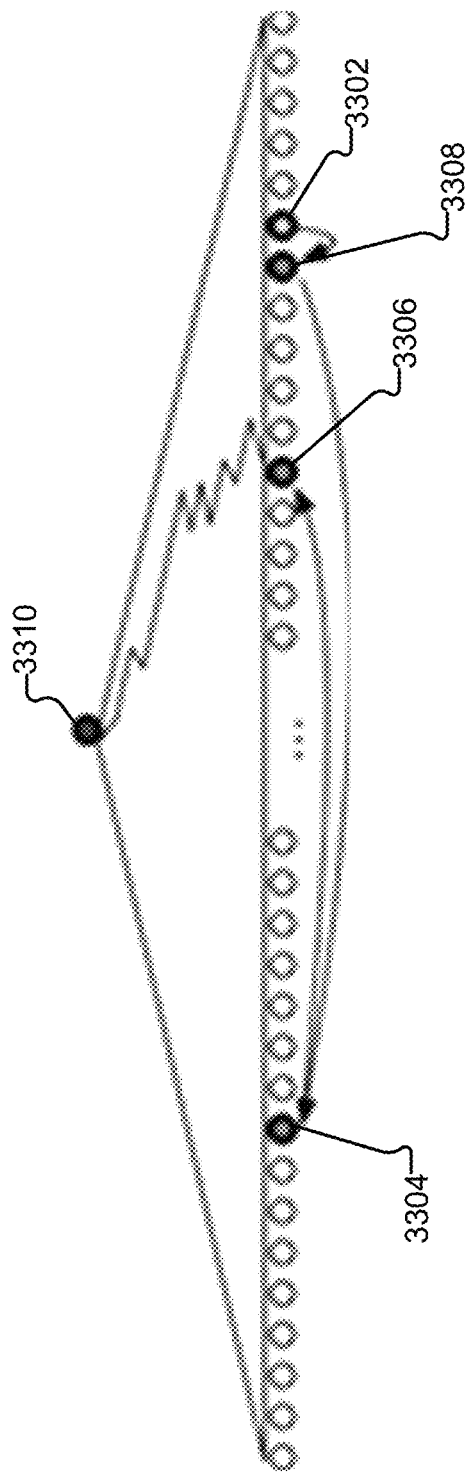
FIG. 33 shows an example conceptualization of a Merkle tree.

FIG. 33: The figure shows an example conceptualization of a Merkle tree associated with a graph, where the graph nodes are the leaves of the tree. One node (in yellow, 3302) and its associated predecessor node and godparent nodes (all in green, 3304, 3306, and 3308) are shown, along with one path through the Merkle tree from one of the godparent nodes to the Merkle tree root (in red, 3310).

Mining

The structure described herein provides freedom from the constraints of other Proof-of-Space (PoS) based mining approaches. Traditional PoS methods are typically based on performing computations over large portions of the graphs—to "prove knowledge" of the graphs. In contrast, the structure in this paper requires miners, in some embodiments, to store, in essence, all nodes of their graphs, or face substantial computational penalties when accessing even a very small number of these nodes.

Mining Example. As one example of a mining approach, the miner may perform a series of k look-ups, based on a challenge value, and generate a tentative ledger entry that is a function of these values. Concretely, for example, if the challenge is c, then this value may be used to generate k node locations i in the graph, where for each such node $G_i$, the associated predecessor $G_{i-1}$ and two godparent nodes $G_{i1}$, $G_{i2}$ are determined. In addition, in some embodiments, the Merkle tree paths of all of these nodes are generated. This set of nodes and associated paths is the response to the challenge.

Figure 34:
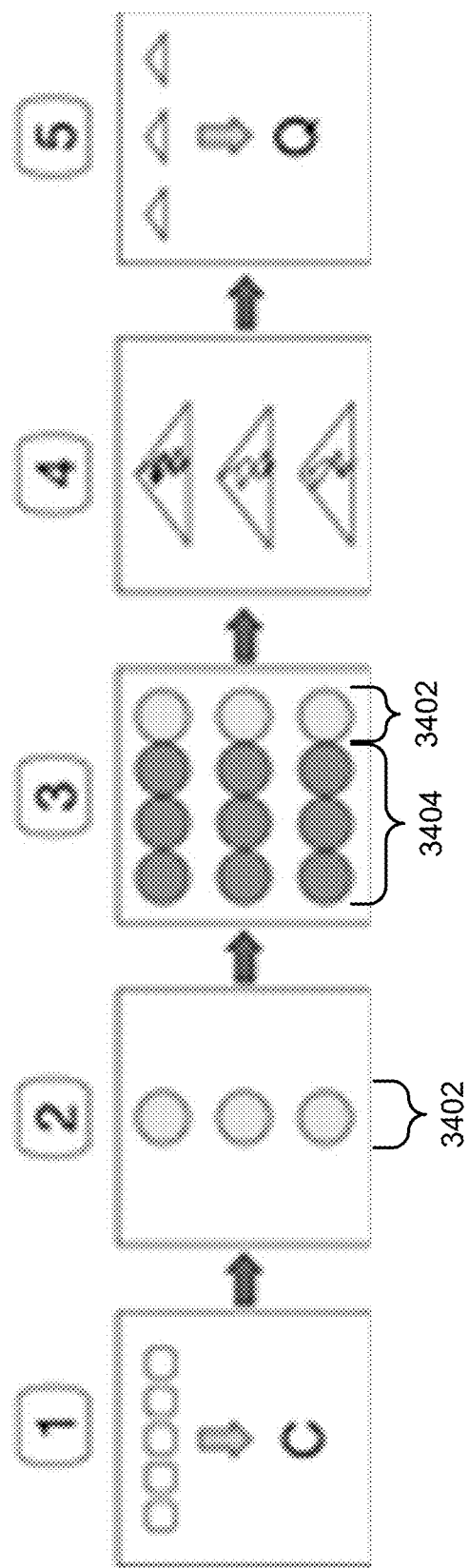
FIG. 34 illustrates an embodiment of a mining process.

FIG. 34: The figure illustrates an embodiment of the mining process for graph G. 1: a challenge c is generated from the public blockchain and the Merkle commitment of graph G; 2: c is used to select k nodes (nodes 3402); 3: the predecessor and the godparents (3404) of the selected nodes (3402) are computed; 4: the Merkle tree paths of the selected and generated nodes are computed—all of these nodes together correspond to the response to the challenge; 5: a local quality function Q is generated from the response (optional in some embodiments).

More specifically, in one embodiment, the mining process (also illustrated in FIG. 34) involves the following example steps:

1. Generate a challenge c from the public blockchain and the Merkle commitment of graph G, e.g., c=hash (blockchain,root(G)).
2. For $j \in [1 \ldots k]$, compute the location of the selected nodes $i = LSB_b(hash(c, j))$ for $b = \log_2 |G|$. Using k=3 may be reasonable. (For convenience, it is assumed that $|G|$ is a power of two.)
3. Generate a node collection, for each j, of the selected node $G_{i_j}$, its predecessor, and its godparents.
4. Generate the Merkle paths for each of the nodes in the k node collections. The node collections and their associated Merkle paths comprise the response.
5. Evaluate the local quality function on the response. (Optional in some embodiments; described below.)

Size of proof. For a graph of size $2^{29}$ nodes, where graph nodes, Merkle tree nodes and challenges are of size 256 bits, the resulting size of the challenge-response pair is 256+k (4×256+29×256) bits, or 3424 Bytes when k=3, not taking the public key associated with the Merkle tree into consideration.

Verification. A verifier can check the validity of a challenge/response pair by confirming that the node values selected using the challenge were computed correctly from their predecessor values and associated godparent values (i.e., using the graph generation algorithm shown above for each of the selected nodes); and that all of these nodes were correctly committed to by the Merkle tree. Note that the verifier does not need to access any portion of the graph G not contained in the response.

Central quality function. To determine what response wins, out of multiple submitted responses, a quality function may be used. In some embodiments, this is a function that allows comparison of two or more submitted responses according to some metric, and the selection of the one that has the best fit. One example quality function is to hash each submitted response (as above) and its associated challenge c, and compare the resulting hash values to the challenge c; in some embodiments, the submission whose hash has the shortest distance to the challenge wins. One practical example distance metric is the absolute value of the result of subtracting the hash value from the challenge, with a tie breaker of selecting the submitted response with the lowest Hamming weight.

Local quality function. To limit the number of submissions, in some embodiments, it is practical to also use a local quality function that weeds out a large portion of tentative mining results before they even get submitted. For example, consider a local quality function that takes a tentative submission, hashes it, and determines whether the 20 least significant bits are zero. If not, then no submission is made. This weeds out all but one in a million mining results. (The local quality function may be automatically modified to make it harder to find a result when submissions rise above some number per round, and, correspondingly, made easier if the number of submissions drop.) If a local quality function is used, in some embodiments, it is evaluated both by individual miners and parties evaluating the submitted proofs.

No grinding. Note that in some embodiments, the response is determined by the challenge and the commitment to the graph G. Therefore, a miner that generates a "disappointing" response cannot go back and try again for the graph G—until the challenge changes. This corresponds to a protection against grinding.

Security

Consider, for example, a cheating miner that uses an ASIC to mine, but which does not store the entire graph G on the ASIC. This cheating miner has four options when it needs to determine a node value to produce a response to a challenge:
1) access the stored node value from fast memory (i.e., memory on the ASIC);
2) access the stored node value from slow memory (i.e., memory outside the ASIC);
3) give up and fail to produce the response;
4) compute the stored node value from node values stored in fast memory;

Assume that the cheating miner can store a portion E of G in fast memory.

Since the locations of the memory accesses are pseudo-random, they cannot be a priori determined. Therefore, the cheating miner cannot rely on a look-ahead approach in which the needed nodes are pre-loaded to fast memory. Accordingly, the first option is not available to the cheating miner more than a portion E of the time.

If the cheating miner relies on slow memory for any significant portion of the memory accesses, those accesses will take essentially the same time as they would have to an honest miner using a general-purpose computer. More specifically, this miner will require an amount of time that is approximately a portion 1−∈ of the time taken by the honest miner. If this is the best strategy of the cheating miner, the goals of the technique described herein have been achieved.

Similarly, the third option—giving up—would lead to failure for the cheating miner in at least a portion 1−∈ of the cases. If this is the best strategy for the cheating miner, the goals of the technique described herein have, again, been achieved.

Turning now to the last option, it is noted that a cheating miner that wishes to compute a node from the node values it depends on faces a risk that at least some of these nodes may also need to be computed (as opposed to being available in fast memory). If such a node, in turn, results in additional nodes having to be computed, there may be an avalanche effect. The expected impact of the avalanche increases as the node indices grow, since the portion of the range that is available in fast storage decreases as this happens.

The cost C of accessing a graph node at location i may be seen to be described by the following equation:

$$C(i) = \begin{cases} 1, & \text{if node } i \text{ is stored} \\ C(i-1) + C(R(i)) + C(R(i)) & \text{otherwise,} \end{cases}$$

This corresponds to the cost of generating the predecessor and the two godparents, where the latter two are located at randomly drawn locations R(i), where R(i) is a random number in the range [0 . . . i−1]. It is not clear whether this equation has a closed form; however, simulations (shown in FIG. 24) demonstrate the avalanche effect resulting from only storing a portion of the nodes of the graph. The figure shows the number of operations required to generate an absent node. Here, each such operation corresponds to one full round (from step 1 to 7) of the graph generation algorithm described in the section on generation of commitment graphs.

Figure 35:
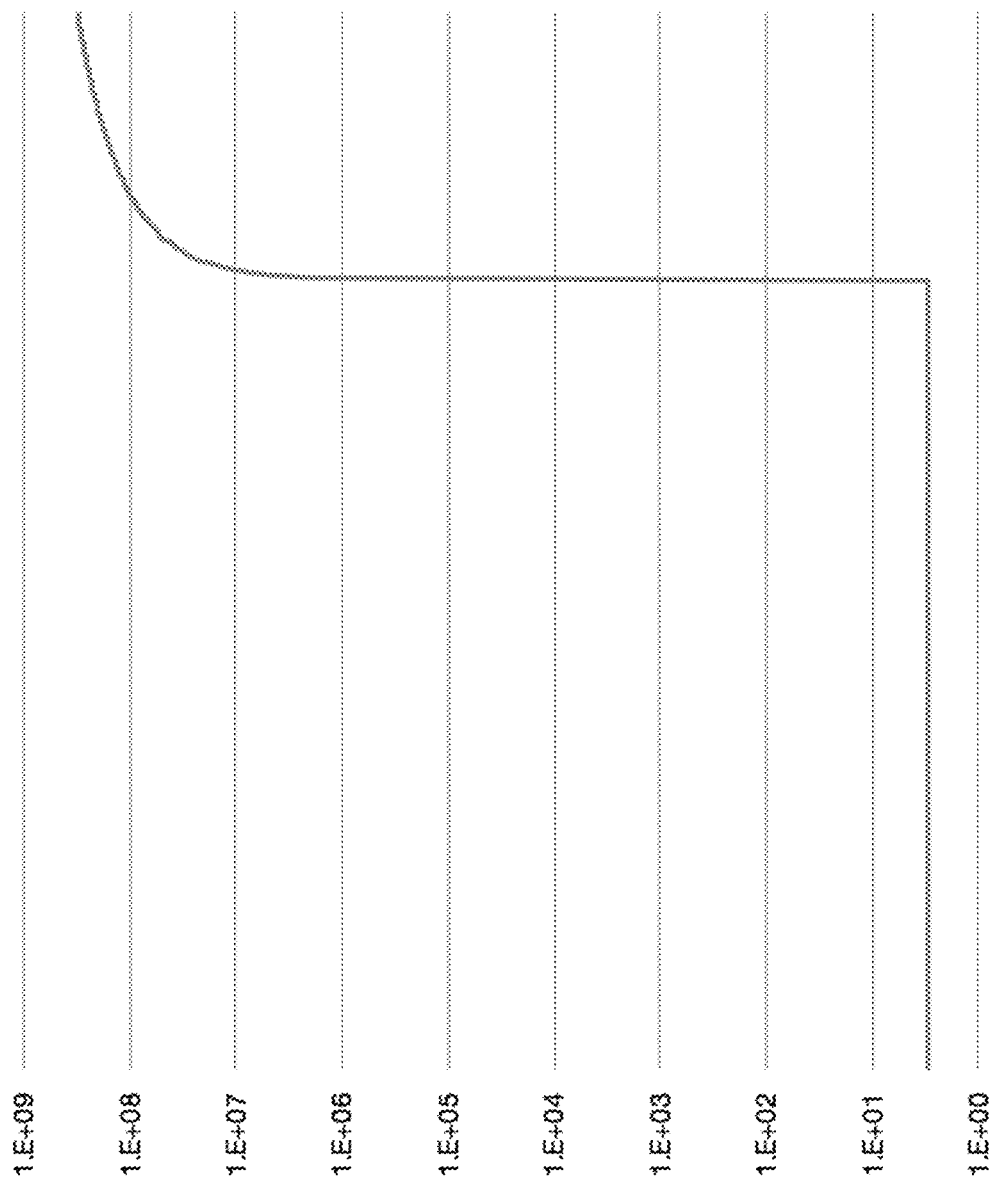
FIG. 35 illustrates an embodiment of computational cost of generating node values.

FIG. 35: The figure shows an example of the computational cost C(i) of generating node values (as opposed to fetching them from slow storage,) for an example cache size of 1 GB, corresponding to 1.3×108 nodes stored in the cache. Computing graphs cache-size or fewer nodes requires 3 reads, corresponding to the long horizontal portion of the graph. As soon as the graph size exceeds the cache size, the number of reads explodes. When only 0.2% of the nodes of the graph are not stored in the cache, the expected number of reads exceeds 1.8 million. This exceeds the approximate cost of accessing the node from slow storage. There is, in other words, a very clear avalanche effect.

When the expected computational cost of generating the required value exceeds the cost of the other available options, the cheating miner loses. Instead of establishing the exact point at which this occurs—this depends on the exact parameters of each computer—it is observed that this option is not viable as the absence of nodes approach one percent. FIG. 35 illustrates this for a 1 GB cache; there, the cutoff happens when approximately 0.2% of the nodes are not stored in the cache. (Recall that the generation of a response to a challenge requires that k nodes are generated, along with their predecessors and godparents. The figure shows the costs for k=1.

Putting this in context, an ASIC with 1 Gb of fast storage corresponds to $$\epsilon = \frac{1}{32}$$

for a graph with N=$2^{29}$ nodes of size 256 bits each. This in turns corresponds to an absence of $$1 - \epsilon = \frac{31}{32} \approx 0.97.$$

Contrast this with the costs illustrated in FIG. 25, showing that a mere absence of less than 0.002 (i.e., 0.2%) will make on-ASIC mining computationally undesirable. A better strategy would be to instead access slow storage, just like the honest miner does.

This demonstrates that there is no financial incentive to use ASICs for mining as long as the parameters are chosen to force a cheater to access slow storage. Similarly, it can be seen that there is no financial incentive to engage ASICs for the initial generation of graphs.

Alternative Embodiments

The following is an alternative embodiment of an extraction method that is faster and which creates a bias towards more "expensive" nodes.

Extraction. One purpose of the extraction is to obtain—at a low computational effort—a uniformly distributed location L in a large range R. By setting L=i−1−$LSB_b$(S), where i is the location to be computed and b=$\lfloor \log_2 i \rfloor$, a uniformly distributed value in the range R=[i−$2^b$ . . . i−1] is obtained—at a very low computational cost. For a baby example, see FIG. 26 below. It is noted that the range R comprises at least half of all the already computed nodes, and on average two thirds.

If the size of the graph G is larger than the range that would fit in a DDR, then our algorithm selects a portion of the graph G that does fit in a DDR. There are some benefits of placing that range right below the value i to be computed, as this increases the degree of avalanche effect if there is a miss.

Figure 36:
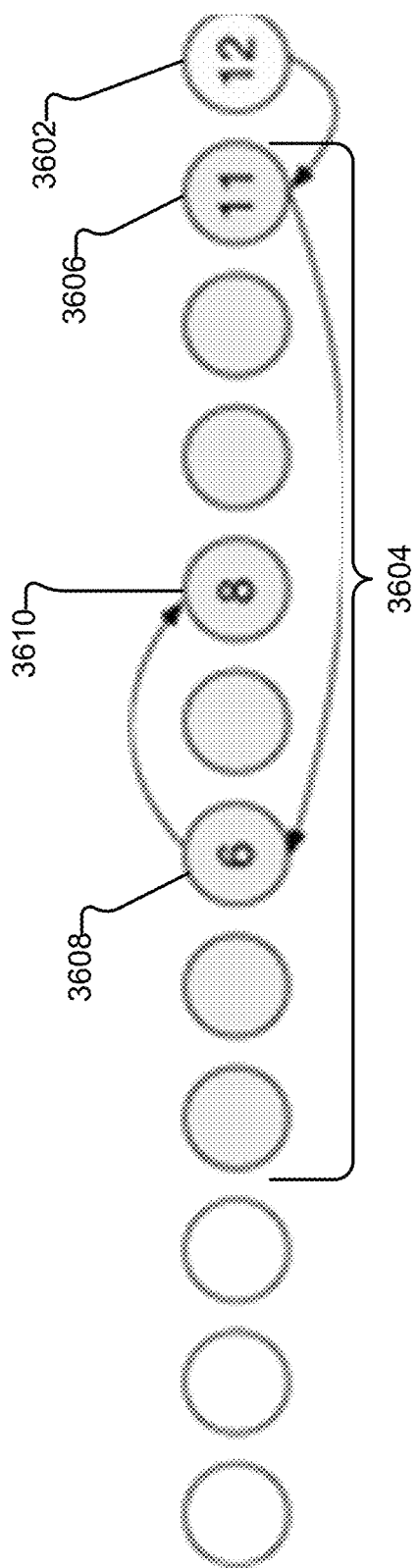
FIG. 36 shows an example of location computation.

FIG. 36: The figure shows a baby example of the location computation described above. The node to be computed, marked in yellow (3602), has location i=12. Therefore, b=[log$_2$i]=3, and the range (marked in green, 3604) from which the godparents are selected is R=[i-2$^b$ ... -1]= [12-8 ... 12-1]=[4 ... 11].

Baby Example. Assume, for example, that it is desired to compute the value of G$_{12}$, the yellow node (3602) in FIG. 36. In step 1 of the graph generation process, the location is set to L=11. This is the predecessor of G$_{12}$. Based on the value of the predecessor node, the location of the first godparent is computed—in this example, this is the location L=6. This new location will always be in the range R, marked in green (3604). Using the value of the first godparent node, G$_6$ (3608), a new location L=8 is generated, again from the same range R; this is the second godparent node. The value of G$_{11}$ (3606) will be an accumulation of the values of the predecessor and the godparents—in this example, the nodes G$_{11}$ (3606), G$_6$ (3608) and G$_8$ (3610).

The following is an alternative embodiment of graph generation:

Consider a graph G whose root G$_0$ has a value G$_0$·value that is a pseudo-random value. The graph is computed by the following process:
1. Initialize. To compute the value associated with G$_i$, for a value i≥1, set a state S=i and a counter C=n, where n=2 generates a godparent sequence of length two. Set the location L=i-1.
2. Read. Read G$_L$·value.
3. Combine. Set S←S⊕G$_L$·value, where ⊕ is a combination function such as XOR.
4. Done? Decrease C by one. If C=0, branch to step 7.
5. Location. Using S as a source of randomness, compute a new location L. (See Extraction above.)
6. Repeat. Go to step 2.
7. Compute. Compute G$_i$·value←hash(S).
8. Write. Write G$_i$·value to memory.

The above can be used with the same mining approach as described above. An alternative mining approach follows:

As one example of a mining approach, the miner may perform a series of look-ups, based on a challenge value, and generate a value that is a function of these values. Concretely, if the challenge is c, then the miner may compute a godparent sequence of length 100 relative to a location i=N+1, i.e., including all nodes in the graph in the computation. The output of the evaluation would be the set of godparent nodes visited along with their associated paths in the Merkle tree associated with the graph. Note that the mining result is determined by the challenge and the commitment to the graph that is preformed by registration of the Merkle tree. Therefore, a miner that gets a "disappointing" mining result cannot go back and try again—until the challenge changes. This corresponds to a protection against grinding.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a processor configured to:
        generate an initial graph at a device, wherein the initial graph is acyclic, wherein content of a first node in the initial graph is generated at least in part by:
            determining content of a predecessor node that is a predecessor of the first node;
            determining a position of a godparent node in the initial graph based at least in part on the content of the predecessor node; and
            determining the content of the first node based at least in part on content of the godparent node at the position in the initial graph determined based at least in part on the content of the predecessor node; and
        store at least a portion of the initial graph on the device; and
    a memory coupled to the processor and configured to provide the processor with instructions.

2. The system recited in claim 1, wherein the processor is further configured to register a representation of the initial graph with a third party entity that is external to the device.

3. The system recited in claim 2, wherein the registering uses a Merkle tree associated with the initial graph.

4. The system recited in claim 1, wherein the initial graph is compressed.

5. The system recited in claim 4, wherein compressing the initial graph comprises storing the first node and not storing the godparent node.

6. The system recited in claim 1, wherein compressing the initial graph comprises excluding nodes from storage based on one or more criteria.

7. The system recited in claim 6, wherein at least one criterion in the one or more criteria is based at least in part on frequency of node access during generation of the initial graph.

8. The system recited in claim 1 wherein the initial graph is subject to a size constraint imposed by a third party verifier.

9. The system recited in claim 1, wherein the processor is configured to send, to a second device, a compressed version of the initial graph.

10. The system recited in claim 1, wherein the processor is configured to send the initial graph to a second device, and wherein the second device is configured to compress the initial graph.

11. A method, comprising:
    generating an initial graph at a device, wherein the initial graph is acyclic, wherein content of a first node in the initial graph is generated at least in part by:
        determining content of a predecessor node that is a predecessor of the first node;
        determining a position of a godparent node in the initial graph based at least in part on the content of the predecessor node; and
        determining the content of the first node based at least in part on content of the godparent node at the position in the initial graph determined based at least in part on the content of the predecessor node; and
    storing at least a portion of the initial graph on the device.

12. A system, comprising:
    a processor configured to:
        receive as input a challenge;
        generate output using the received challenge and a stored graph, wherein the stored graph is acyclic, wherein the stored graph comprises at least a portion of an initial graph that was previously generated, wherein content of a first node in the initial graph was generated at least in part by:
            determining content of a predecessor node that is a predecessor of the first node;
            determining a position of a godparent node in the initial graph based at least in part on the content of the predecessor node; and determining the content of the first node based at least in part on content of the godparent node at the position in the initial graph determined based at least in part on the content of the predecessor node; and provide output to a third party verifier, wherein the third party verifier is configured to determine whether the challenge is satisfied at least in part by using the output and a previously registered representation of the initial graph; and a memory coupled to the processor and configured to provide the processor with instructions.

13. The system recited in claim 12, wherein the challenge comprises an indication of a challenge node, and wherein generating the output comprises determining a value of the challenge node, wherein content of the challenge node is based at least in part on content of one or more ancestor nodes of the challenge node.

14. The system recited in claim 12, wherein the third party verifier is configured to receive multiple responses to the challenge.

15. The system recited in claim 14, wherein the third party verifier is configured to determine which of the multiple responses are valid.

16. The system recited in claim 14, wherein the third party verifier is configured to determine a single winner based at least in part on a set of tie-breaking criteria.

17. The system recited in claim 16, wherein the single winner is determined based at least in part on scores assigned to each response in the multiple responses.

18. The system recited in claim 14, wherein the third party verifier is configured to determine a single winner at least in part by performing Merkle tree verification relative to a node indicated by the challenge.

19. The system recited in claim 12, wherein the challenge is associated with a timeout period.

20. A method, comprising:
receiving as input a challenge;
generating output using the received challenge and a stored graph, wherein the stored graph is acyclic, wherein the stored graph comprises at least a portion of an initial graph that was previously generated, wherein content of a first node in the initial graph was generated at least in part by:
   determining content of a predecessor node that is a predecessor of the first node;
   determining a position of a godparent node in the initial graph based at least in part on the content of the predecessor node; and
   determining the content of the first node based at least in part on content of the godparent node at the position in the initial graph determined based at least in part on the content of the predecessor node; and
providing output to a third party verifier, wherein the third party verifier is configured to determine whether the challenge is satisfied at least in part by using the output and a previously registered representation of the initial graph.

* * * * *